(12) United States Patent
Archetti et al.

(10) Patent No.: US 9,120,970 B2
(45) Date of Patent: Sep. 1, 2015

(54) LIQUID CRYSTALLINE MEDIA AND LIQUID CRYSTAL DISPLAYS WITH A POLYMER-STABILIZED HOMEOTROPIC ORIENTATION

(75) Inventors: Graziano Archetti, Darmstadt (DE); Andreas Taugerbeck, Darmstadt (DE); Renate Bender, Darmstadt (DE)

(73) Assignee: MERCK PATENT GMBH, Darmstadt (DE)

( * ) Notice: Subject to any disclaimer, the term of this patent is extended or adjusted under 35 U.S.C. 154(b) by 120 days.

(21) Appl. No.: 13/810,005

(22) PCT Filed: Jun. 29, 2011

(86) PCT No.: PCT/EP2011/003207
§ 371 (c)(1),
(2), (4) Date: Jan. 14, 2013

(87) PCT Pub. No.: WO2012/007107
PCT Pub. Date: Jan. 19, 2012

(65) Prior Publication Data
US 2013/0114034 A1    May 9, 2013

(30) Foreign Application Priority Data
Jul. 15, 2010 (DE) .......................... 10 2010 027 398

(51) Int. Cl.
*C09K 19/52* (2006.01)
*C09K 19/54* (2006.01)
*C09K 19/38* (2006.01)
*G02F 1/1333* (2006.01)
*C09K 19/56* (2006.01)
*C09K 19/42* (2006.01)
*C09K 19/04* (2006.01)

(52) U.S. Cl.
CPC ................. *C09K 19/54* (2013.01); *C09K 19/42* (2013.01); *C09K 19/52* (2013.01); *C09K 19/56* (2013.01); *G02F 1/1333* (2013.01); *C09K 19/542* (2013.01); *C09K 19/544* (2013.01); *C09K 2019/0448* (2013.01)

(58) Field of Classification Search
CPC ........ C09K 19/38; C09K 19/52; C09K 19/54; C09K 19/542; C09K 19/544; C09K 19/548; C09K 19/56; C09K 2019/0448; G02F 1/133742; G02F 1/1333; G02F 1/1343
USPC ........ 252/299.01, 299.4, 299.5; 349/166, 183
See application file for complete search history.

(56) References Cited

U.S. PATENT DOCUMENTS

| | | | |
|---|---|---|---|
| 5,484,867 A * | 1/1996 | Lichtenhan et al. | 528/9 |
| 6,759,460 B2 * | 7/2004 | Kamo et al. | 524/100 |
| 6,861,107 B2 | 3/2005 | Klasen-Memmer et al. | |
| 2005/0224754 A1 | 10/2005 | Hirai et al. | |
| 2007/0128379 A1 * | 6/2007 | Hirai | 428/1.2 |
| 2008/0198301 A1 | 8/2008 | Jeng et al. | |

OTHER PUBLICATIONS

International Search Report for PCT/EP2011/003207 (Nov. 2, 2011).
S.J. Hwang et al., "Characteristics of Nanoparticle-Doped Homeotropic Liquid Crystal Devices", Journal of Physics D: Applied Physics, vol. 42 (2009) pp. 1-6.

* cited by examiner

*Primary Examiner* — Shean C Wu
(74) *Attorney, Agent, or Firm* — Millen, White, Zelano & Branigan, P.C.

(57) ABSTRACT

The present invention relates to liquid-crystal displays (LC displays) with polymer-stabilized, homeotropic (vertical) alignment of the liquid-crystalline medium (LC medium) without conventional imide alignment layers. The LC medium according to the invention comprises particles having a mass of at least 450 Da which have been functionalized by a polar, organic anchor group.

26 Claims, No Drawings

LIQUID CRYSTALLINE MEDIA AND LIQUID CRYSTAL DISPLAYS WITH A POLYMER-STABILIZED HOMEOTROPIC ORIENTATION

The present invention relates to liquid crystalline media and liquid crystal displays (LC displays) containing said media with polymer-stabilised, homeotropic (vertical) alignment of the liquid-crystalline medium (LC medium) without conventional imide alignment layers. The LC medium according to the invention comprises particles having a mass of at least 450 Da which have been functionalised by a polar, organic anchor group.

The principle of electrically controlled birefringence, the ECB effect or also DAP (deformation of aligned phases) effect, was described for the first time in 1971 (M. F. Schieckel and K. Fahrenschon, "Deformation of nematic liquid crystals with vertical orientation in electrical fields", Appl. Phys. Lett. 19 (1971), 3912). This was followed by papers by J. F. Kahn (Appl. Phys. Lett. 20 (1972), 1193) and G. Labrunie and J. Robert (J. Appl. Phys. 44 (1973), 4869).

The papers by J. Robert and F. Clerc (SID 80 Digest Techn. Papers (1980), 30), J. Duchene (Displays 7 (1986), 3) and H. Schad (SID 82 Digest Techn. Papers (1982), 244) showed that liquid-crystalline phases must have high values for the ratio of the elastic constants $K_3/K_1$, high values for the optical anisotropy $\Delta n$ and values for the dielectric anisotropy of $\Delta\epsilon \leq -0.5$ in order to be suitable for use in high-information display elements based on the ECB effect. Electro-optical display elements based on the ECB effect have homeotropic edge alignment (VA technology=vertically aligned). Dielectrically negative liquid-crystal media can also be used in displays which use the so-called IPS or FFS effect.

Displays which use the ECB effect, as so-called VAN (vertically aligned nematic) displays, for example in the MVA (multi-domain vertical alignment, for example: Yoshide, H. et al., paper 3.1: "MVA LCD for Notebook or Mobile PCs . . . ", SID 2004 International Symposium, Digest of Technical Papers, XXXV, Book I, pp. 6 to 9, and Liu, C. T. et al., paper 15.1: "A 46-inch TFT-LCD HDTV Technology . . . ", SID 2004 International Symposium, Digest of Technical Papers, XXXV, Book II, pp. 750 to 753), PVA (patterned vertical alignment, for example: Kim, Sang Soo, paper 15.4: "Super PVA Sets New State-of-the-Art for LCD-TV", SID 2004 International Symposium, Digest of Technical Papers, XXXV, Book II, pp. 760 to 763), ASV (advanced super view, for example: Shigeta, Mitzuhiro and Fukuoka, Hirofumi, paper 15.2: "Development of High Quality LCDTV", SID 2004 International Symposium, Digest of Technical Papers, XXXV, Book II, pp. 754 to 757) modes, have established themselves as one of the three more recent types of liquid-crystal display that are currently the most important, in particular for television applications, besides IPS (in-plane switching) displays (for example: Yeo, S. D., paper 15.3: "An LC Display for the TV Application", SID 2004 International Symposium, Digest of Technical Papers, XXXV, Book II, pp. 758 & 759) and the long-known TN (twisted nematic) displays. The technologies are compared in general form, for example, in Souk, Jun, SID Seminar 2004, seminar M-6: "Recent Advances in LCD Technology", Seminar Lecture Notes, M-6/1 to M-6/26, and Miller, Ian, SID Seminar 2004, seminar M-7: "LCD-Television", Seminar Lecture Notes, M-7/1 to M-7/32. Although the response times of modern ECB displays have already been significantly improved by addressing methods with overdrive, for example: Kim, Hyeon Kyeong et al., paper 9.1: "A 57-in. Wide UXGA TFT-LCD for HDTV Application", SID 2004 International Symposium, Digest of Technical Papers, XXXV, Book I, pp. 106 to 109, the achievement of video-compatible response times, in particular on switching of grey shades, is still a problem which has not yet been satisfactorily solved.

Industrial application of this effect in electro-optical display elements requires LC phases, which have to satisfy a multiplicity of requirements. Particularly important here are chemical resistance to moisture, air, the materials in the substrate surfaces and physical influences, such as heat, infrared, visible and ultraviolet radiation and direct and alternating electric fields.

Furthermore, industrially usable LC phases are required to have a liquid-crystalline mesophase in a suitable temperature range and low viscosity.

None of the hitherto-disclosed series of compounds having a liquid-crystalline mesophase includes a single compound which meets all these requirements. Mixtures of two to 25, preferably three to 18, compounds are therefore generally prepared in order to obtain substances which can be used as LC phases. However, it has not been possible to prepare optimum phases easily in this way since no liquid-crystal materials having significantly negative dielectric anisotropy and adequate long-term stability were hitherto available.

Matrix liquid-crystal displays (MLC displays) are known. Non-linear elements which can be used for individual switching of the individual pixels are, for example, active elements (i.e. transistors). The term "active matrix" is then used, where a distinction can be made between two types:

1. MOS (metal oxide semiconductor) transistors on a silicon wafer as substrate
2. thin-film transistors (TFTs) on a glass plate as substrate.

In the case of type 1, the electro-optical effect used is usually dynamic scattering or the guest-host effect. The use of single-crystal silicon as substrate material restricts the display size, since even modular assembly of various part-displays results in problems at the joints.

In the case of the more promising type 2, which is preferred, the electro-optical effect used is usually the TN effect.

A distinction is made between two technologies: TFTs comprising compound semiconductors, such as, for example, CdSe, or TFTs based on polycrystalline or amorphous silicon. The latter technology is being worked on intensively worldwide.

The TFT matrix is applied to the inside of one glass plate of the display, while the other glass plate carries the transparent counterelectrode on its inside. Compared with the size of the pixel electrode, the TFT is very small and has virtually no adverse effect on the image. This technology can also be extended to fully colour-capable displays, in which a mosaic of red, green and blue filters is arranged in such a way that a filter element is opposite each switchable pixel.

The term MLC displays here encompasses any matrix display having integrated non-linear elements, i.e. besides the active matrix, also displays having passive elements, such as varistors or diodes (MIM=metal-insulator-metal).

MLC displays of this type are particularly suitable for TV applications (for example pocket TVs) or for high-information displays in automobile or aircraft construction. Besides problems regarding the angle dependence of the contrast and the response times, difficulties also arise in MLC displays due to insufficiently high specific resistance of the liquid-crystal mixtures [TOGASHI, S., SEKIGUCHI, K., TANABE, H., YAMAMOTO, E., SORIMACHI, K., TAJIMA, E., WATANABE, H., SHIMIZU, H., Proc. Eurodisplay 84, September 1984: A 210-288 Matrix LCD Controlled by Double Stage Diode Rings, pp. 141 ff., Paris; STROMER, M., Proc. Eurodisplay 84, September 1984: Design of Thin Film Transistors for Matrix Addressing of Television Liquid Crystal Displays, pp. 145 ff., Paris]. With decreasing resistance, the contrast of an MLC display deteriorates. Since the specific resistance of the liquid-crystal mixture generally drops over the life of an MLC display owing to interaction with the inside surfaces of the display, a high (initial) resistance is very important for displays that have to have acceptable resistance values over a long operating period.

VA displays are generally intended to have very high specific resistance at the same time as a large working-temperature range, short response times and a low threshold voltage, with the aid of which various grey shades can be produced.

In conventional VA displays, a polyimide layer on the substrate surfaces ensures homeotropic alignment of the liquid crystal. The production of a suitable alignment layer in the display requires considerable effort. In addition, interactions of the alignment layer with the LC medium may impair the electrical resistance of the VA display. Owing to possible interactions of this type, the number of suitable liquid-crystal components is considerably reduced. It would therefore be desirable to achieve homeotropic alignment of the LC medium without polyimide.

The disadvantage of the MLC-TN displays frequently used is due to their comparatively low contrast, the relatively high viewing-angle dependence and the difficulty of producing grey shades in these displays.

VA displays have significantly better viewing-angle dependences and are therefore used principally for televisions and monitors.

A further development of the VA displays are the so-called PS (polymer sustained) or PSA (polymer sustained alignment) displays, for which the term "polymer stabilised" is also occasionally used. In these displays, a small amount (for example 0.3% by weight, typically <1% by weight) of one or more polymerisable compound(s) is added to the LC medium and, after introduction into the LC cell, is polymerised or crosslinked in situ, usually by UV photopolymerisation, between the electrodes with or without an applied electrical voltage. The addition of polymerisable mesogenic or liquid-crystalline compounds, also known as reactive mesogens or "RMs", to the LC mixture has proven particularly suitable.

Unless indicated otherwise, the term "PSA" is used below as representative of PS displays and PSA displays.

In the meantime, the PSA principle is being used in diverse classical LC displays. Thus, for example, PSA-VA, PSA-OCB, PSA-IPS, PSA-FFS and PSA-TN displays are known. The polymerisation of the polymerisable compound(s) preferably takes place with an applied electrical voltage in the case of PSA-VA and PSA-OCB displays, and with or without an applied electrical voltage in the case of PSA-IPS displays. As can be demonstrated in test cells, the PS(A) method results in a pretilt in the cell. In the case of PSA-OCB displays, for example, it is possible for the bend structure to be stabilised so that an offset voltage is unnecessary or can be reduced. In the case of PSA-VA displays, the pretilt has a positive effect on response times. For PSA-VA displays, a standard MVA or PVA pixel and electrode layout can be used. In addition, however, it is also possible, for example, to manage with only one structured electrode side and no protrusions, which significantly simplifies production and at the same time results in very good contrast at the same time as very good transparency to light.

PSA-VA displays are described, for example, in JP 10-036847 A, EP 1 170 626 A2, U.S. Pat. No. 6,861,107, U.S. Pat. No. 7,169,449, US 2004/0191428 A1, US 2006/0066793 A1 and US 2006/0103804 A1. PSA-OCB displays are described, for example, in T.-J-Chen et al., Jpn. J. Appl. Phys. 45, 2006, 2702-2704 and S. H. Kim, L.-C-Chien, Jpn. J. Appl. Phys. 43, 2004, 7643-7647. PSA-IPS displays are described, for example, in U.S. Pat. No. 6,177,972 and Appl. Phys. Lett. 1999, 75(21), 3264. PSA-TN displays are described, for example, in Optics Express 2004, 12(7), 1221.

Like the conventional LC displays described above, PSA displays can be operated as active-matrix or passive-matrix displays. In the case of active-matrix displays, individual pixels are usually addressed by integrated, non-linear active elements, such as, for example, transistors (for example thin-film transistors ("TFTs")), while in the case of passive-matrix displays, individual pixels are usually addressed by the multiplex method, where both methods are known from the prior art.

In particular for monitor and especially TV applications, optimisation of the response times, but also of the contrast and luminance (thus also transmission) of the LC display continues to be demanded. The PSA method can provide crucial advantages here. In particular in the case of PSA-VA displays, a shortening of the response times, which correlate with a measurable pretilt in test cells, can be achieved without significant adverse effects on other parameters.

In the prior art, polymerisable compounds of the following formula, for example, are used for PSA-VA:

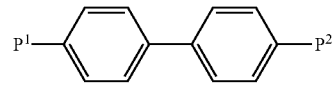

in which P denotes a polymerisable group, usually an acrylate or methacrylate group, as described, for example, in U.S. Pat. No. 7,169,449.

The response time of a VA display is highly dependent on the setting of the pretilt. The effort for this, including production of a polyimide layer, treatment of the layer and improvement with bumps or polymer layers, is relatively great. A simplifying technology which on the one hand reduces production costs and on the other hand helps to optimise the image quality (viewing-angle dependence, contrast, response times) would therefore be desirable.

Spontaneous horizontal to vertical alignment of a liquid-crystal layer with the aid of nanoparticles based on polyhedral oligomeric silsesquioxanes (simply silsesquioxanes, PSSs below) is reported by the publication Shie-Chang Jeng et al. Optics Letters (2009), 34, 455-457. From a concentration of about 1% by weight, virtually homeotropic alignment is observed. The pretilt can only be influenced by the concentration.

The specification US 2008/0198301 A1 likewise proposes PSS as alignment material. It is evident that the self-alignment functions on ITO and on polyimide with a planar alignment.

The specification JP 2010170090 A discloses a dendrimer as additive to liquid-crystal mixtures which causes vertical alignment with respect to substrates.

Shug-June Hwang et al. J. Phys D: Appl. Phys 2009, 42, 025102 disclose amine-substituted POSS (1%) for the vertical alignment of a dielectrically negative liquid-crystal mixture.

These specifications do not mention the problem of the temperature dependence of the switching operation and the lack of a passivation layer. In fact, it has been shown that the degree of homeotropic alignment induced by PSS decreases rapidly with increasing temperature. In addition, a passivation layer is particularly important since the polyimide layer not only offers alignment of the LC medium, but also ensures electrical insulation. Without a passivation layer, problems may appear with the reliability of the display, such as R-DC ('residual DC').

A conference poster at SID 2010 (H. Y. Gim et al., P-128) describes that a phenethyl-substituted polyhedral oligomeric silsesquioxane is used in a concentration of 10% by weight in a display without a conventional alignment layer of the PS-VA type. The LC medium is homeotropically aligned by the PSS. However, the large amount of dopant has a considerable effect on the properties of the LC medium, and the number of liquid-crystal components which can be employed for an LC display of this type is therefore very limited.

The existing approaches for achieving display applications without a polyimide layer are therefore still not entirely satisfactory.

The present invention relates to an LC medium comprising a low-molecular-weight liquid-crystalline component having negative dielectric anisotropy with a value $\Delta \epsilon \leq -1.5$, a polymerised or polymerisable component and a component (N) comprising particles having a mass of at least 450 Da, where the particles contain one or more organic polar anchor groups, and where the polymerised component is obtainable by polymerisation of a polymerisable component.

The present invention furthermore relates to a liquid-crystal display (LC display) comprising a liquid-crystal cell (LC cell) having two substrates and two electrodes, where at least one substrate is transparent to light and at least one substrate has one or two electrodes, and a layer of a liquid-crystal medium (LC medium) located between the substrates, comprising a low-molecular-weight liquid-crystalline component having negative dielectric anisotropy with a value $\Delta \epsilon \leq -1.5$, a polymerised or polymerisable component and a component (N) as defined above and below which is suitable for effecting homeotropic (vertical) alignment of the LC medium with respect to the substrate surfaces, where the polymerised component is obtainable by polymerisation of one or more polymerisable compounds between the substrates of the LC cell in the LC medium, optionally with application of an electrical voltage to the electrodes of the cell.

The invention furthermore relates to a process for the production of an LC display, preferably of the PSA-VA type, comprising an LC cell having two substrates and two electrodes, where at least one substrate is transparent to light and at least one substrate has one or two electrodes, comprising the process steps of:

filling of the cell with an LC medium comprising an LC medium, as described above and below or in the claims, comprising a polymerisable component and a component (N) which is suitable for effecting homeotropic (vertical) alignment of the LC medium with respect to the substrate surfaces, and polymerisation of the polymerisable component, optionally with application of a voltage to the electrodes of the cell or under the action of an electric field.

Component (N) is dissolved or dispersed in a liquid crystal. It causes homeotropic alignment of the liquid crystal with respect to the substrate surfaces. It comprises particles having a mass of at least 450 Da, where the particles contain one or more organic polar anchor groups, preferably with a proportion of 50, 75, 90% by weight or more; component (N) particularly preferably consists entirely of such particles. The mass of the particles is preferably 600 Da or more and 2000 Da or less. Component (N) should be chemically inert, ageing-resistant and preferably lipophilic in order to be compatible in contact with LC media and soluble or dispersible. Suitable particles of component (N) are, for example, silsesquioxane compounds containing a polar anchor group, which can be regarded both as chemical compounds and also as nanoparticles having a size of about 1-5 nm. Alternatively, other large moieties which have a molecularly defined structure and contain a polar organic anchor group can also be used as particles here. Examples of such moieties are, for example, functionalised fullerenes, variants of silsesquioxanes, tetrasubstituted methane derivatives and other three-dimensional molecular structures having a mass as defined above. The particles can basically be organic molecules or organic/inorganic hybrid particles. The inorganic part can have a molecularly defined structure (for example PSS) or be a relatively low-order aggregation of atoms (clusters, metal nanoparticles, nanocrystals, etc.).

The particles of component (N) have a diameter greater than or equal to 1 nm, preferably a diameter of 1 to 5 nm. It is preferred for the particles of component (N) to have a side ratio $d_{max}/d_{min}$ of at most 3:1, preferably 2:1. $d_{max}$ here denotes the maximum length dimension and $d_{min}$ denotes the minimum length dimension of a non-spherical particle. In the case of rod-shaped particles, $d_{max}$ denotes the length and $d_{min}$ denotes the width or the smallest diameter. In the case of flake-form particles, $d_{max}$ denotes the diameter and $d_{min}$ denotes the thickness. The greatest length dimension should preferably be 1 nm or more, preferably 1-5 nm. For particles whose structure cannot be described fully, the average diameter is used in the assumption that the particle is approximately spherical. In this case, the average diameter should be used instead of the greatest length dimension. The same applies to statistical size distributions. The size ratios of molecular structures can be estimated with the aid of simple models or calculations of the molecular structure by assuming standard bond angles, bond lengths and van der Waals radii of the atoms involved. The size and shape of other nanoparticulate substances can be determined by scattering methods in solution or transmission electron microscopy (TEM).

The particles of component (N) are preferably employed in a concentration of less than 10% by weight, particularly preferably 8% by weight and very particularly 5% by weight. They are preferably employed in a concentration of at least 0.1% by weight, preferably at least 0.2% by weight. The use of 0.1 to 0.5% by weight of component (N) generally already results in completely homeotropic alignment of the LC layer at the usual cell thicknesses (3 to 4 µm).

The anchor group of component (N) preferably consists of a group which undergoes a non-covalent interaction with the substrate surface comprising glass or metal oxides. Suitable groups are polar groups comprising groups containing atoms selected from N, O, S and P, which are at the same time sufficiently stable. The anchor group preferably contains one or more, preferably two or more, of these heteroatoms.

The anchor group particularly preferably consists of at least two structural elements containing heteroatoms selected from (N, O) and covalent, linking structures between the heteroatoms and between one or more of the heteroatoms and the remainder of the particle (the particle without the anchor group). These covalent structures consist of chain-form or cyclic aliphatic radicals and/or aromatic rings, preferably saturated hydrocarbon chains and/or aliphatic rings. Aliphatic rings include, for example, cyclohexane and cyclopentane. Aromatic rings preferably include benzene, for example 1,4-, 1,3- or 1,2-phenylene.

Besides a hydrocarbon structure, suitable anchor groups contain, as heteroatoms, N and O, for example structural elements such as —NH$_2$, —NH— (secondary amine), tert-N (tertiary amine), =N—, —OH, —SH, —CN, —(CO)—, —O—, —S— and preferably combinations of two or more. In addition, preference is given to groups which are compatible with the LC displays and the LC medium. Excluded therefrom are generally acidic groups, such as —(CO)OH, —S(O)$_2$OH, —P(O)(OH)$_2$, etc., and ionic groups. A preferred component (N) is characterised in that the compounds or particles of component (N) have been functionalised by an anchor containing at least one, two or more primary or secondary amine functions (tert-N, —NH—, —NH$_2$), ether groups (—O—) or hydroxyl groups (—OH). There are preferably two or more of these functions in an anchor group. It is preferred here for two heterofunctions to be arranged in such a way with respect to one another that they are able to interact with an atom of a bonding partner in the manner of a bi- or multidentate chelate ligand. In a simple, illustrative case, the type and position of the amino functions corresponds to that of ethylenediamine (—NH—CH$_2$CH$_2$—NH$_2$).

In a preferred embodiment, particles of component (N) have the general formula

O-A*, in which
A* denotes the polar anchor group, and
O stands for the remaining particle without the anchor group. The remaining particle O essentially determines the size of the particle and generally the main proportion of the mass.

The anchor group A* preferably denotes a group of the formula

-Sp-[X$^2$—Z$^2$—]$_k$X$^1$        (A1), in which
Sp denotes a single bond or a spacer group, such as Sp$^a$, as defined below for formula II, preferably a spacer group Sp"-X", as defined for formula II below, which is bonded to the particle via the group X", where Sp" very particularly denotes a single bond or an alkylene having 1 to 12 C atoms,
X$^1$ denotes a group —NH$_2$, —NHR$^1$, —NR$^1_2$, —CN, —OR$^1$ or —OH, —(CO)OH, or a group of the formula

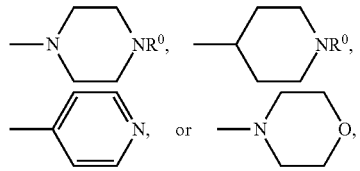

R$^0$ denotes H or alkyl having 1 to 12 C atoms,
X$^2$ in each case, independently, denotes —NH—, —NR$^1$—, —O— or a single bond,
Z$^2$ in each case, independently, denotes an alkylene group having 1-15 C atoms, carbocyclic rings having 5 or 6 C atoms (for example optionally substituted benzene, cyclohexane), or combinations of one or more rings and alkylene groups, in each of which one or more hydrogen atoms may be replaced by —OH, OR$^1$, —NH$_2$, —NHR$^1$—, —NR$^1_2$ or halogen (preferably F, Cl),
R$^1$ in each case, independently, denotes a halogenated or unsubstituted alkyl radical having 1 to 15 C atoms, where, in addition, one or more CH$_2$ groups in this radical may each be replaced, independently of one another, by —C≡C—, —CH=CH—, —(CO)O—, —O(CO)—, —(CO)— or —O— in such a way that O atoms are not linked directly to one another, and where the groups R$^1$ may be linked to one another to form ring systems,
k denotes 0 to 3.

In particular, the anchor group consists of this radical and denotes A*.

The anchor group of component (N) particularly preferably contains an (N/O)-heteroatom-containing radical of the sub-formula (A2)

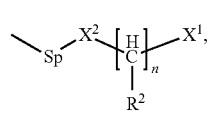        (A2)

in which Sp, X', X$^2$, R$^1$ and R$^2$ are as defined above for formula (A1), and
n denotes 1, 2 or 3.

In particular, the anchor group consists of this radical and denotes A*.

Particularly preferred nitrogen-containing anchor groups A* are selected from
—NH$_2$, —NH—(CH$_2$)$_{n3}$H, —(CH$_2$)$_n$—NH$_2$, —(CH$_2$)$_n$—NH—(CH$_2$)$_{n3}$H, —NH—(CH$_2$)$_n$—NH$_2$, —NH—(CH$_2$)$_n$—NH—(CH$_2$)$_{n3}$H, —(CH$_2$)$_{n1}$—NH—(CH$_2$)$_{n2}$—NH$_2$, —(CH$_2$)$_{n1}$—NH—(CH$_2$)$_{n2}$—NH—(CH$_2$)$_{n3}$H, —O—(CH$_2$)$_n$—NH$_2$, —(CH$_2$)$_{n1}$—O—(CH$_2$)$_n$—NH$_2$, —(CH$_2$)$_{n1}$—NH—(CH$_2$)$_{n2}$—OH, —O—(CH$_2$)$_{n1}$—NH—(CH$_2$)$_{n2}$—NH$_2$, —O—(CH$_2$)$_{n1}$—NH—(CH$_2$)$_{n2}$—OH, —(CH$_2$)$_{n1}$—NH—(CH$_2$)$_{n2}$—NH—(CH$_2$)$_{n3}$H, in which n, n1, n2 and n3 denote, independently, 1, 2, 3, 4, 5, 6, 7, 8, 9, 10, 11 or 12, in particular 1, 2, 3 or 4. The groups containing multiple heteroatoms (N, O) have a particular strength as anchor group. They can be employed in lower concentrations.

Particularly preferred nitrogen-free anchor groups A* are selected from —OH, —(CH$_2$)$_n$—OH, —O—(CH$_2$)$_n$—OH, —[O—(CH$_2$)$_{n1}$—]$_{n2}$—OH, —(CO)OH, —(CH$_2$)$_n$—(CO)OH, —O—(CH$_2$)$_n$—(CO)OH or —[O—(CH$_2$)$_{n1}$—]$_{n2}$—(CO)OH, in which n, n1 and n2 denote, independently, 1, 2, 3, 4, 5, 6, 7, 8, 9, 10, 11 or 12, in particular 1, 2, 3 or 4. These are very highly compatible with liquid-crystalline media.

The particles used may be identical to or different from one another. They may differ either through the molecular structure or through a statistical mass distribution of a nanoparticle or through isotope distributions.

In general, a particle has precisely one anchor group. However, a plurality of anchor groups are not excluded. In the case of particles which are joined together by subsequent or prior polymerisation, higher-order particles which have a plurality of anchor groups arise. Examples of this type are dimers or oligomers of polyhedral silsesquioxanes which have been functionalised by an anchor group on each PSS unit. The combination of a plurality of PSS cores takes place via organic radicals bonded at the corners. The PSS core can also be broken up and itself have a plurality of OH groups as anchors (cf. PSS-7 below). Preferred particles of component (N) have one polar anchor group, but have been passivated on the surface of the particle by hydrocarbon radicals, preferably by unfunctionalised aliphatic radicals. Preferred particles which are silsesquioxanes have the general structure PSS-0:

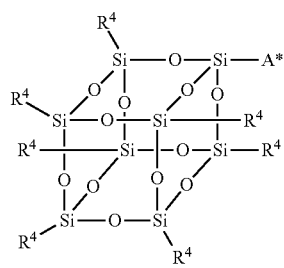

PSS-0 in which

A* denotes an anchor group as described above and below, and

R⁴ in each case, independently, denotes an optionally halogenated hydrocarbon radical, preferably an unfunctionalised or halogenated aliphatic radical, an aromatic radical (in particular benzene radical) or combinations thereof, particularly preferably an alkyl radical or an alkenyl radical, each having up to 15 C atoms, which is optionally mono- or polysubstituted by phenyl and/or halogen.

Particularly preferred particles as component (N) are selected from the following illustrative compounds, which illustrate preferred substituents:

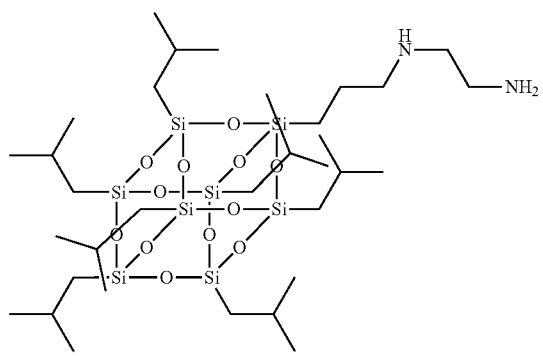

PSS-1

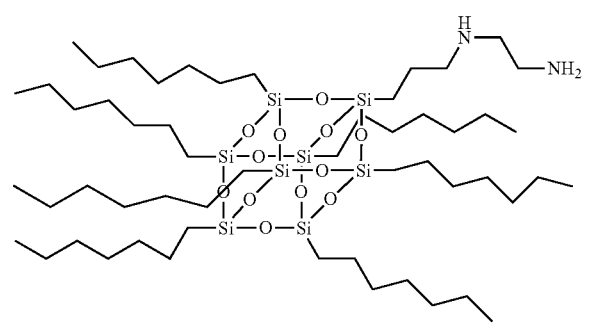

PSS-2

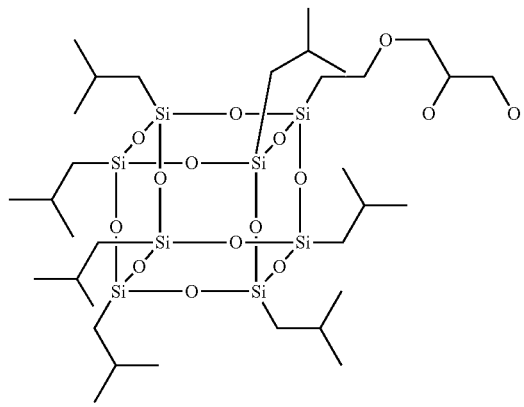

PSS-3

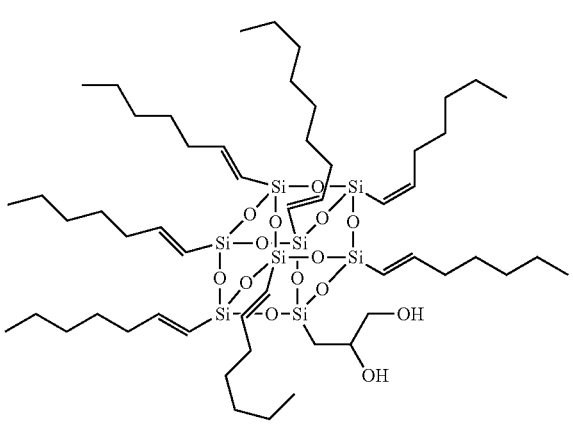

PSS-4

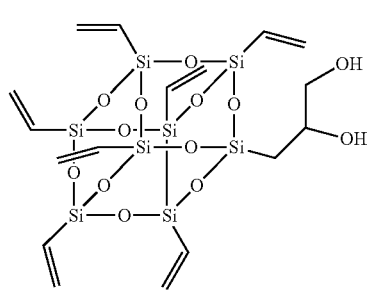

PSS-5

PSS-6

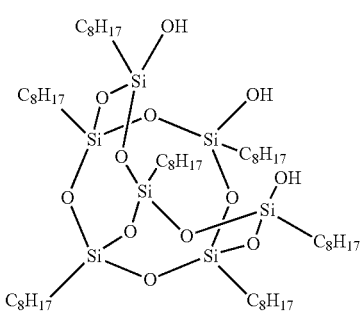

PSS-7

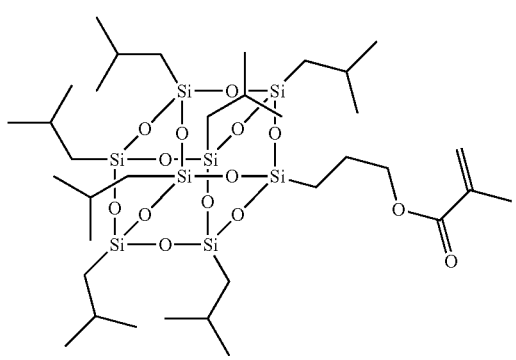

PSS-8

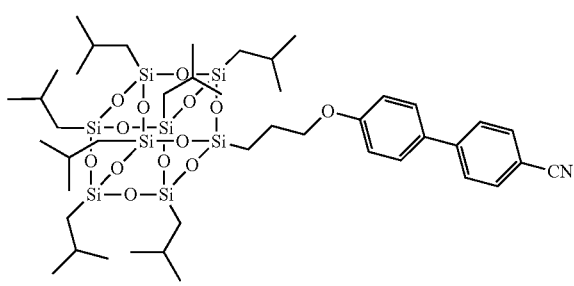

PSS-9

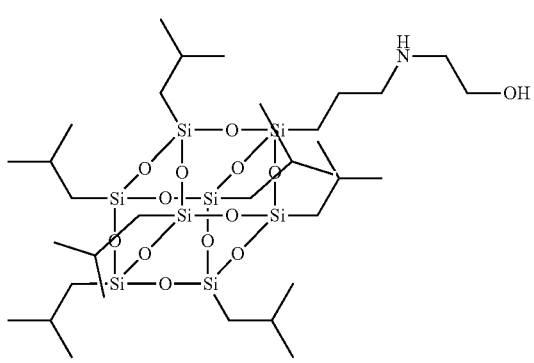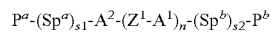

PSS-10

In a further preferred embodiment of the invention, component (N) used is particles which, besides the polar anchor, contain one or more polymerisable groups as further functionalisation (compare group $P^a$ or $P^b$ below).

Preferred polymerisable groups are groups such as acrylate, methacrylate, fluoroacrylate, oxetane, vinyloxy or epoxide groups, particularly preferably acrylate and methacrylate. The inclusion of component (N) in the polymerisation permanently immobilises the nanoparticles, due to which they retain their function.

An advantage of the LC displays according to the invention is that the display achieves the desired homeotropic alignment without the conventional polyimide alignment layer. Due to the polymer stabilisation, this alignment is also retained at elevated temperatures. Improved temperature stability of the electro-optical switching is thus achieved. The displays according to the invention are distinguished by improved response times and a better contrast ratio (pretilt angle and temperature dependence of the contrast). The polymerised component can at the same time serve as a passivation layer, which increases the reliability of the display. The small amount of component (N) has virtually no effect on the properties of the LC media, enabling a wide range of liquid-crystal components to be used in the LC display.

The LC displays according to the invention therefore preferably have no alignment layer for homeotropic alignment on the surfaces of the LC cell.

The LC displays according to the invention use an LC medium having negative dielectric anisotropy ($\Delta\epsilon<-1.5$). In general, the display is a VA display having electrodes arranged on opposite sides of the LC cell.

The LC displays are provided in a conventional manner with polariser(s), which make(s) the LC medium switching operation visible.

The polymerised component of the LC cell (polymer) is obtainable by polymerisation of a polymerisable component (monomer). In general, the monomers are firstly dissolved in the LC medium and are polymerised in the LC cell after a homeotropic alignment or a high tilt angle of the LC medium has been set. In order to support the desired alignment, a voltage can be applied to the LC cell. In the simplest case, such a voltage is superfluous, and the desired alignment arises merely through the nature of the medium and the cell geometry.

The suitable monomers (polymerisable component) of the LC medium are those from the prior art which are used for PSA-VA displays, in particular polymerisable compounds of the formula II mentioned below and/or of the formulae M1 to M22. The LC media according to the invention for use in PSA displays preferably comprise <5% by weight, particularly preferably <1% by weight and very particularly preferably <0.5% by weight of polymerisable compounds, in particular polymerisable compounds of the formulae mentioned below. In order to achieve an adequate effect, 0.2% by weight or more is preferably employed. The optimum amount is dependent on the layer thickness.

Suitable monomers of the polymerisable component of the LC medium are described by the following formula II:

$$P^a\text{-}(Sp^a)_{s1}\text{-}A^2\text{-}(Z^1\text{-}A^1)_n\text{-}(Sp^b)_{s2}\text{-}P^b \qquad \text{II}$$

in which the individual radicals have the following meanings:
$P^a$, $P^b$ each, independently of one another, denote a polymerisable group,
$Sp^a$, $Sp^b$ on each occurrence, identically or differently, denote a spacer group,
s1, s2 each, independently of one another, denote 0 or 1,
$A^1$, $A^2$ each, independently of one another, denote a radical selected from the following groups:
  a) the group consisting of trans-1,4-cyclohexylene, 1,4-cyclohexenylene and 4,4"-bicyclohexylene, in which, in addition, one or more non-adjacent $CH_2$ groups may be replaced by —O— and/or —S— and in which, in addition, one or more H atoms may be replaced by F,
  b) the group consisting of 1,4-phenylene and 1,3-phenylene, in which, in addition, one or two CH groups may be replaced by N and in which, in addition, one or more H atoms may be replaced by L,
  c) the group consisting of tetrahydropyran-2,5-diyl, 1,3-dioxane-2,5-diyl, tetrahydrofuran-2,5-diyl, cyclobut-1, 3-diyl, piperidine-1,4-diyl, thiophene-2,5-diyl and selenophene-2,5-diyl, each of which may also be mono- or polysubstituted by L, d) the group consisting of saturated, partially unsaturated or fully unsaturated, and optionally substituted, polycyclic radicals having 5 to 20 cyclic C atoms, one or more of which may, in addition, be replaced by heteroatoms, preferably selected from the group consisting of bicyclo[1.1.1]pentane-1,3-diyl, bicyclo[2.2.2]octane-1,4-diyl, spiro[3.3]heptane-2,6-diyl,

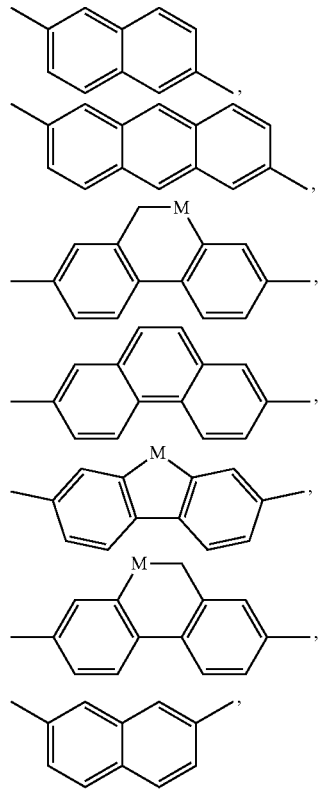

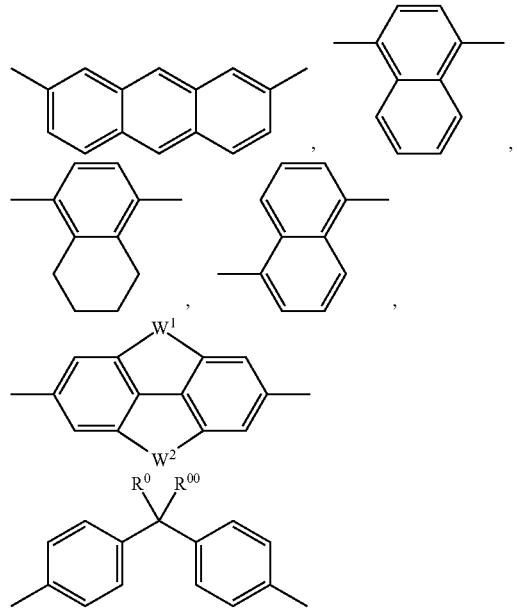

where, in addition, one or more H atoms in these radicals may be replaced by L, and/or one or more double bonds may be replaced by single bonds, and/or one or more CH groups may be replaced by N, n denotes 0, 1, 2 or 3, $Z^1$ in each case, independently of one another, denote —CO—O—, —O—CO—, —CH$_2$O—, —OCH$_2$—, —CF$_2$O—, —OCF$_2$—, or —(CH$_2$)$_n$—, where n is 2, 3 or 4, —O—, —CO—, —C(R$^y$R$^z$)—, —CH$_2$CF$_2$—, —CF$_2$CF$_2$— or a single bond, L on each occurrence, identically or differently, denotes F, Cl, CN, SCN, SF$_5$ or straight-chain or branched, in each case optionally fluorinated, alkyl, alkoxy, alkylcarbonyl, alkoxycarbonyl, alkylcarbonyloxy or alkoxycarbonyloxy having 1 to 12 C atoms, $R^0$, $R^{00}$ each, independently of one another, denote H, F or straight-chain or branched alkyl having 1 to 12 C atoms, in which, in addition, one or more H atoms may be replaced by F, M denotes —O—, —S—, —CH$_2$—, —CHY$^1$— or —CY$^1$Y$^2$—, and Y$^1$, and Y$^2$ each, independently of one another, have one of the meanings indicated above for $R^0$ or denote Cl or CN, and preferably H, F, Cl, CN, OCF$_3$ or CF$_3$, W$^1$, W$^2$ each, independently of one another, denote —CH$_2$CH$_2$—, —CH=CH—, —CH$_2$—O—, —O—CH$_2$—, —C(R$^c$R$^d$)— or —O—, R$^c$ and R$^d$ each, independently of one another, denote H or alkyl having 1 to 6 C atoms, preferably H, methyl or ethyl.

The polymerisable group P$^{a,b}$ is a group which is suitable for a polymerisation reaction, such as, for example, free-radical or ionic chain polymerisation, polyaddition or polycondensation, or for a polymer-analogous reaction, for example addition or condensation onto a main polymer chain. Particular preference is given to groups for chain polymerisation, in particular those containing a C=C double bond or —C≡C— triple bond, and groups which are suitable for polymerisation with ring opening, such as, for example, oxetane or epoxide groups.

Preferred groups P$^{a,b}$ are selected from the group consisting of CH$_2$=CW$^1$—CO—O—, CH$_2$=CW$^1$—CO—,

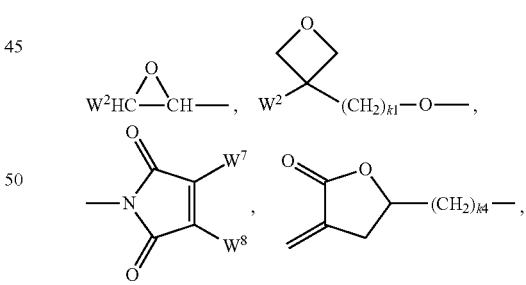

CH$_2$=CW$^2$—(O)$_{k3}$—, CW$^1$=CH—CO—(O)$_{k3}$—, CW$^1$=CH—CO—NH—, CH$_2$=CW$^1$—CO—NH—, CH$_3$—CH=CH—O—, (CH$_2$=CH)$_2$CH—OCO—, (CH$_2$=CH—CH$_2$)$_2$CH—OCO—, (CH$_2$=CH)$_2$CH—O—, (CH$_2$=CH—CH$_2$)$_2$N—, (CH$_2$=CH—CH$_2$)$_2$N—CO—, HO—CW$^2$W$^3$—, HS—CW$^2$W$^3$—, HW$^2$N—, HO—CW$^2$W$^3$—NH—, CH$_2$=CW$^1$—CO—NH—, CH$_2$=CH—(COO)$_{k1}$-Phe-(O)$_{k2}$—, CH$_2$=CH—(CO)$_{k1}$-Phe(O)$_{k2}$—, Phe-CH=CH—, HOOC—, OCN— and W$^4$W$^5$W$^6$Si—, in which W$^1$ denotes H, F, Cl, CN, CF$_3$, phenyl or alkyl having 1 to 5 C atoms, in particular H, F, Cl or CH$_3$, W$^2$ and W$^3$ each, independently of one another, denote H or alkyl having 1 to 5 C atoms, in particular H, methyl, ethyl or n-propyl, $W^4$, $W^5$ and $W^6$ each, independently of one another, denote Cl, oxaalkyl or oxacarbonylalkyl having 1 to 5 C atoms, $W^7$ and $W^8$ each, independently of one another, denote H, Cl or alkyl having 1 to 5 C atoms, Phe denotes 1,4-phenylene, which is optionally substituted by one or more radicals L as defined above which are other than P-Sp-, $k_1$, $k_2$ and $k_3$ each, independently of one another, denote 0 or 1, $k_3$ preferably denotes 1, and $k_4$ denotes an integer from 1 to 10.

Particularly preferred groups $P^{a,b}$ are selected from the group consisting of $CH_2=CW^1-CO-O-$, $CH_2=CW^1-CO-$,

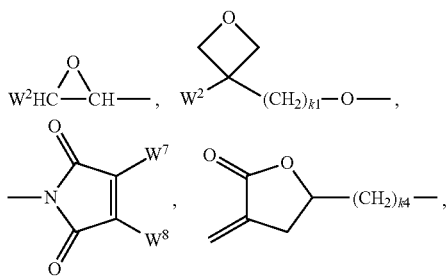

$CH_2=CW^2-O-$, $CW^1=CH-CO-(O)_{k3}-$, $CW^1=CH-CO-NH-$, $CH_2=CW^1-CO-NH-$, $(CH_2=CH)_2CH-OCO-$, $(CH_2=CH-CH_2)_2CH-OCO-$, $(CH_2=CH)_2CH-O-$, $(CH_2=CH-CH_2)_2N-$, $(CH_2=CH-CH_2)_2N-CO-$, $CH_2=CW^1-CO-NH-$, $CH_2=CH-(COO)_{k1}-Phe-(O)_{k2}-$, $CH_2=CH-(CO)_{k1}-Phe-(O)_{k2}-$, Phe-CH=CH— and $W^4W^5W^6Si-$, in which $W^1$ denotes H, F, Cl, CN, $CF_3$, phenyl or alkyl having 1 to 5 C atoms, in particular H, F, Cl or $CH_3$, $W^2$ and $W^3$ each, independently of one another, denote H or alkyl having 1 to 5 C atoms, in particular H, methyl, ethyl or n-propyl, $W^4$, $W^5$ and $W^6$ each, independently of one another, denote Cl, oxaalkyl or oxacarbonylalkyl having 1 to 5 C atoms, $W^7$ and $W^8$ each, independently of one another, denote H, Cl or alkyl having 1 to 5 C atoms, Phe denotes 1,4-phenylene, $k_1$, $k_2$ and $k_3$ each, independently of one another, denote 0 or 1, $k_3$ preferably denotes 1, and $k_4$ denotes an integer from 1 to 10.

Very particularly preferred groups $P^{a,b}$ are selected from the group consisting of $CH_2=CW^1-CO-O-$, in particular $CH_2=CH-CO-O-$, $CH_2=C(CH_3)-CO-O-$ and $CH_2=CF-CO-O-$, furthermore $CH_2=CH-O-$, $(CH_2=CH)_2CH-O-CO-$, $(CH_2=CH)_2CH-O-$,

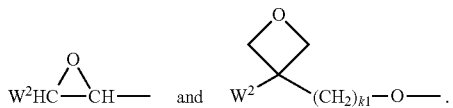

Very particularly preferred groups $P^{a,b}$ are therefore selected from the group consisting of acrylate, methacrylate, fluoroacrylate, furthermore vinyloxy, chloroacrylate, oxetane and epoxide groups, and of these preferably an acrylate or methacrylate group.

Preferred spacer groups $Sp^{a,b}$ are selected from the formula $Sp''-X''$, so that the radical $P^{a/b}-Sp^{a/b}-$ conforms to the formula $P^{a/b}-Sp''-X''-$, where Sp" denotes alkylene having 1 to 20, preferably 1 to 12, C atoms, which is optionally mono- or polysubstituted by F, Cl, Br, I or CN and in which, in addition, one or more non-adjacent $CH_2$ groups may each be replaced, independently of one another, by $-O-$, $-S-$, $-NH-$, $-N(R^0)-$, $-Si(R^{00}R^{000})-$, $-CO-$, $-CO-O-$, $-O-CO-$, $-O-CO-O-$, $-S-CO-$, $-CO-S-$, $-N(R^{00})-CO-O-$, $-O-CO-N(R^{00})-$, $-N(R^{00})-CO-N(R^{00})-$, $-CH=CH-$ or $-C\equiv C-$ in such a way that O and/or S atoms are not linked directly to one another, X" denotes $-O-$, $-S-$, $-CO-$, $-CO-O-$, $-O-CO-$, $-O-CO-O-$, $-CO-N(R^{00})-$, $-N(R^{00})-CO-$, $-N(R^{00})-CO-N(R^{00})-$, $-OCH_2-$, $-CH_2O-$, $-SCH_2-$, $-CH_2S-$, $-CF_2O-$, $-OCF_2-$, $-CF_2S-$, $-SCF_2$, $-CF_2CH_2-$, $-CH_2CF_2-$, $-CF_2CF_2-$, $-CH=N-$, $-N=CH-$, $-N=N-$, $-CH=CR^0-$, $-CY^2=CY^3-$, $-C\equiv C-$, $-CH=CH-CO-O-$, $-O-CO-CH=CH-$ or a single bond, $R^{00}$ and $R^{000}$ each, independently of one another, denote H or alkyl having 1 to 12 C atoms, and $Y^2$ and $Y^3$ each, independently of one another, denote H, F, Cl or CN.

X' is preferably $-O-$, $-S-$, $-CO-$, $-COO-$, $-COO-$, $-O-COO-$, $-CO-NR^0-$, $-NR^0-CO-$, $-NR^0-CO-NR^0-$ or a single bond.

Typical spacer groups Sp" are, for example, $-(CH_2)_{p1}-$, $-(CH_2CH_2O)_{q1}-CH_2CH_2-$, $-CH_2CH_2-S-CH_2CH_2-$, $-CH_2CH_2-NH-CH_2CH_2-$ or $-(SiR^{00}R^{000}-O)_{p1}-$, in which p1 is an integer from 1 to 12, q1 is an integer from 1 to 3, and $R^{00}$ and $R^{000}$ have the meanings indicated above.

Particularly preferred groups $-Sp''-X''-$ are $-(CH_2)_{p1}-$, $-(CH_2)_{p1}-O-$, $-(CH_2)_{p1}-O-CO-$, $-(CH_2)_{p1}-O-CO-O-$, in which p1 and q1 have the meanings indicated above.

Particularly preferred groups Sp" are, for example, in each case straight-chain ethylene, propylene, butylene, pentylene, hexylene, heptylene, octylene, nonylene, decylene, undecylene, dodecylene, octadecylene, ethyleneoxyethylene, methyleneoxybutylene, ethylenethioethylene, ethylene-N-methyliminoethylene, 1-methylalkylene, ethenylene, propenylene and butenylene.

Particularly preferred monomers are the following:

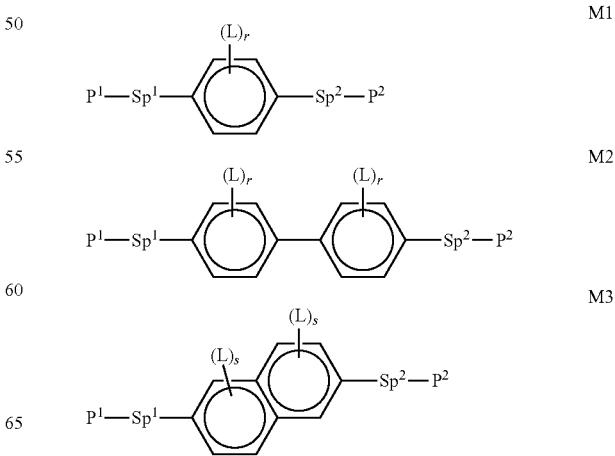

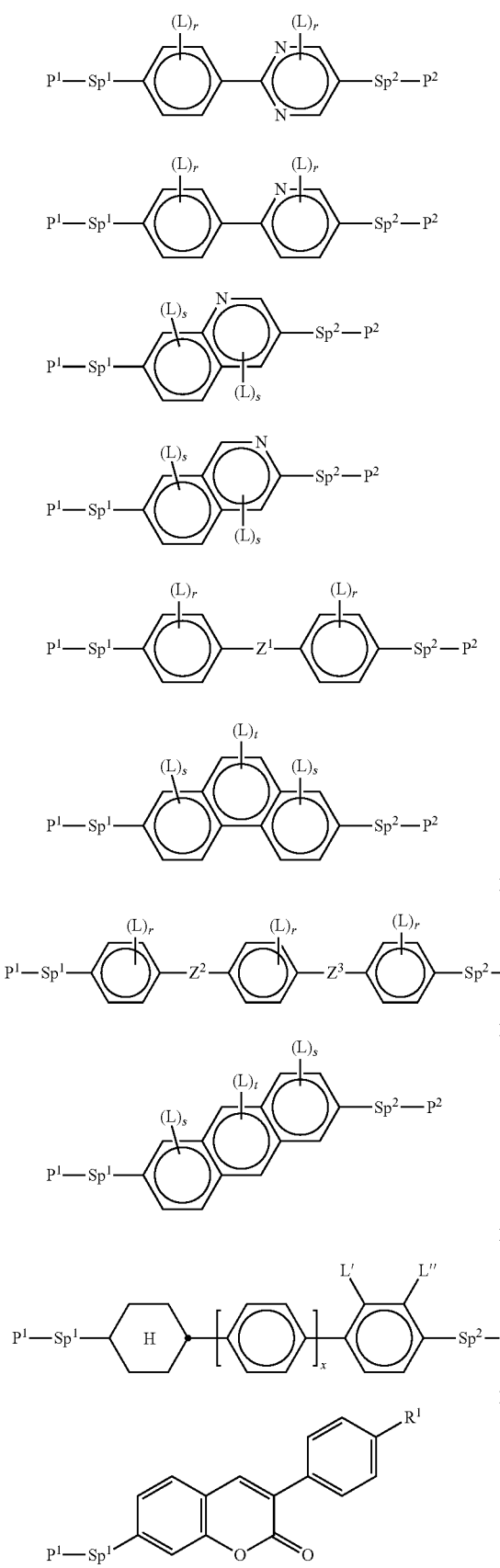
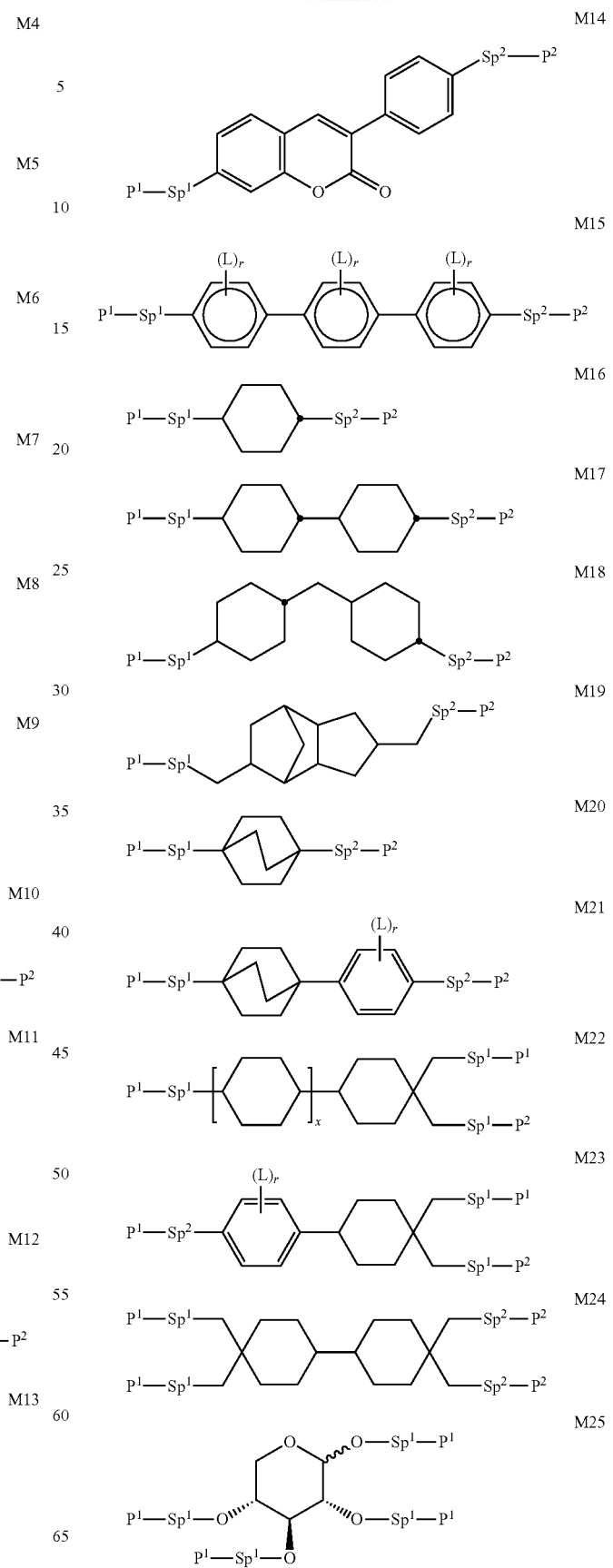

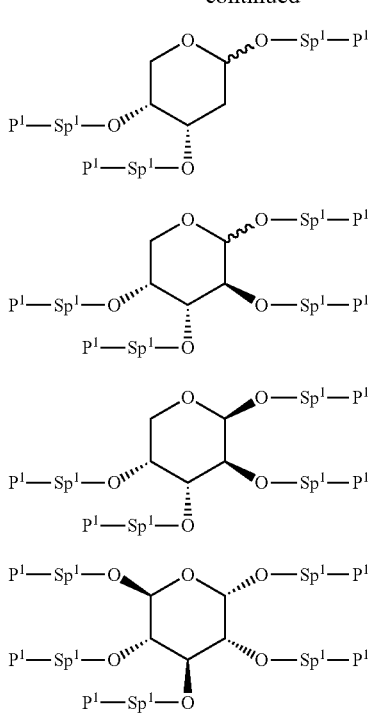

in which the individual radicals have the following meanings:
P¹ and P² each, independently of one another, denote a polymerisable group as defined for formula II, preferably an acrylate, methacrylate, fluoroacrylate, oxetane, vinyloxy or epoxide group,
Sp¹ and Sp² each, independently of one another, denote a single bond or a spacer group, preferably having one of the meanings indicated above and below for Sp$^a$, and particularly preferably denote —(CH$_2$)$_{p1}$—, —(CH$_2$)$_{p1}$—O—, —(CH$_2$)$_{p1}$—CO—O— or —(CH$_2$)$_{p1}$—O—CO—O—, in which p1 is an integer from 1 to 12, and where the linking to the adjacent ring in the last-mentioned groups takes place via the O atom,
where, in addition, one or more of the radicals P¹-Sp¹- and P²-Sp²- may denote a radical R$^{aa}$, with the proviso that at least one of the radicals P¹-Sp¹- and P²-Sp²- present does not denote R$^{aa}$,
R$^{aa}$ denotes H, F, Cl, CN or straight-chain or branched alkyl having 1 to 25 C atoms, in which, in addition, one or more non-adjacent CH$_2$ groups may each be replaced, independently of one another, by C(R⁰)=C(R⁰⁰)—, —C≡C—, —N(R⁰)—, —O—, —S—, —CO—, —CO—O—, —O—CO—, —O—CO—O— in such a way that O and/or S atoms are not linked directly to one another, and in which, in addition, one or more H atoms may be replaced by F, Cl, CN or P¹-Sp¹-, particularly preferably straight-chain or branched, optionally mono- or polyfluorinated alkyl, alkoxy, alkenyl, alkynyl, alkylcarbonyl, alkoxycarbonyl or alkylcarbonyloxy having 1 to 12 C atoms (where the alkenyl and alkynyl radicals have at least two C atoms and the branched radicals
R⁰, R⁰⁰ each, independently of one another, denote H or alkyl having 1 to 12 C atoms,
R$^y$ and R$^z$ each, independently of one another, denote H, F, CH$_3$ or CF$_3$,
Z¹ denotes —O—, —CO—, —C(R$^y$R$^z$)— or —CF$_2$CF$_2$—, Z² and Z³ each, independently of one another, denote —CO—O—, —O—CO—, —CH$_2$O—, —OCH$_2$—, —CF$_2$O—, —OCF$_2$— or —(CH$_2$)$_n$—, where n is 2, 3 or 4,
L on each occurrence, identically or differently, denotes F, Cl, CN, SCN, SF$_5$ or straight-chain or branched, optionally mono- or polyfluorinated alkyl, alkoxy, alkenyl, alkynyl, alkylcarbonyl, alkoxycarbonyl, alkylcarbonyloxy or alkoxycarbonyloxy having 1 to 12 C atoms, preferably F,
L' and L" each, independently of one another, denote H, F or Cl,
r denotes 0, 1, 2, 3 or 4,
s denotes 0, 1, 2 or 3,
t denotes 0, 1 or 2, and
x denotes 0 or 1.

The LC medium or the polymerisable component preferably comprises one or more compounds selected from the group of the formulae M1-M21, particularly preferably from the group of the formulae M2-M9 and very particularly preferably from the group of the formulae M2, M16, M17 and M18.

The LC medium or the polymerisable component preferably comprises no compounds of the formula M10 in which Z² and Z³ denote —(CO)O— or —O(CO)—.

For the production of PSA displays, the polymerisable compounds are polymerised or crosslinked (if a polymerisable compound contains two or more polymerisable groups) by in-situ polymerisation in the LC medium between the substrates of the LC display, optionally with application of a voltage. The polymerisation can be carried out in one step. It is also possible firstly to carry out the polymerisation with application of a voltage in a first step in order to produce a pretilt angle, and subsequently, in a second polymerisation step, to polymerise or crosslink the compounds which have not fully reacted in the first step without an applied voltage ("end curing").

Suitable and preferred polymerisation methods are, for example, thermal or photopolymerisation, preferably photopolymerisation, in particular UV photopolymerisation. One or more initiators can optionally also be added here. Suitable conditions for the polymerisation and suitable types and amounts of initiators are known to the person skilled in the art and are described in the literature. Suitable for free-radical polymerisation are, for example, the commercially available photoinitiators Irgacure651®, Irgacure184®, Irgacure907®, Irgacure369® or Darocure1173® (Ciba AG). If an initiator is employed, its proportion is preferably 0.001 to 5% by weight, particularly preferably 0.001 to 1% by weight.

The polymerisable compounds according to the invention are also suitable for polymerisation without an initiator, which is associated with considerable advantages, such as, for example, lower material costs and, in particular, reduced contamination of the LC medium by possible residual amounts of the initiator or degradation products thereof. The polymerisation can thus also be carried out without addition of an initiator. The LC medium thus, in a preferred embodiment, comprises no polymerisation initiator.

The polymerisable component or the LC medium may also comprise one or more stabilisers in order to prevent undesired spontaneous polymerisation of the RMs, for example during storage or transport. Suitable types and amounts of stabilisers are known to the person skilled in the art and are described in the literature. Particularly suitable are, for example, the commercially available stabilisers from the Irganox® series (Ciba AG), such as, for example, Irganox® 1076. If stabilisers are employed, their proportion, based on the total amount of the RMs or the polymerisable component, is preferably 10-10,000 ppm, particularly preferably 50-500 ppm.

Besides the polymerisable compounds described above and component (N), the LC media for use in the LC displays according to the invention comprise an LC mixture ("host mixture") comprising one or more, preferably two or more, low-molecular-weight (i.e. monomeric or unpolymerised) compounds. The latter are stable or unreactive with respect to a polymerisation reaction under the conditions used for the polymerisation of the polymerisable compounds. In principle, a suitable host mixture is any dielectrically negative LC mixture which is suitable for use in conventional VA displays.

Suitable LC mixtures are known to the person skilled in the art and are described in the literature. LC media for VA displays are described in EP 1 378 557 A1.

Preferred embodiments of the liquid-crystalline medium according to the invention are indicated below:
a) LC medium which additionally comprises one or more compounds selected from the group of the compounds of the formulae IIIA, IIIB and IIIC,

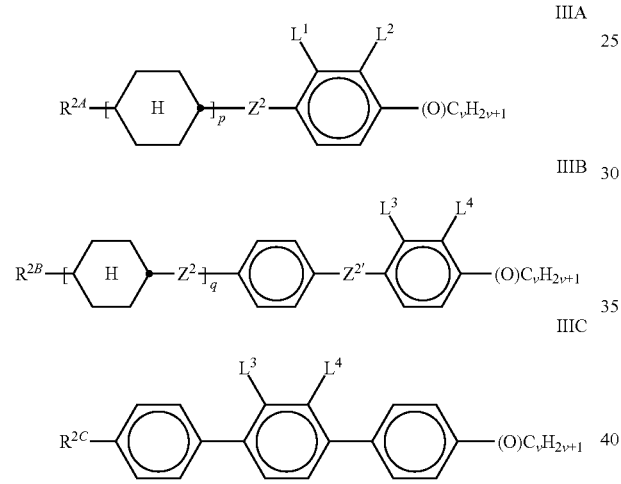

in which
R$^{2A}$, R$^{2B}$ and R$^{2C}$ each, independently of one another, denote H, an alkyl radical having up to 15 C atoms which is unsubstituted, monosubstituted by CN or CF$_3$ or at least monosubstituted by halogen, where, in addition, one or more CH$_2$ groups in these radicals may be replaced by —O—, —S—, —C≡C—, —CF$_2$O—, —OCF$_2$—, —OC—O— or —O—CO— in such a way that O atoms are not linked directly to one another, L$^{1-4}$ each, independently of one another, denote F, Cl, CF$_3$ or CHF$_2$, Z$^2$ and Z$^{2'}$ each, independently of one another, denote a single bond, —CH$_2$CH$_2$—, —CH=CH—, —CF$_2$O—, —OCF$_2$—, —CH$_2$O—, —OCH$_2$—, —COO—, —COO—, —C$_2$F$_4$—, —CF=CF—, —CH=CHCH$_2$O—, p denotes 1 or 2, q denotes 0 or 1, and v denotes 1 to 6.

In the compounds of the formulae IIIA and IIIB, Z$^2$ can have identical or different meanings. In the compounds of the formula IIIB, Z$^2$ and Z$^{2'}$ can have identical or different meanings.

In the compounds of the formulae IIIA, IIIB and IIIC, R$^{2A}$, R$^{2B}$ and R$^{2C}$ each preferably denote alkyl having 1-6 C atoms, in particular CH$_3$, C$_2$H$_5$, n-C$_3$H$_7$, n-C$_4$H$_9$, n-C$_5$H$_{11}$.

In the compounds of the formulae IIIA and IIIB, L$^1$, L$^2$, L$^3$ and L$^4$ preferably denote L$^1$=L$^2$=F and L$^3$=L$^4$=F, furthermore L$^1$=F and L$^2$=Cl, L$^1$=Cl and L$^2$=F, L$^3$=F and L$^4$=Cl, L$^3$=Cl and L$^4$=F. Z$^2$ and Z$^{2'}$ in the formulae IIIA and IIIB preferably each, independently of one another, denote a single bond, furthermore a —C$_2$H$_4$— bridge.

If Z$^2$=—C$_2$H$_4$— in the formula IIIB, Z$^{2'}$ is preferably a single bond, or if Z$^{2'}$=—C$_2$H$_4$—, Z$^2$ is preferably a single bond. In the compounds of the formulae IIIA and IIIB, (O)C$_v$H$_{2v+1}$ preferably denotes OC$_v$H$_{2v+1}$, furthermore C$_v$H$_{2v+1}$. In the compounds of the formula IIIC, (O)C$_v$H$_{2v+1}$ preferably denotes C$_v$H$_{2v+1}$. In the compounds of the formula IIIC, L$^3$ and L$^4$ preferably each denote F.

Preferred compounds of the formulae IIIA, IIIB and IIIC are shown below:

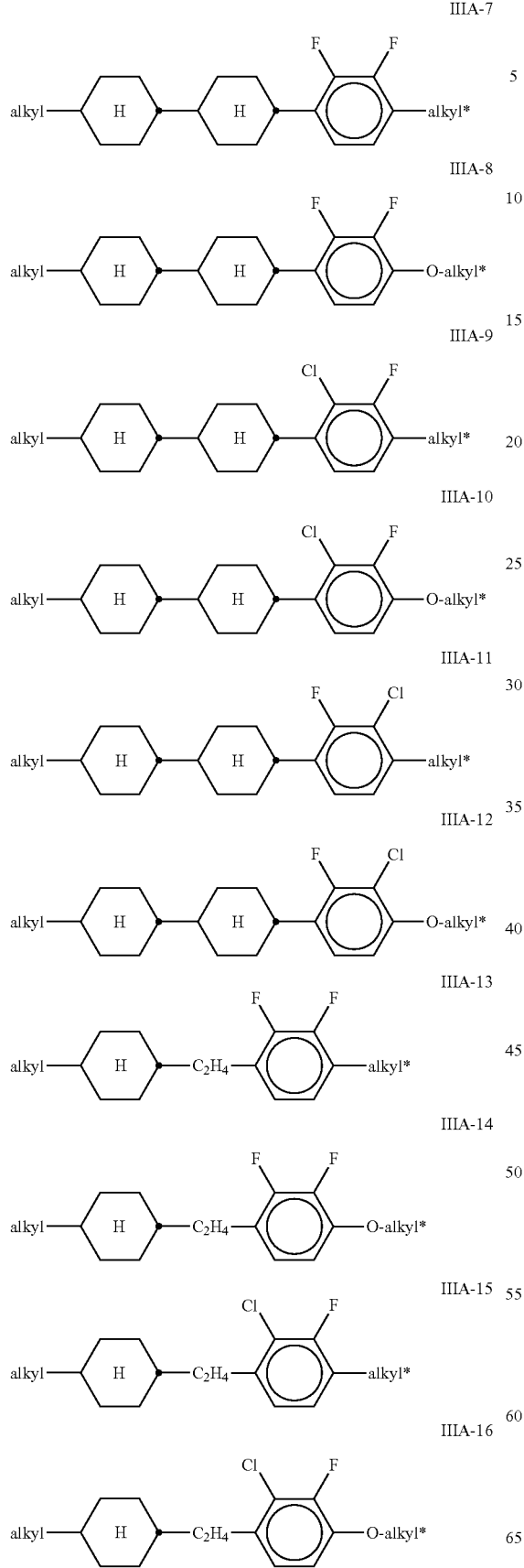
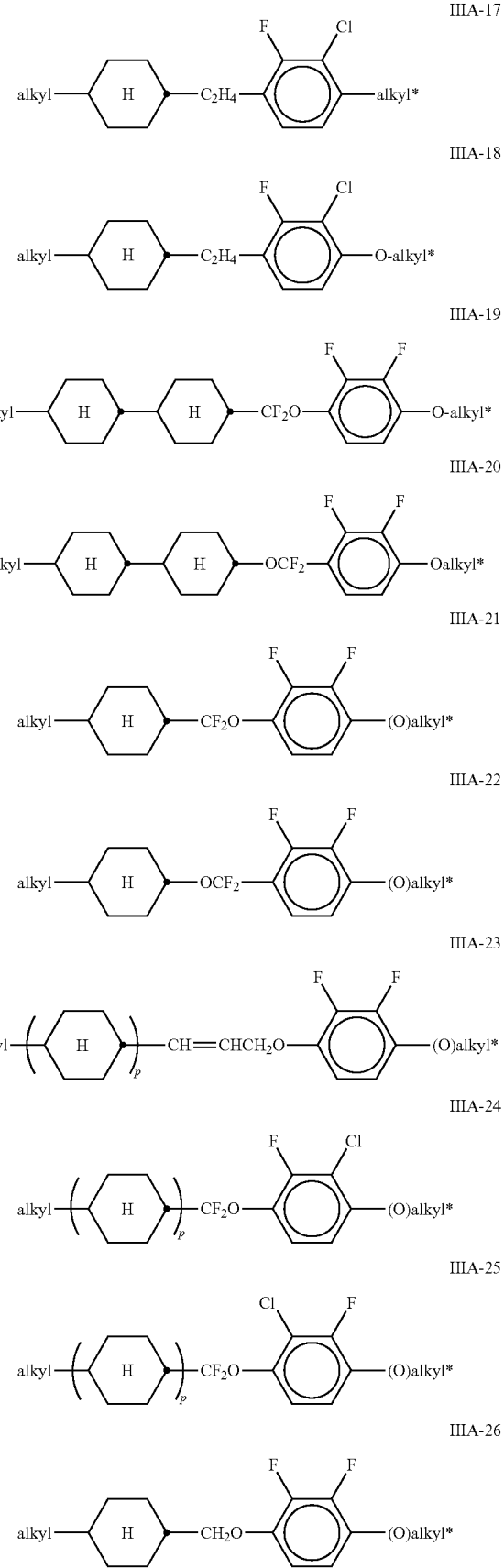

IIIA-27
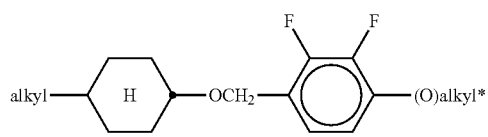
IIIA-28
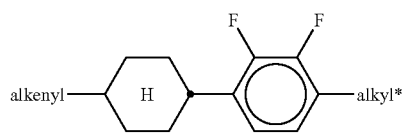
IIIA-29
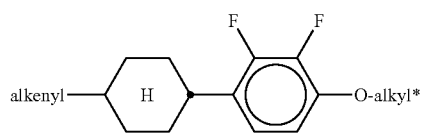
IIIA-30
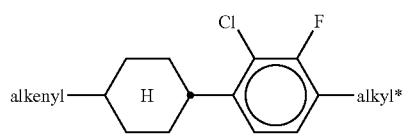
IIIA-31
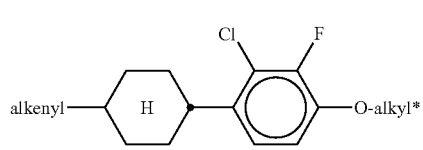
IIIA-32
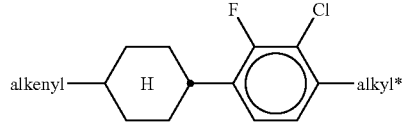
IIIA-33
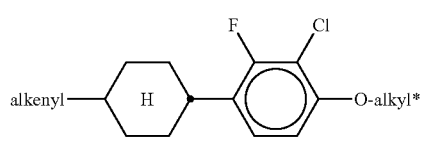
IIIA-34
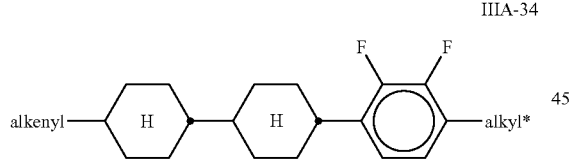
IIIA-35
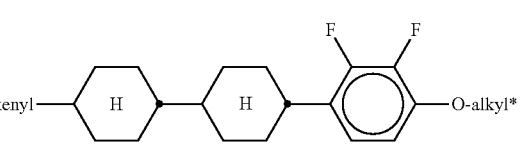
IIIA-36
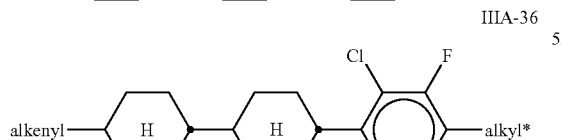
IIIA-37
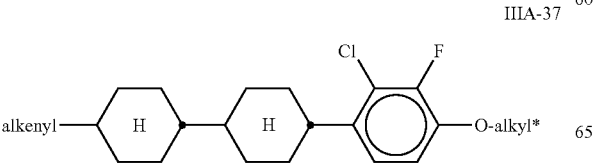
IIIA-38
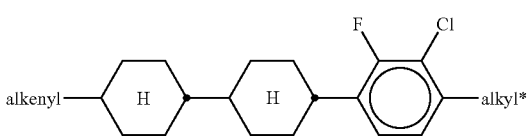
IIIA-39
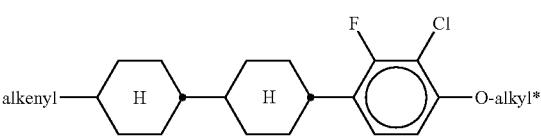
IIIA-40
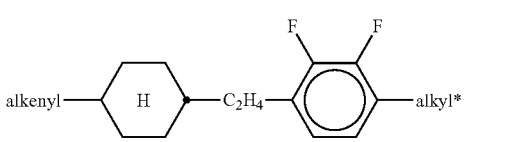
IIIA-41
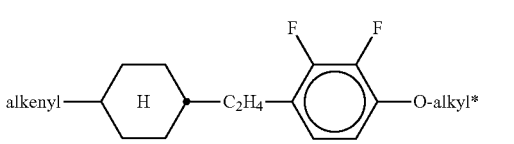
IIIB-1
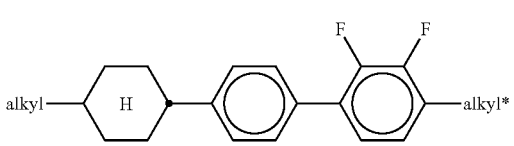
IIIB-2
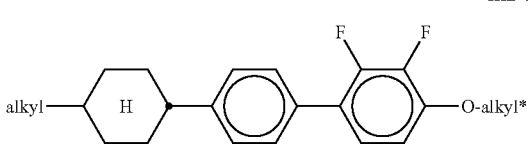
IIIB-3
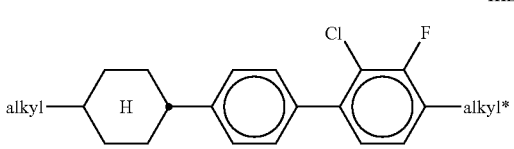
IIIB-4
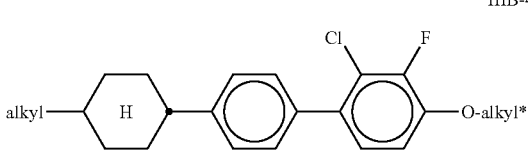
IIIB-5
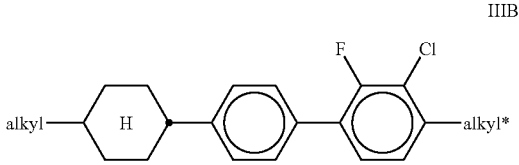
IIIB-6
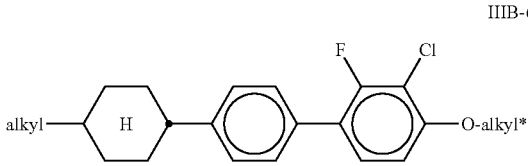

-continued

IIIB-7
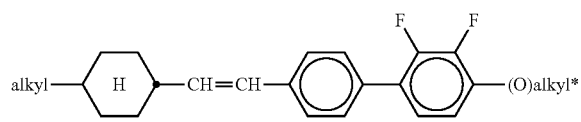

IIIB-8
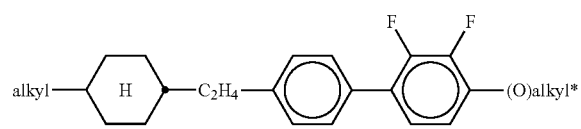

IIIB-9
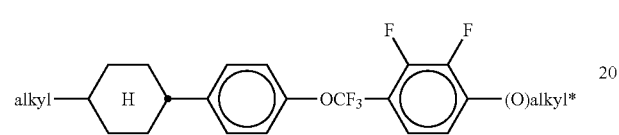

IIIB-10
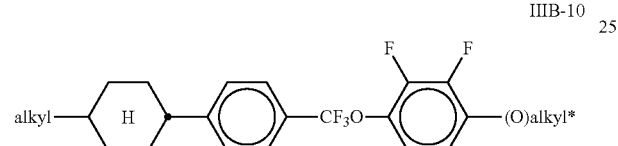

II-B-11
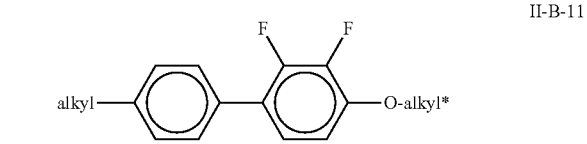

II-B-12
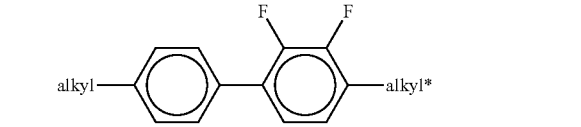

II-B-13
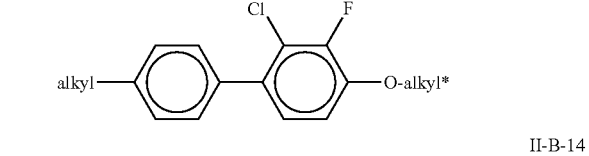

II-B-14
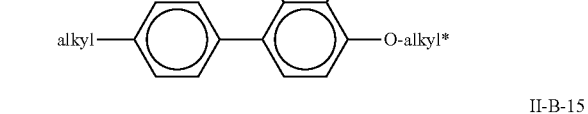

II-B-15
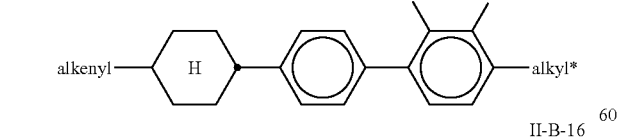

II-B-16
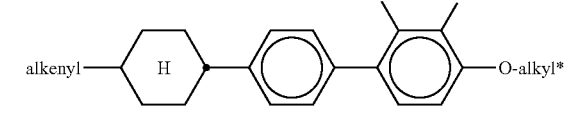

-continued

II-C-1
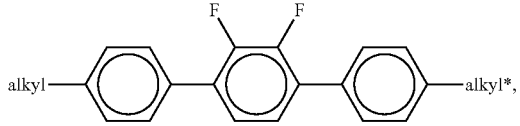

in which alkyl and alkyl* each, independently of one another, denote a straight-chain alkyl radical having 1-6 C atoms.

Particularly preferred mixtures according to the invention comprise one or more compounds of the formulae IIIA-2, IIIA-8, IIIA-14, IIIA-29, IIIA-35, IIIB-2, IIIB-11, IIIB-16 and IIIC-1.

The proportion of compounds of the formulae IIIA and/or IIIB in the mixture as a whole is preferably at least 20% by weight.

Particularly preferred media according to the invention comprise at least one compound of the formula IIIC-1, IIIC-1
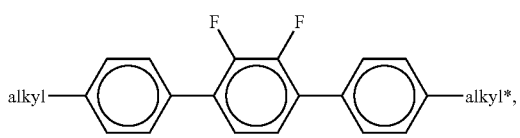

in which alkyl and alkyl* have the meanings indicated above, preferably in amounts of >3% by weight, in particular >5% by weight and particularly preferably 5-25% by weight.

b) LC medium which additionally comprises one or more compounds of the following formula:

ZK
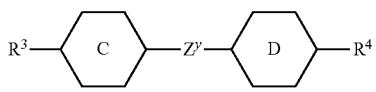

in which the individual radicals have the following meanings:

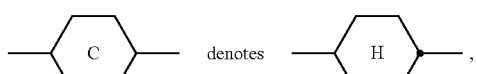
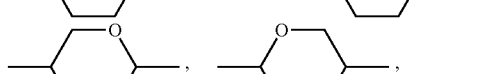
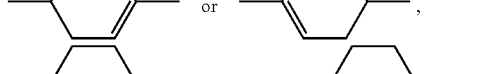
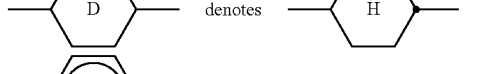

$R^3$ and $R^4$ each, independently of one another, denote alkyl having 1 to 12 C atoms, in which, in addition, one or two non-adjacent CH$_2$ groups may be replaced by —O—, —CH=CH—, —CO—, —O—CO— or —CO—O— in such a way that O atoms are not linked directly to one another, Z$^y$ denotes —CH$_2$CH$_2$—, —CH=CH—, —CF$_2$O—, —OCF$_2$—, —CH$_2$O—, —OCH$_2$—, —CO—O—, —O—CO—, —C$_2$F$_4$—, —CF=CF—, —CH=CH—CH$_2$O— or a single bond, preferably a single bond.

The compounds of the formula ZK are preferably selected from the group consisting of the following sub-formulae:

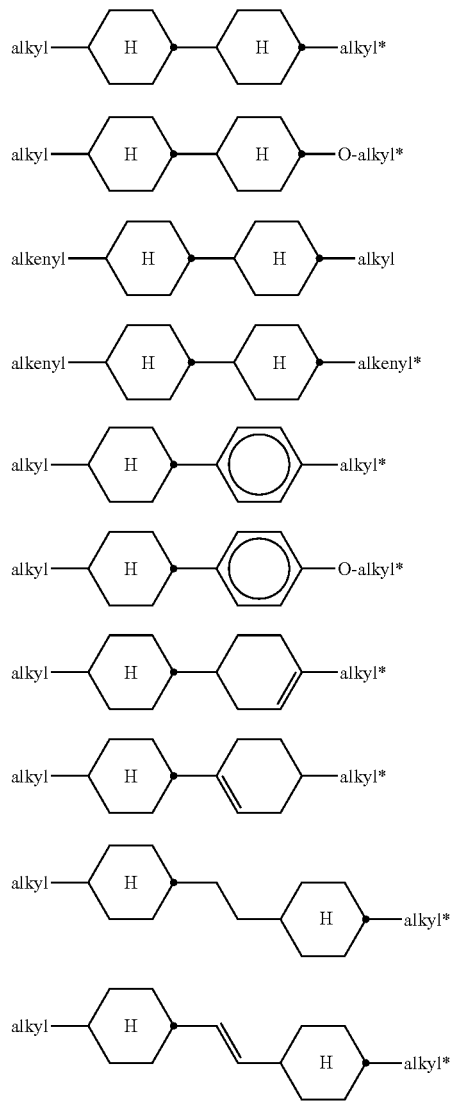

in which alkyl and alkyl* each, independently of one another, denote a straight-chain alkyl radical having 1-6 C atoms, and alkenyl and alkenyl* denote a straight-chain alkenyl radical having 2-6 C atoms. Alkenyl preferably denotes CH$_2$=CH—, CH$_2$=CHCH$_2$CH$_2$—, CH$_3$—CH=CH—, CH$_3$—CH$_2$—CH=CH—, CH$_3$—(CH$_2$)$_2$—CH=CH—, CH$_3$—(CH$_2$)$_3$—CH=CH— or CH$_3$—CH=CH—(CH$_2$)$_2$—.

c) LC medium which additionally comprises one or more compounds of the following formula:

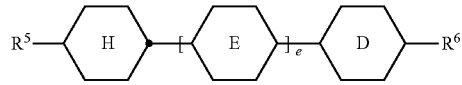

in which the individual radicals on each occurrence, identically or differently, have the following meanings:

R$^5$ and R$^6$ each, independently of one another, have one of the meanings indicated above for R$^{3/4}$,

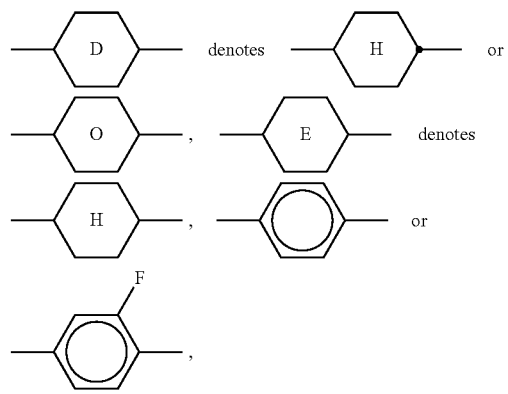

and e denotes 1 or 2.

The compounds of the formula DK are preferably selected from the group consisting of the following sub-formulae:

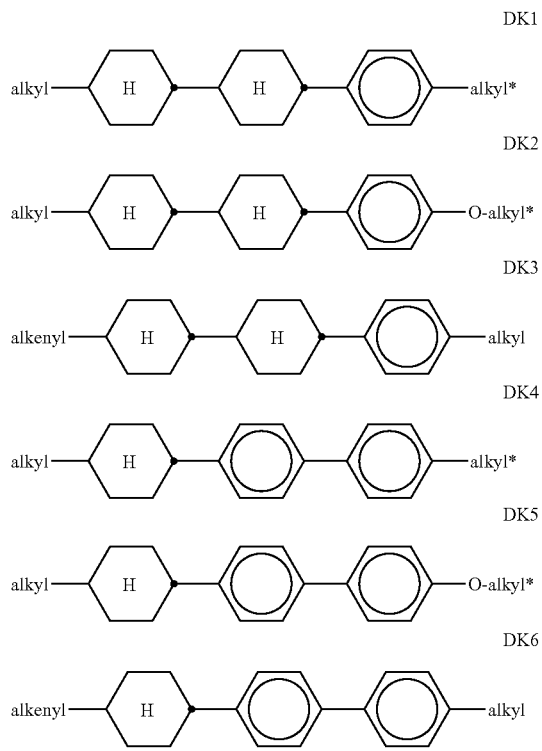

-continued

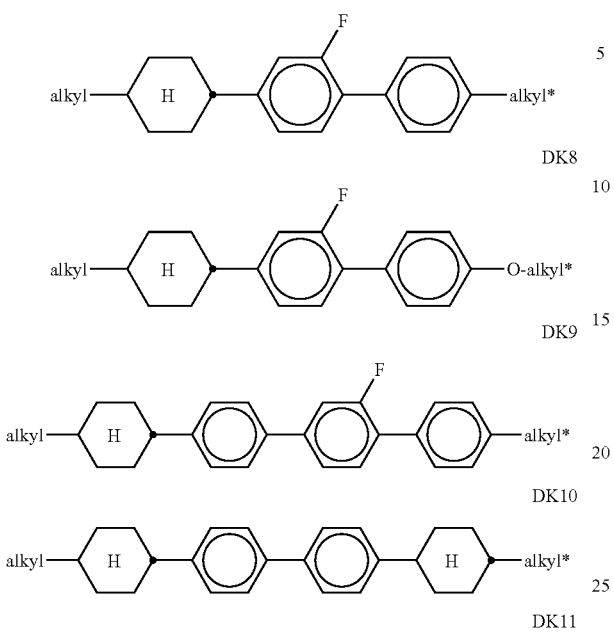

DK7, DK8, DK9, DK10, DK11 in which alkyl and alkyl* each, independently of one another, denote a straight-chain alkyl radical having 1-6 C atoms, and alkenyl and alkenyl* each, independently of one another, denote a straight-chain alkenyl radical having 2-6 C atoms. Alkenyl and alkenyl* preferably denote $CH_2=CH-$, $CH_2=CHCH_2CH_2-$, $CH_3-CH=CH-$, $CH_3-CH_2-CH=CH-$, $CH_3-(CH_2)_2-CH=CH-$, $CH_3-(CH_2)_3-CH=CH-$ or $CH_3-CH=CH-(CH_2)_2-$.

d) LC medium which additionally comprises one or more compounds of the following formula:

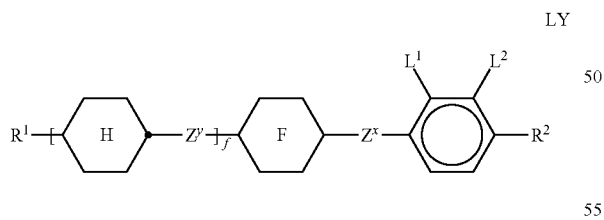

LY in which the individual radicals have the following meanings:

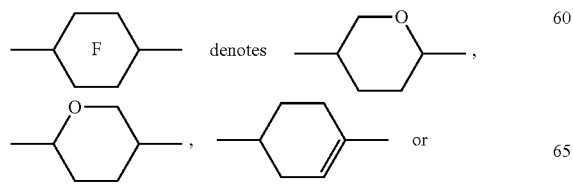

-continued

f denotes 0 or 1, $R^1$ and $R^2$ each, independently of one another, denote alkyl having 1 to 12 C atoms, where, in addition, one or two non-adjacent $CH_2$ groups may be replaced by $-O-$, $-CH=CH-$, $-CF=CF-$, $-CO-$, $-O(CO)-$ or $-(CO)O-$ in such a way that O atoms are not linked directly to one another, $Z^x$ and $Z^y$ each, independently of one another, denote $-CH_2CH_2-$, $-CH=CH-$, $-CF_2O-$, $-OCF_2-$, $-CH_2O-$, $-OCH_2-$, $-CO-O-$, $-O-CO-$, $-C_2F_4-$, $-CF=CF-$, $-CH=CH-CH_2O-$ or a single bond, preferably a single bond, $L^1$ and $L^2$ each, independently of one another, denote F, Cl, $OCF_3$, $CF_3$, $CH_3$, $CH_2F$, $CHF_2$.

Preferably, both radicals $L^1$ and $L^2$ denote F or one of the radicals $L^1$ and $L^2$ denotes F and the other denotes Cl.

The compounds of the formula LY are preferably selected from the group consisting of the following sub-formulae:

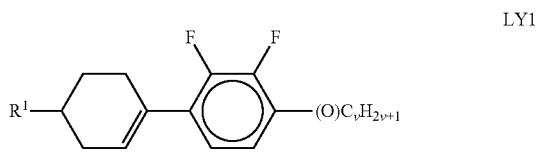

LY1

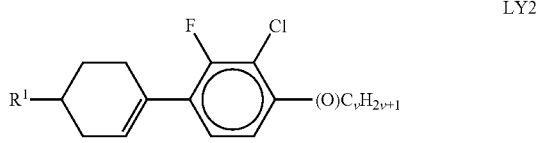

LY2

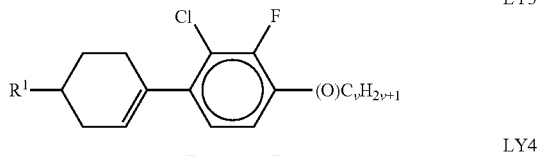

LY3

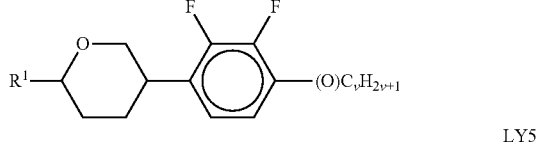

LY4

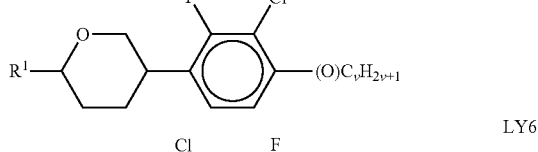

LY5

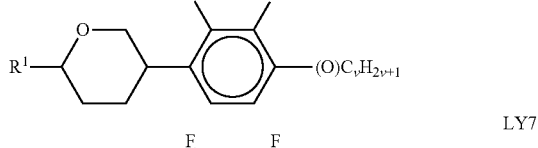

LY6

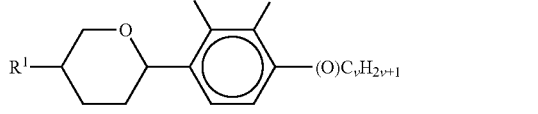

LY7

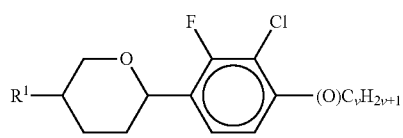
LY8

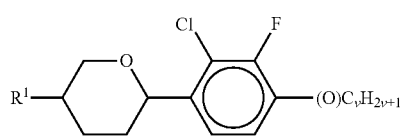
LY9

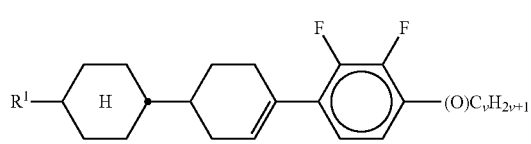
LY10

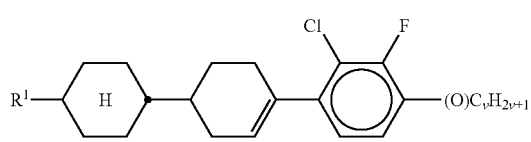
LY11

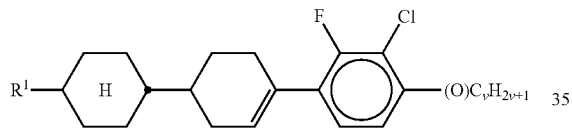
LY12

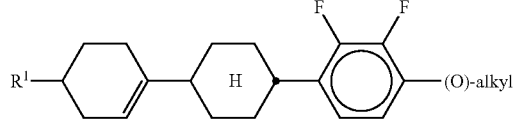
LY13

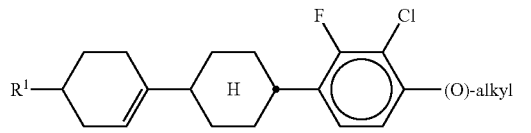
LY14

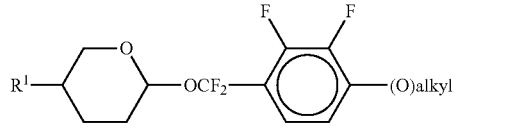
LY15

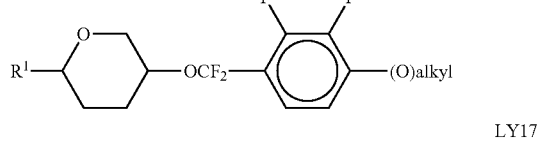
LY16

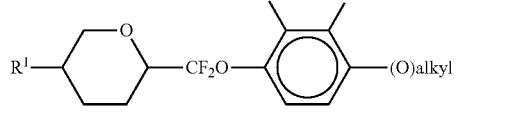
LY17

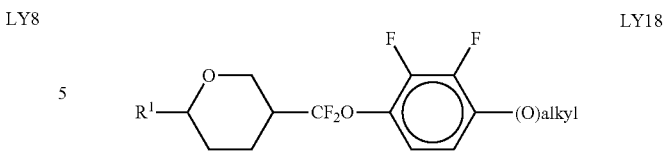
LY18 in which $R^1$ has the meaning indicated above, alkyl denotes a straight-chain alkyl radical having 1-6 C atoms, (O) denotes an oxygen atom or a single bond, and v denotes an integer from 1 to 6. $R^1$ preferably denotes straight-chain alkyl having 1 to 6 C atoms or straight-chain alkenyl having 2 to 6 C atoms, in particular $CH_3$, $C_2H_5$, $n\text{-}C_3H_7$, $n\text{-}C_4H_9$, $n\text{-}C_5H_{11}$, $CH_2\!=\!CH\!-\!$, $CH_2\!=\!CHCH_2CH_2\!-\!$, $CH_3\!-\!CH\!=\!CH\!-\!$, $CH_3\!-\!CH_2\!-\!CH\!=\!CH\!-\!$, $CH_3\!-\!(CH_2)_2\!-\!CH\!=\!CH\!-\!$, $CH_3\!-\!(CH_2)_3\!-\!CH\!=\!CH\!-\!$ or $CH_3\!-\!CH\!=\!CH\!-\!(CH_2)_2\!-\!$.

e) LC medium which additionally comprises one or more compounds selected from the group consisting of the following formulae:

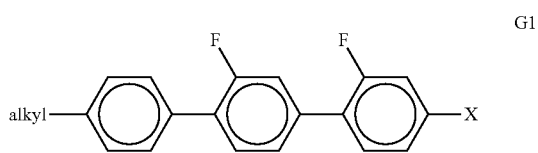
G1

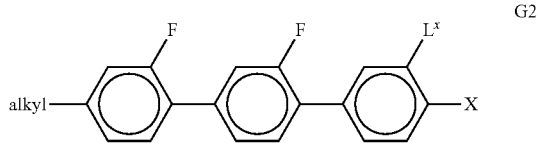
G2

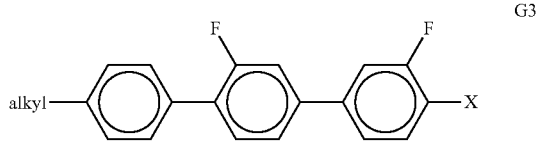
G3

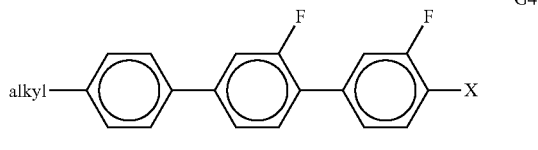
G4 in which alkyl denotes $C_{1-6}$-alkyl, Lx denotes H or F, and X denotes F, Cl, $OCF_3$, $OCHF_2$ or $OCH\!=\!CF_2$. Particular preference is given to compounds of the formula G1 in which X denotes F.

f) LC medium which additionally comprises one or more compounds selected from the group consisting of the following formulae:

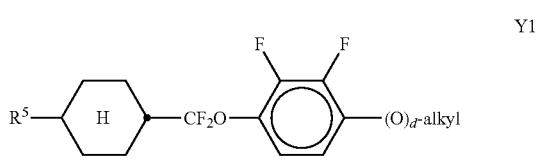
Y1

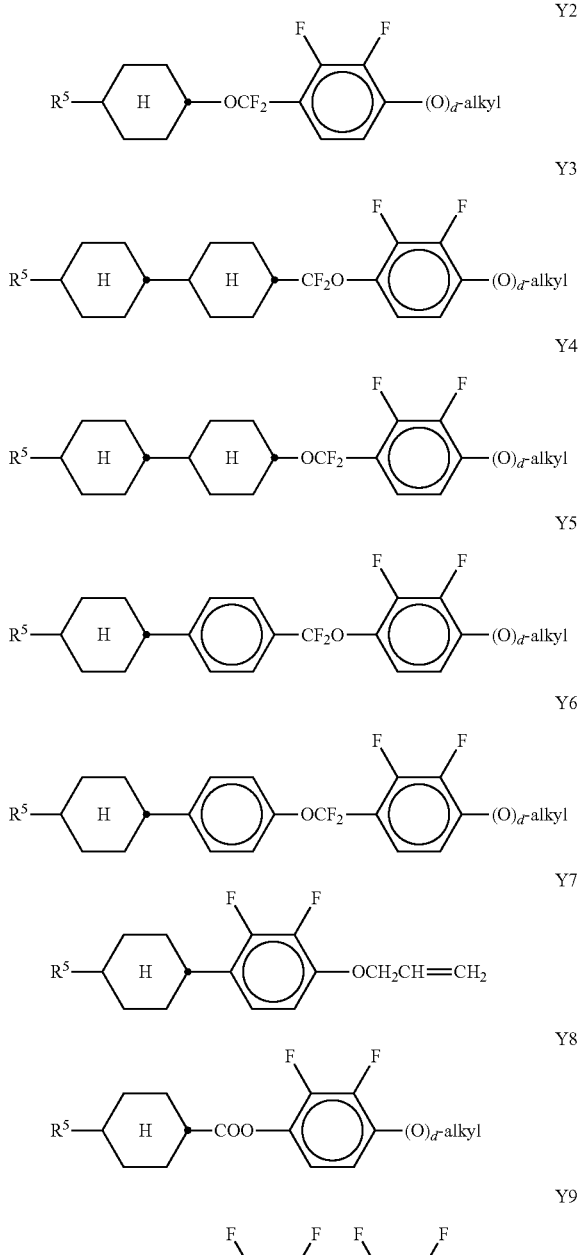

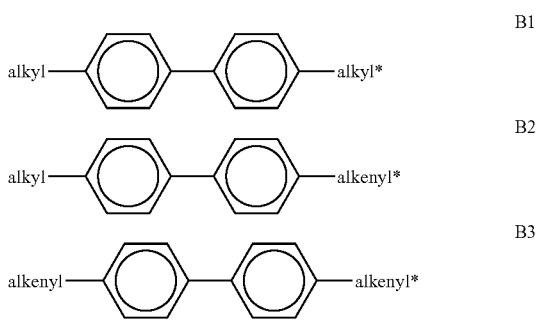

in which $R^5$ has one of the meanings indicated above for $R^1$, alkyl denotes $C_{1-6}$-alkyl, d denotes 0 or 1, and z and m each, independently of one another, denote an integer from 1 to 6. $R^5$ in these compounds is particularly preferably $C_{1-6}$-alkyl or -alkoxy or $C_{2-6}$-alkenyl, d is preferably 1. The LC medium according to the invention preferably comprises one or more compounds of the above-mentioned formulae in amounts of ≥5% by weight.

g) LC medium which additionally comprises one or more biphenyl compounds selected from the group consisting of the following formulae:

in which alkyl and alkyl* each, independently of one another, denote a straight-chain alkyl radical having 1-6 C atoms, and alkenyl and alkenyl* each, independently of one another, denote a straight-chain alkenyl radical having 2-6 C atoms. Alkenyl and alkenyl* preferably denote $CH_2=CH—$, $CH_2=CHCH_2CH_2—$, $CH_3—$ CH=CH—, CH₃—CH₂—CH=CH—, CH₃—(CH₂)₂—CH=CH—, CH₃—(CH₂)₃—CH=CH— or CH₃—CH=CH—(CH₂)₂—.

The proportion of the biphenyls of the formulae B1 to B3 in the LC mixture is preferably at least 3% by weight, in particular ≥5% by weight.

The compounds of the formula B2 are particularly preferred.

The compounds of the formulae B1 to B3 are preferably selected from the group consisting of the following sub-formulae:

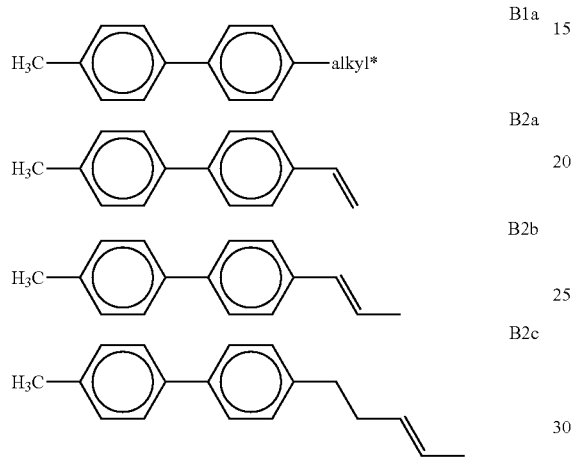

in which alkyl* denotes an alkyl radical having 1-6 C atoms. The medium according to the invention particularly preferably comprises one or more compounds of the formulae B1a and/or B2c.

h) LC medium which additionally comprises one or more terphenyl compounds of the following formula:

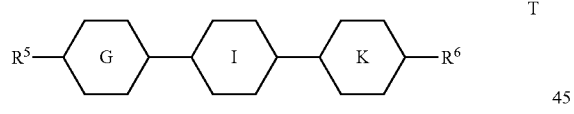

in which $R^5$ and $R^6$ each, independently of one another, have one of the meanings indicated above for $R^1$, and

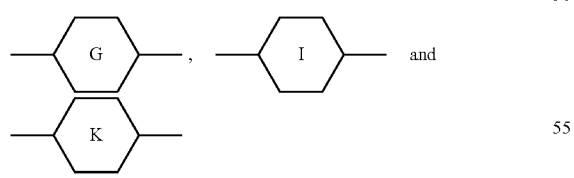

each, independently of one another, denote

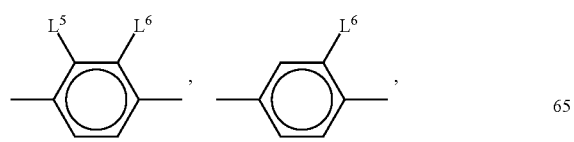

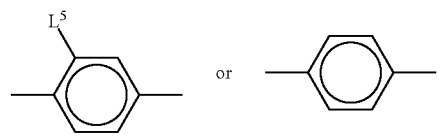

in which $L^5$ denotes F or Cl, preferably F, and $L^6$ denotes F, Cl, $OCF_3$, $CF_3$, $CH_3$, $CH_2F$ or $CHF_2$, preferably F.

The compounds of the formula T are preferably selected from the group consisting of the following sub-formulae:

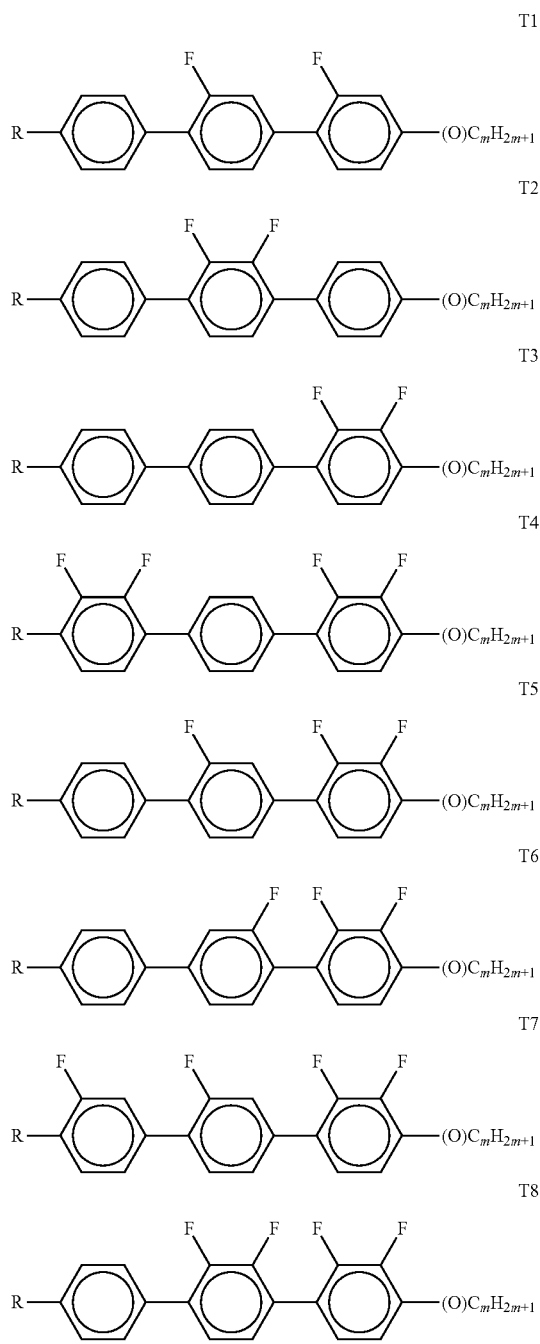

T9
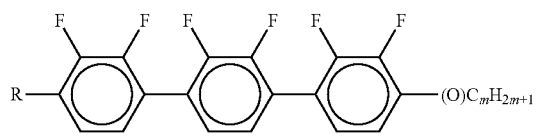

T10
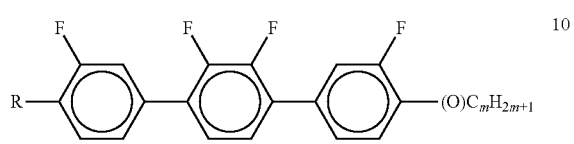

T11
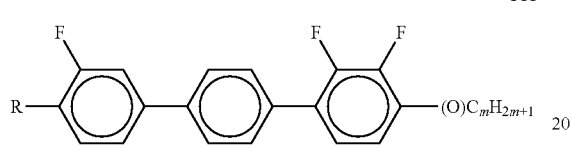

T12
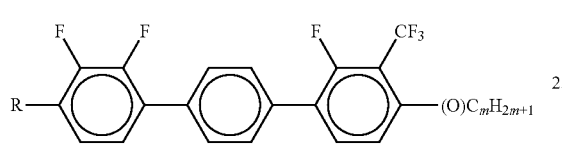

T13
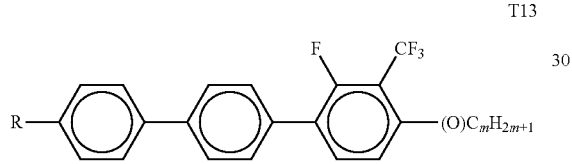

T14
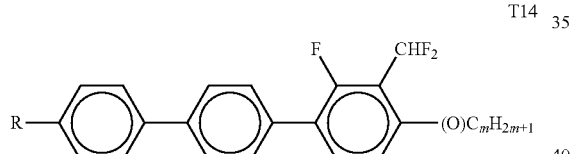

T15
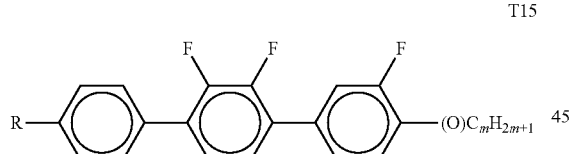

T16
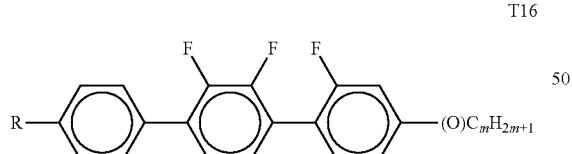

T17
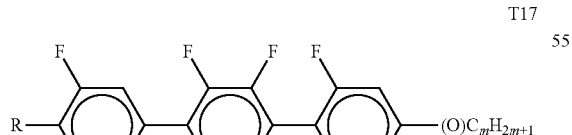

T18
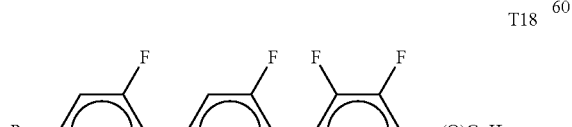

T19
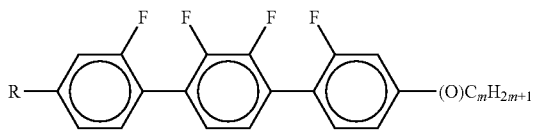

T20
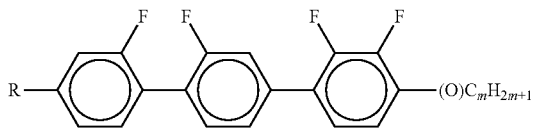

T21
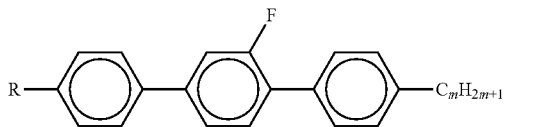

T22
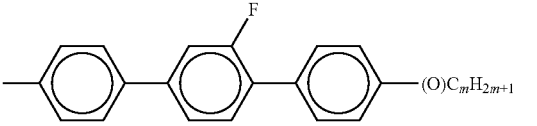

T23
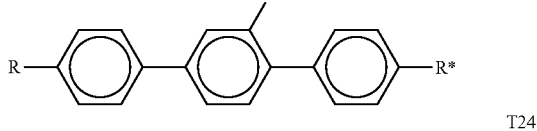

T24
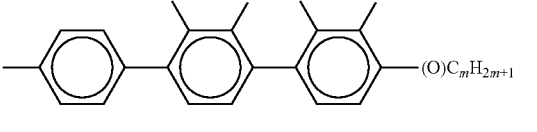

in which R denotes a straight-chain alkyl or alkoxy radical having 1-7 C atoms, R* denotes a straight-chain alkenyl radical having 2-7 C atoms, (O) denotes an oxygen atom or a single bond, and m denotes an integer from 1 to 6. R* preferably denotes $CH_2=CH-$, $CH_2=CHCH_2CH_2-$, $CH_3-CH=CH-$, $CH_3-CH_2-CH=CH-$, $CH_3-(CH_2)_2-CH=CH-$, $CH_3-(CH_2)_3-CH=CH-$ or $CH_3-CH=CH-(CH_2)_2-$.

R preferably denotes methyl, ethyl, propyl, butyl, pentyl, hexyl, methoxy, ethoxy, propoxy, butoxy or pentoxy.

The LC medium according to the invention preferably comprises the terphenyls of the formula T and the preferred sub-formulae thereof in an amount of 0.5-30% by weight, in particular 1-20% by weight.

Particular preference is given to compounds of the formulae T1, T2, T3 and T21. In these compounds, R preferably denotes alkyl, furthermore alkoxy, each having 1-5 C atoms.

The terphenyls are preferably employed in mixtures according to the invention if the Δn value of the mixture is to be 0.1. Preferred mixtures comprise 2-20% by weight of one or more terphenyl compounds of the formula T, preferably selected from the group of compounds T1 to T22.

i) LC medium which additionally comprises one or more compounds selected from the group consisting of the following formulae:

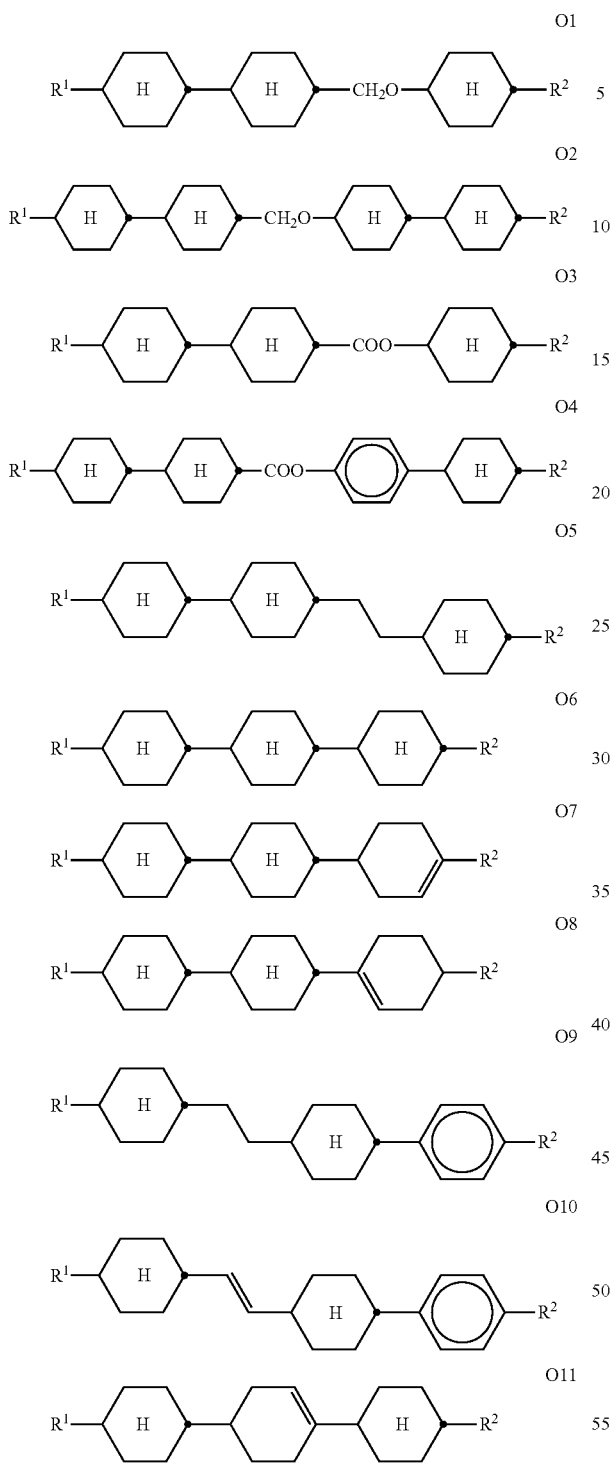

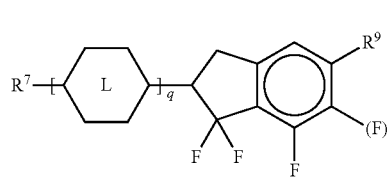

in which

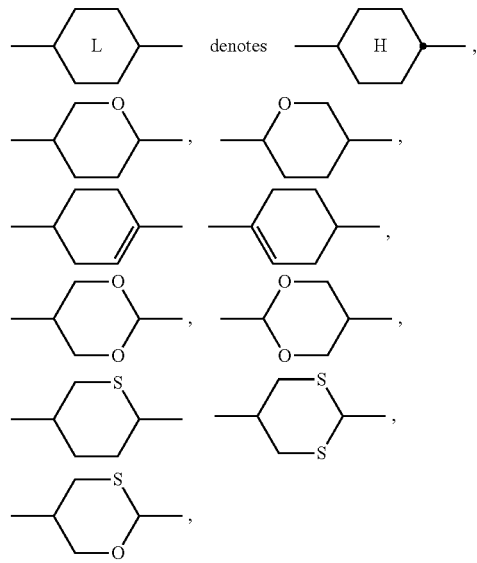

$R^9$ denotes H, $CH_3$, $C_2H_5$ or n-$C_3H_7$, (F) denotes an optional fluorine substituent, and q denotes 1, 2 or 3, and $R^7$ has one of the meanings indicated for $R^1$, preferably in amounts of >3% by weight, in particular ≥5% by weight and very particularly preferably 5-30% by weight.

Particularly preferred compounds of the formula F1 are selected from the group consisting of the following subformulae:

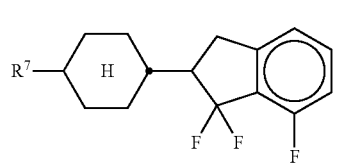

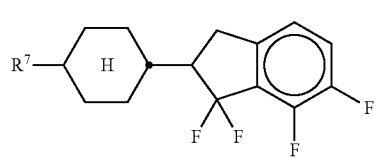

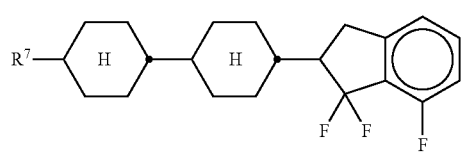

in which $R^1$ and $R^2$ have the meanings indicated above for formula LY and preferably each, independently of one another, denote straight-chain alkyl having 1 to 6 C atoms or straight-chain alkenyl having 2 to 6 C atoms.

Preferred media comprise one or more compounds selected from the formulae O1, O3 and O4.

k) LC medium which additionally comprises one or more compounds of the following formula:

FI4

FI5

FI6

FI7

FI8 in which $R^7$ preferably denotes straight-chain alkyl, and $R^9$ denotes $CH_3$, $C_2H_5$ or n-$C_3H_7$. Particular preference is given to the compounds of the formulae FI1, FI2 and FI3.

m) LC medium which additionally comprises one or more compounds selected from the group consisting of the following formulae:

VK1

VK2

VK3

VK4 in which $R^8$ has the meaning indicated for $R^1$ for formula LY, and alkyl denotes a straight-chain alkyl radical having 1-6 C atoms.

n) LC medium which additionally comprises one or more compounds which contain a tetrahydronaphthyl or naphthyl unit, such as, for example, the compounds selected from the group consisting of the following formulae:

N1

N2

N3

N4

N5

N6

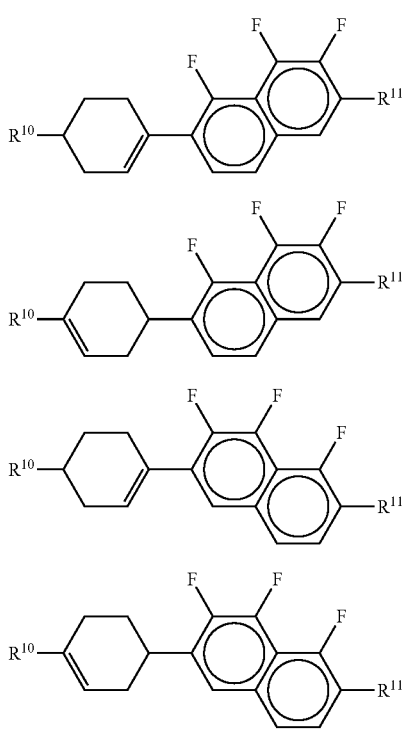

in which $R^{10}$ and $R^{11}$ each, independently of one another, have one of the meanings indicated for $R^1$ for formula LY, preferably denote straight-chain alkyl or alkoxy having 1 to 6 C atoms or straight-chain alkenyl having 2 to 6 C atoms, and $Z^1$ and $Z^2$ each, independently of one another, denote —$C_2H_4$—, —CH=CH—, —$(CH_2)_4$—, —$(CH_2)_3O$—, —O—$(CH_2)_3$—, —CH=CH—$CH_2CH_2$—, —$CH_2CH_2$CH=CH—, —$CH_2O$—, —$OCH_2$—, —CO—O—, —O—CO—, —$C_2F_4$—, —CF=CF—, —CF=CH—, —CH=CF—, —$CH_2$— or a single bond.

o) LC medium which additionally comprises one or more difluorodibenzochromans and/or chromans of the following formulae:

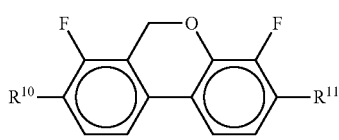

BC

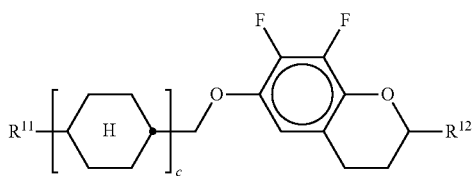

CR in which $R^{10}$ and $R^{11}$ each, independently of one another, have the meaning indicated above for $R^1$ in formula LY, and c denotes 0 or 1, preferably in amounts of 3 to 20% by weight, in particular in amounts of 3 to 15% by weight.

Particularly preferred compounds of the formulae BC and CR are selected from the group consisting of the following sub-formulae:

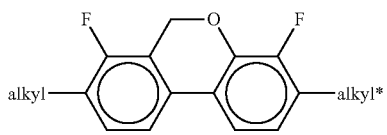

BC1

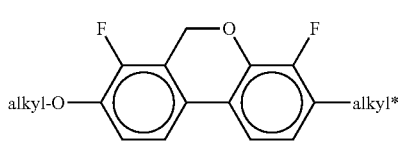

BC2

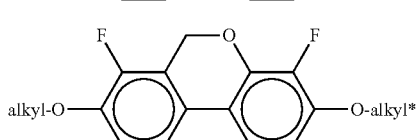

BC3

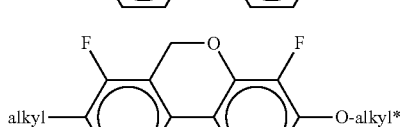

BC4

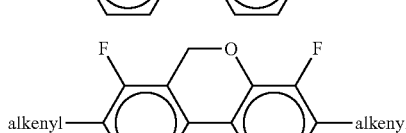

BC5

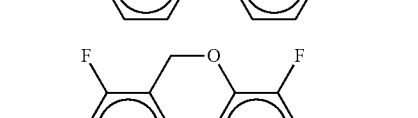

BC6

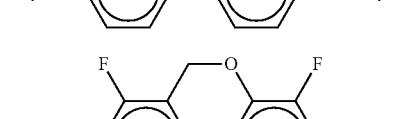

BC7

CR1

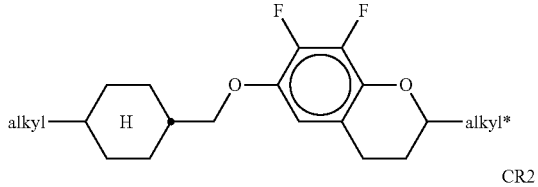

CR2

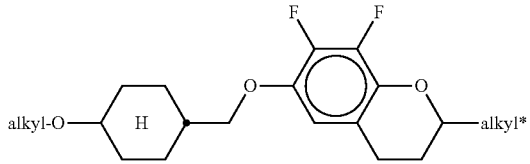

CR3

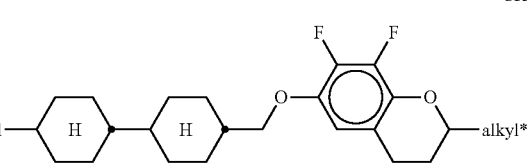

-continued

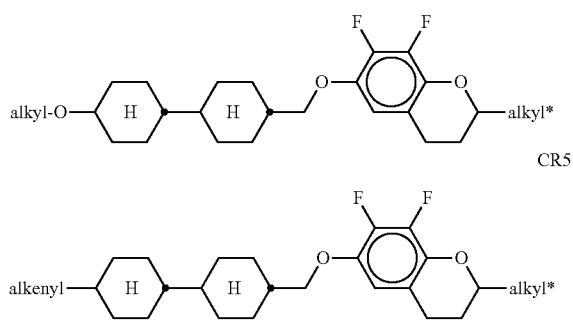

CR4

CR5 in which alkyl and alkyl* each, independently of one another, denote a straight-chain alkyl radical having 1-6 C atoms, and alkenyl and alkenyl* each, independently of one another, denote a straight-chain alkenyl radical having 2-6 C atoms. Alkenyl and alkenyl* preferably denote $CH_2$=CH—, $CH_2$=$CHCH_2CH_2$—, $CH_3$—CH=CH—, $CH_3$—$CH_2$—CH=CH—, $CH_3$—$(CH_2)_2$—CH=CH—, $CH_3$—$(CH_2)_3$—CH=CH— or $CH_3$—CH=CH—$(CH_2)_2$—.

Very particular preference is given to mixtures comprising one, two or three compounds of the formula BC2.

p) LC medium which additionally comprises one or more fluorinated phenanthrenes and/or dibenzofurans of the following formulae:

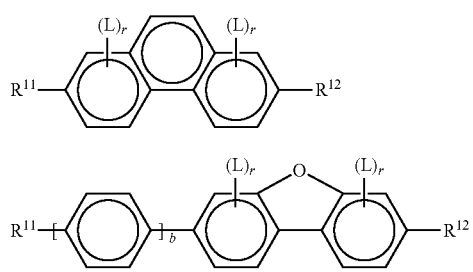

PH

BF in which $R^{11}$ and $R^{12}$ each, independently of one another, have the meaning indicated above for $R^1$ in formula LY, b denotes 0 or 1, L denotes F, and r denotes 1, 2 or 3.

Particularly preferred compounds of the formulae PH and BF are selected from the group consisting of the following sub-formulae:

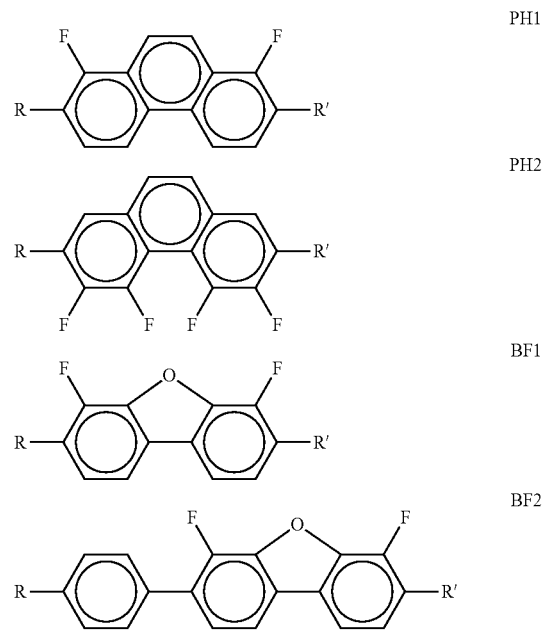

PH1

PH2

BF1

BF2 in which R and R' each, independently of one another, denote a straight-chain alkyl or alkoxy radical having 1-7 C atoms.

The liquid-crystal mixture according to the invention is dielectrically negative with a dielectric anisotropy (Δ∈) of ≤−1.5. The compounds of the formulae IIIA, IIIB, IIIC, LY1-LY18, Y1-Y16, T1-T24, F1, VK1-VK4, N1-N10, BC, CR, PH and BF are suitable as dielectrically negative component. The dielectrically negative compounds are preferably selected from the formulae IIIA, IIIB and IIIC. The LC medium preferably has a Δ∈ of −1.5 to −8.0, in particular −2.5 to −6.0.

The values of the birefringence Δn in the liquid-crystal mixture are generally between 0.07 and 0.16, preferably between 0.08 and 0.12. The rotational viscosity $γ_1$ at 20° C. before the polymerisation is preferably ≤165 mPa·s, in particular ≤140 mPa·s.

The following abbreviations are used:
(m, m, z: in each case, independently of one another, 1, 2, 3, 4, 5 or 6)

TABLE A

In a preferred embodiment of the present invention, the LC media according to the invention comprise one or more compounds selected from the group consisting of compounds from Table A.

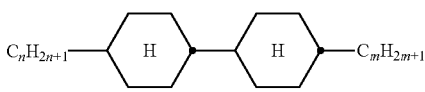

CCH-nm

TABLE A-continued
In a preferred embodiment of the present invention, the LC media according to the invention comprise one or more compounds selected from the group consisting of compounds from Table A.
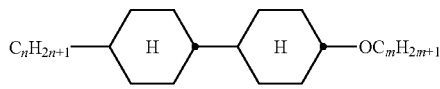
CCH-nOm
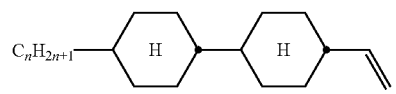
CC-n-V
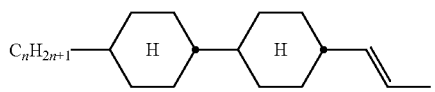
CC-n-V1
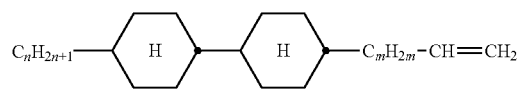
CC-n-mV
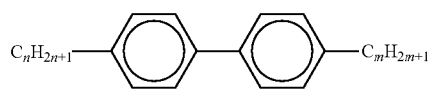
PP-n-m
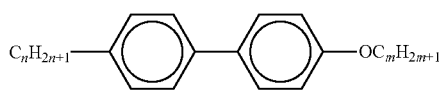
PP-n-Om
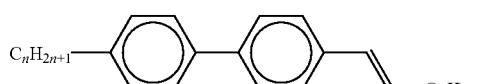
PP-n-Vm
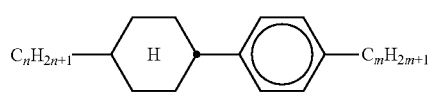
PCH-nm
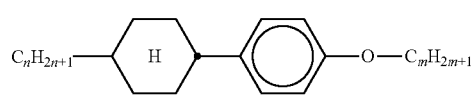
PCH-nOm
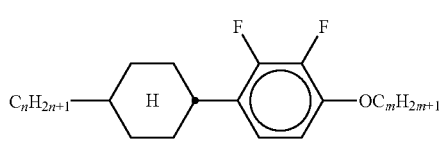
CY-n-Om TABLE A-continued
In a preferred embodiment of the present invention, the LC media according to the invention comprise one or more compounds selected from the group consisting of compounds from Table A.
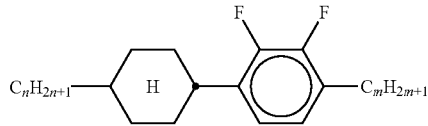
CY-n-m
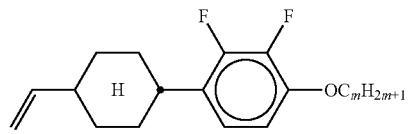
CY-V-Om
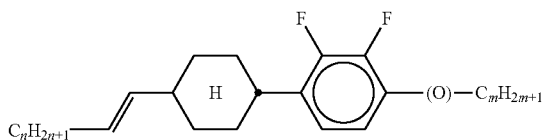
CY-nV-(O)m
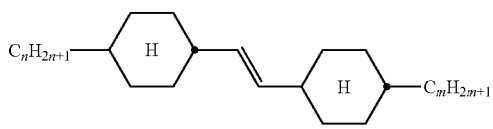
CVC-n-m
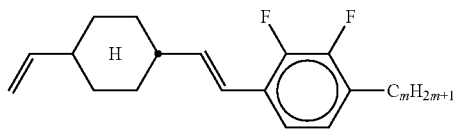
CVY-V-m
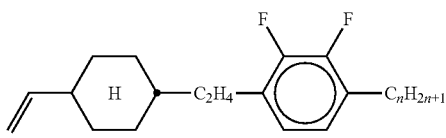
CEY-V-m
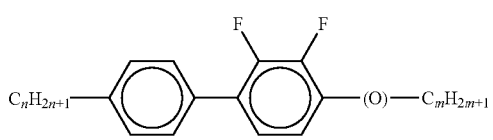
PY-n-(O)m
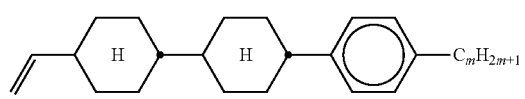
CCP-V-m TABLE A-continued
In a preferred embodiment of the present invention, the LC media according to the invention comprise one or more compounds selected from the group consisting of compounds from Table A.
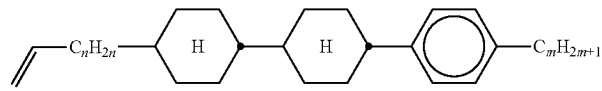
CCP-Vn-m
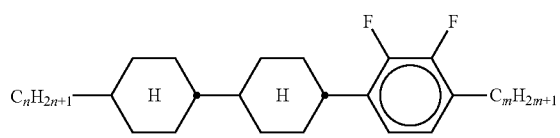
CCY-n-m
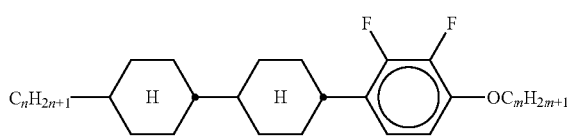
CCY-n-Om
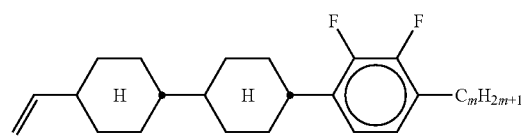
CCY-V-m
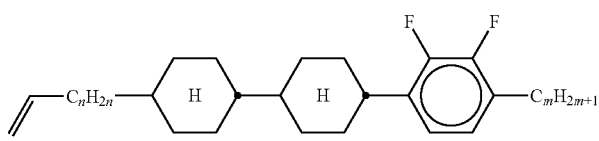
CCY-Vn-m
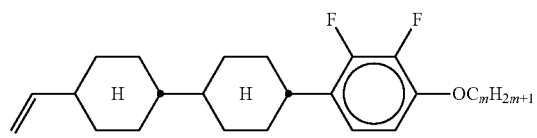
CCY-V-Om
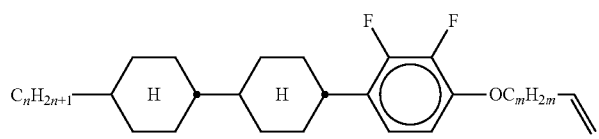
CCY-n-OmV
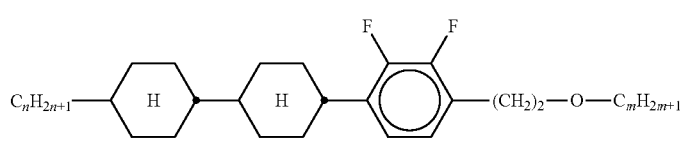
CCY-n-zOm TABLE A-continued
In a preferred embodiment of the present invention, the LC media according to the invention comprise one or more compounds selected from the group consisting of compounds from Table A.
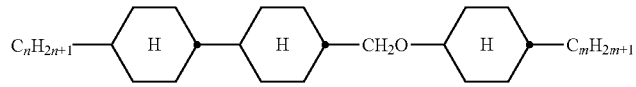
CCOC-n-m
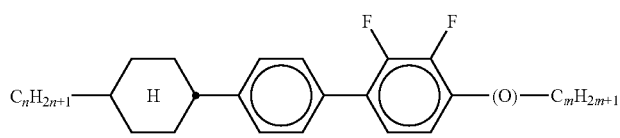
CPY-n-(O)m
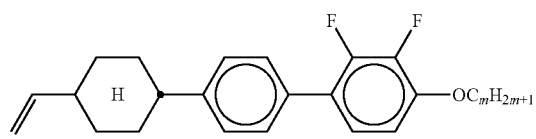
CPY-V-Om
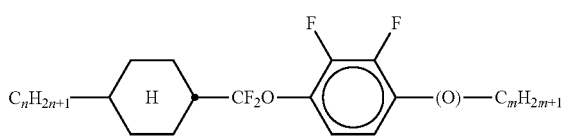
CQY-n-(O)m
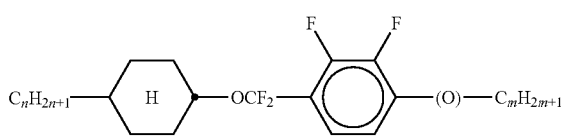
CQIY-n-(O)m
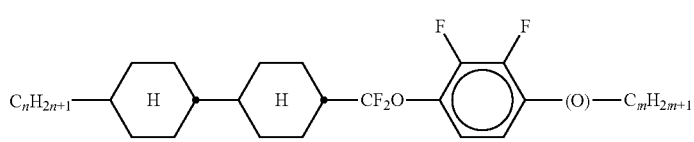
CCQY-n-(O)m
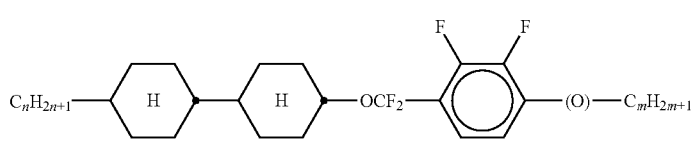
CCQIY-n-(O)m
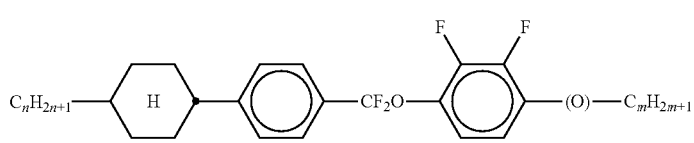
CPQY-n-(O)m TABLE A-continued
In a preferred embodiment of the present invention, the LC media according to the invention comprise one or more compounds selected from the group consisting of compounds from Table A.
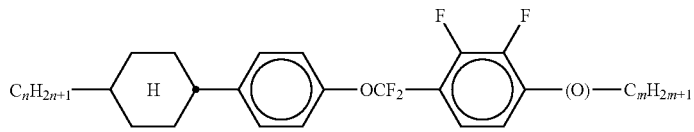
CPQIY-n-Om
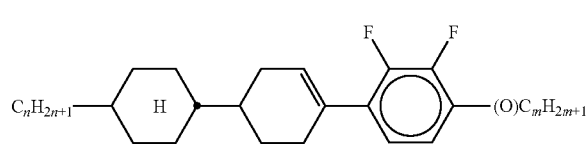
CLY-n-(O)m
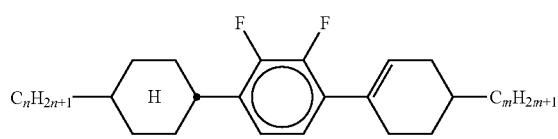
CYLI-n-m
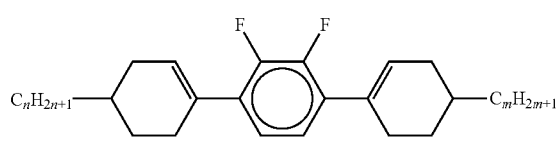
LYLI-n-m
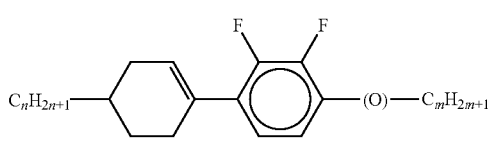
LY-n-(O)m
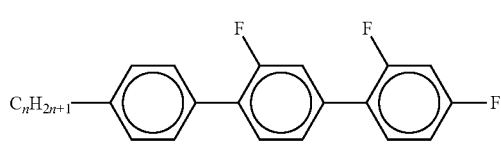
PGIGI-n-F
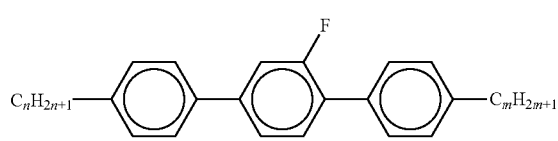
PGP-n-m
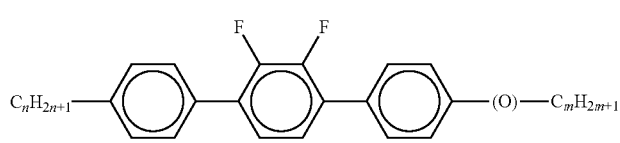
PYP-n-(O)m TABLE A-continued
In a preferred embodiment of the present invention, the LC media according to the invention comprise one or more compounds selected from the group consisting of compounds from Table A.
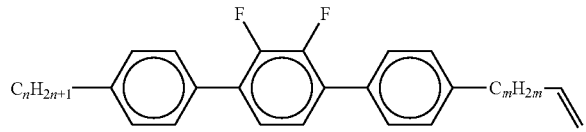
PYP-n-mV
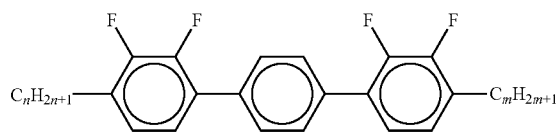
YPY-n-m
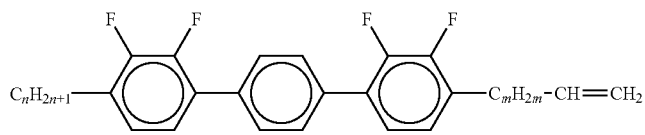
YPY-n-mV
BCH-nm
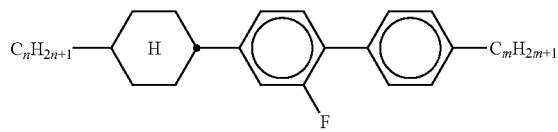
BCH-nmF
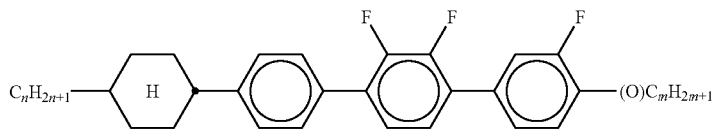
CPYP-n-(O)m
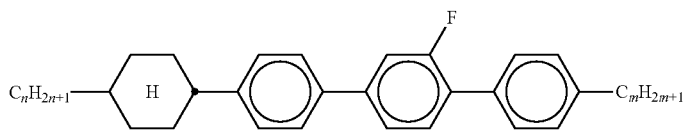
CPGP-n-m
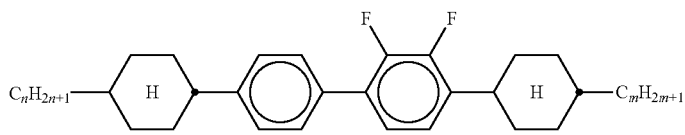
CPYC-n-m TABLE A-continued
In a preferred embodiment of the present invention, the LC media according to the invention comprise one or more compounds selected from the group consisting of compounds from Table A.
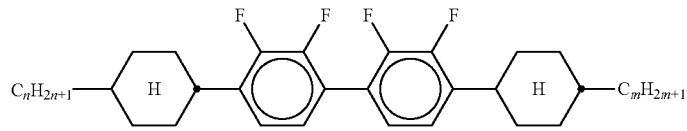
CYYC-n-m
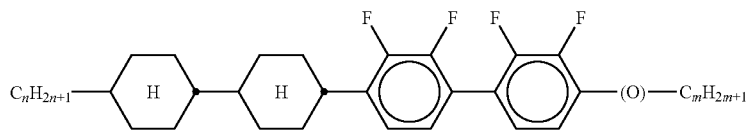
CCYY-n-m
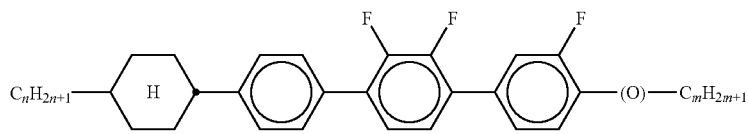
CPYG-n-(O)m
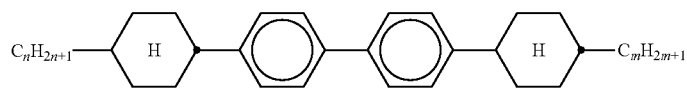
CBC-nm
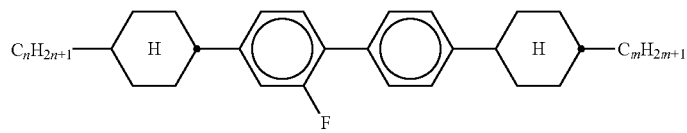
CBC-nmF
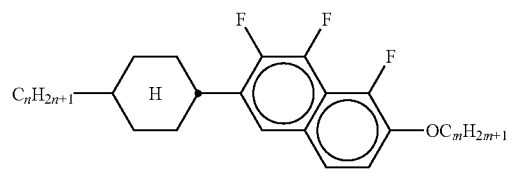
CNap-n-Om
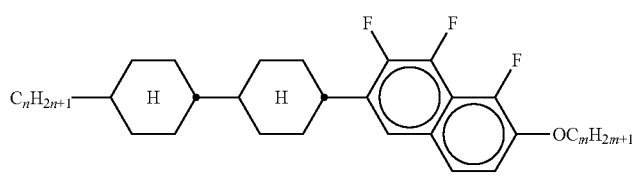
CCNap-n-Om TABLE A-continued
In a preferred embodiment of the present invention, the LC media according to the invention comprise one or more compounds selected from the group consisting of compounds from Table A.
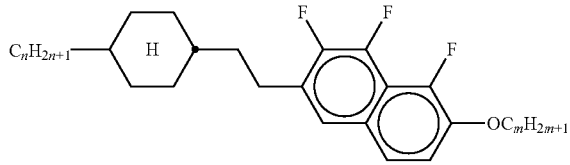
CENap-n-Om
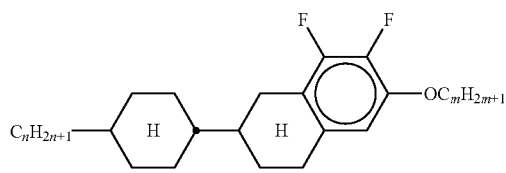
CTNap-n-Om
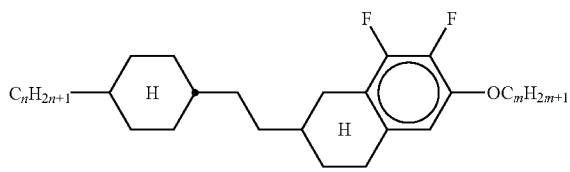
CETNap-n-Om
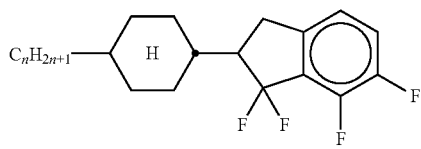
CK-n-F
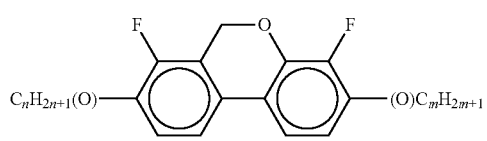
DFDBC-n(O)-(O)m
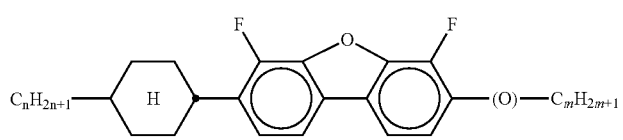
C-DFDBF-n-(O)m TABLE B
Table B shows possible chiral dopants which can be added to the LC media according to the invention.
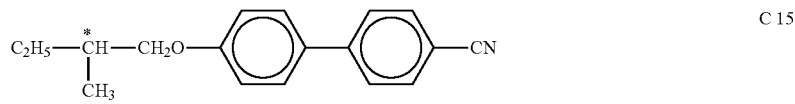
C 15
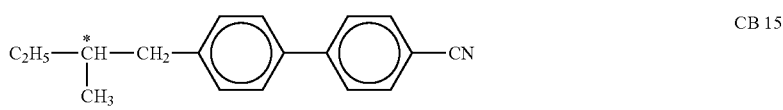
CB 15
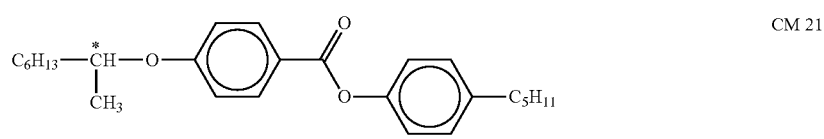
CM 21
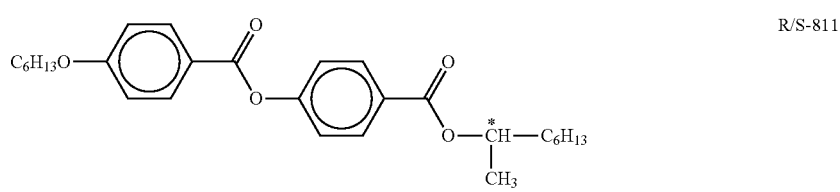
R/S-811
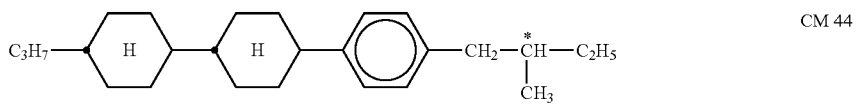
CM 44
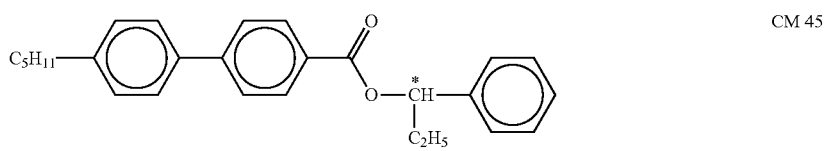
CM 45
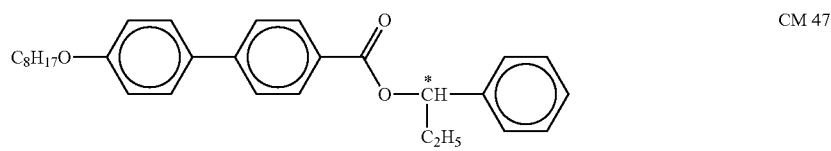
CM 47
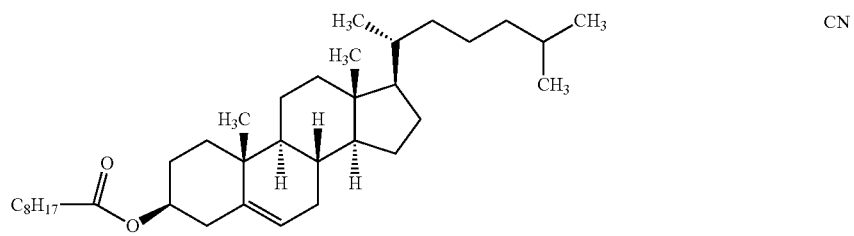
CN
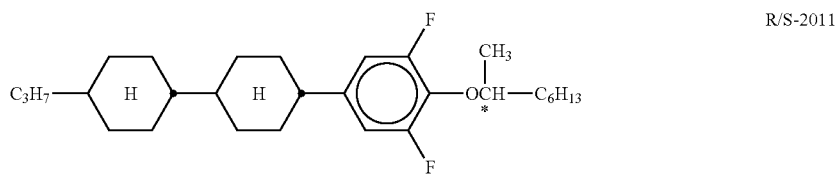
R/S-2011

TABLE B-continued

Table B shows possible chiral dopants which can be added to the LC media according to the invention.

R/S 3011

[Structure: C₃H₇-cyclohexyl-H-cyclohexyl-H-(2,3-difluorophenyl)-O-CH*(C₅H₁₁)(C≡CH)]

R/S-4011

[Structure: C₅H₁₁-bicyclo-phenyl-(2,6-difluorophenyl)-O-CH*(CH₃)-C₆H₁₃ with F substituent]

R/S-5011

[Structure: binaphthyl bis-ether with cyclohexyl-propyl group]

R/S-1011

[Structure: C₅H₁₁-cyclohexyl-H-phenyl-COO-CH₂-CH*(phenyl)-OOC-phenyl-cyclohexyl-H-C₅H₁₁]

The LC media optionally comprise 0 to 10% by weight, in particular 0.01 to 5% by weight, particularly preferably 0.1 to 3% by weight, of dopants, preferably selected from the group consisting of compounds from Table B.

TABLE C

Table C shows possible stabilisers which can be added to the LC media according to the invention.

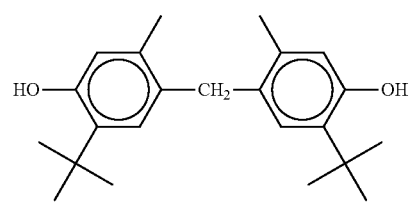

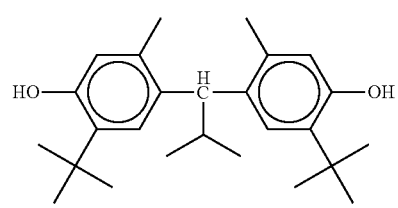

TABLE C-continued
Table C shows possible stabilisers which can be added to the LC media according to the invention.
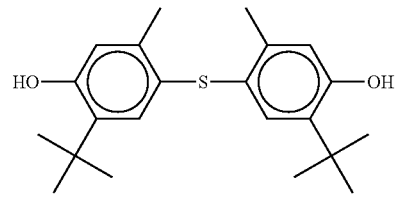
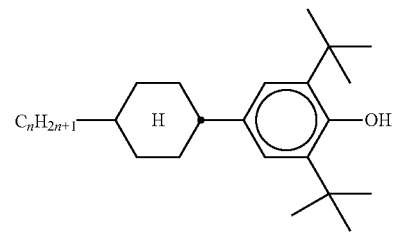
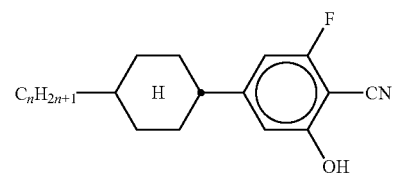
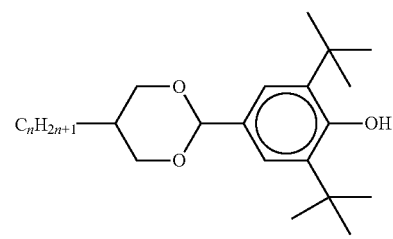
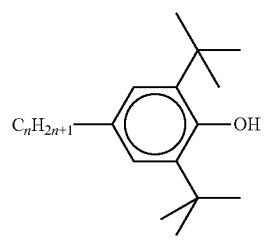
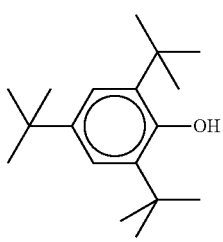
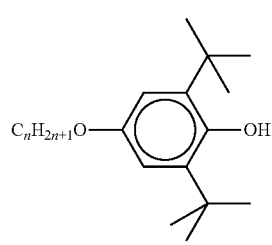

TABLE C-continued
Table C shows possible stabilisers which can be added to the LC media according to the invention.
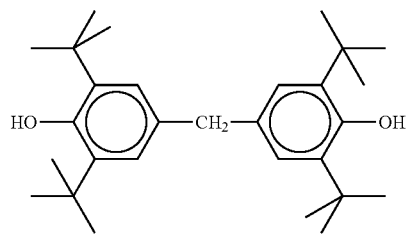
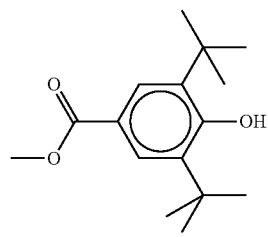
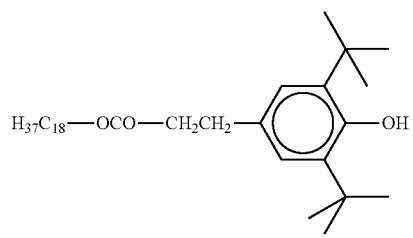
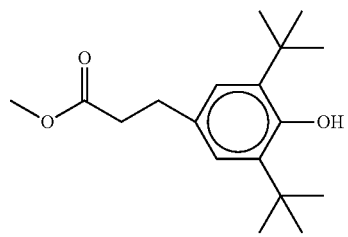
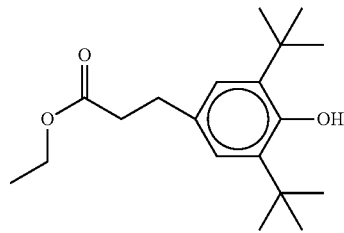
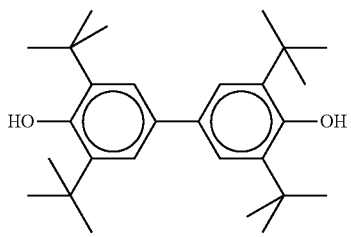

TABLE C-continued
Table C shows possible stabilisers which can be added to the LC media according to the invention.
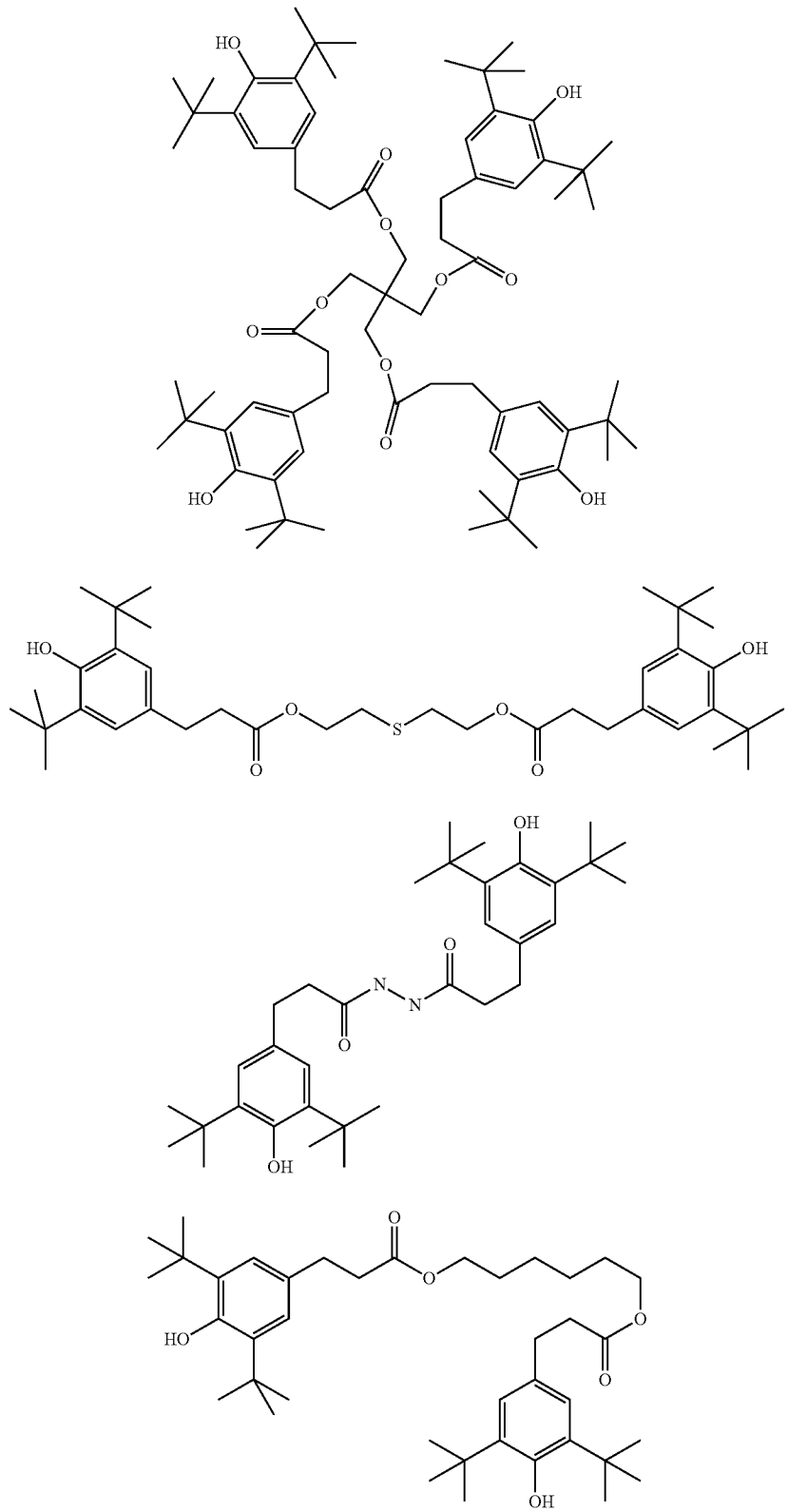

TABLE C-continued
Table C shows possible stabilisers which can be added to the LC media according to the invention.
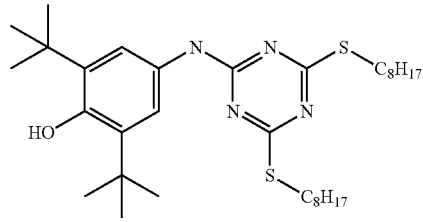
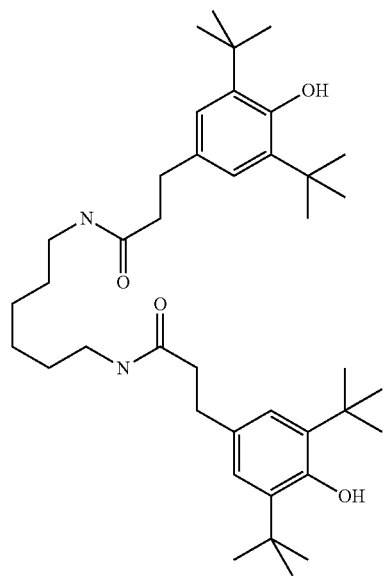 [SMILES: CC(C)(C)c1cc(CCC(=O)NCCCCCCNC(=O)CCc2cc(C(C)(C)C)c(O)c(C(C)(C)C)c2)cc(C(C)(C)C)c1O]
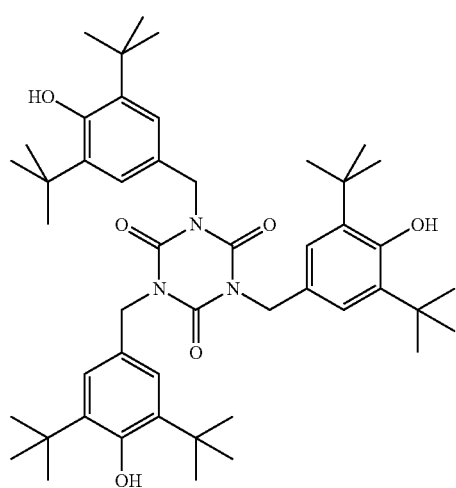 [SMILES: CC(C)(C)c1cc(Cn2c(=O)n(Cc3cc(C(C)(C)C)c(O)c(C(C)(C)C)c3)c(=O)n(Cc3cc(C(C)(C)C)c(O)c(C(C)(C)C)c3)c2=O)cc(C(C)(C)C)c1O]

TABLE C-continued
Table C shows possible stabilisers which can be added to the LC media according to the invention.
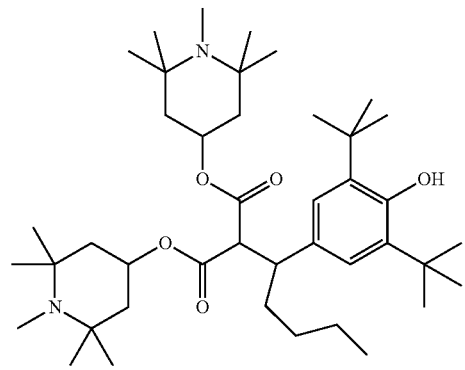 [SMILES: CCCCC(c1cc(C(C)(C)C)c(O)c(C(C)(C)C)c1)C(C(=O)OC1CC(C)(C)N(C)C(C)(C)C1)C(=O)OC1CC(C)(C)N(C)C(C)(C)C1]
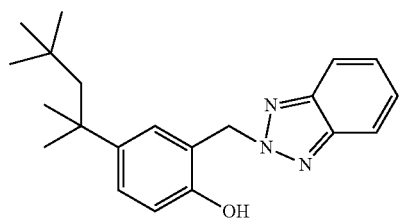 [SMILES: CC(C)(C)CC(C)(C)c1ccc(O)c(Cn2nc3ccccc3n2)c1]
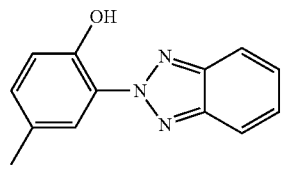 [SMILES: Cc1ccc(O)c(-n2nc3ccccc3n2)c1]
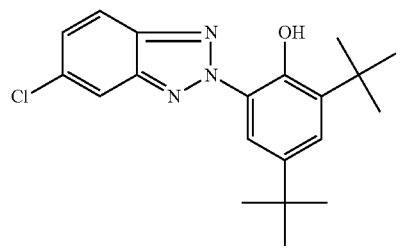 [SMILES: CC(C)(C)c1cc(-n2nc3ccc(Cl)cc3n2)c(O)c(C(C)(C)C)c1]
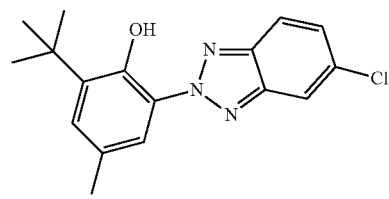 [SMILES: Cc1cc(-n2nc3ccc(Cl)cc3n2)c(O)c(C(C)(C)C)c1]

TABLE C-continued
Table C shows possible stabilisers which can be added to the LC media according to the invention.
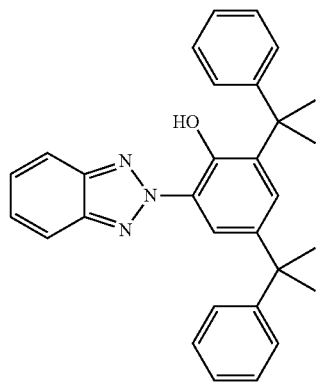 [SMILES: CC(C)(c1ccccc1)c1cc(-n2nc3ccccc3n2)c(O)c(C(C)(C)c2ccccc2)c1]
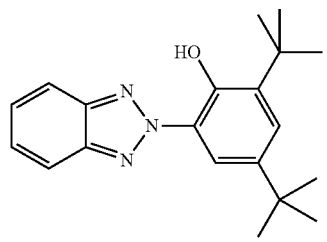 [SMILES: CC(C)(C)c1cc(-n2nc3ccccc3n2)c(O)c(C(C)(C)C)c1]
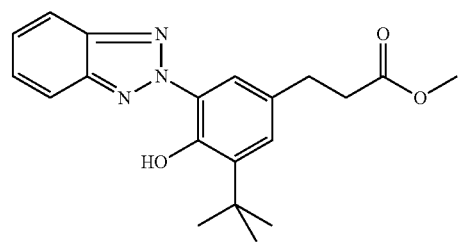 [SMILES: COC(=O)CCc1cc(-n2nc3ccccc3n2)c(O)c(C(C)(C)C)c1]
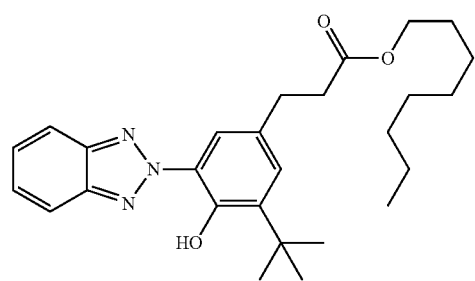 [SMILES: CCCCCCCCOC(=O)CCc1cc(-n2nc3ccccc3n2)c(O)c(C(C)(C)C)c1]

TABLE C-continued
Table C shows possible stabilisers which can be added to the LC media according to the invention.
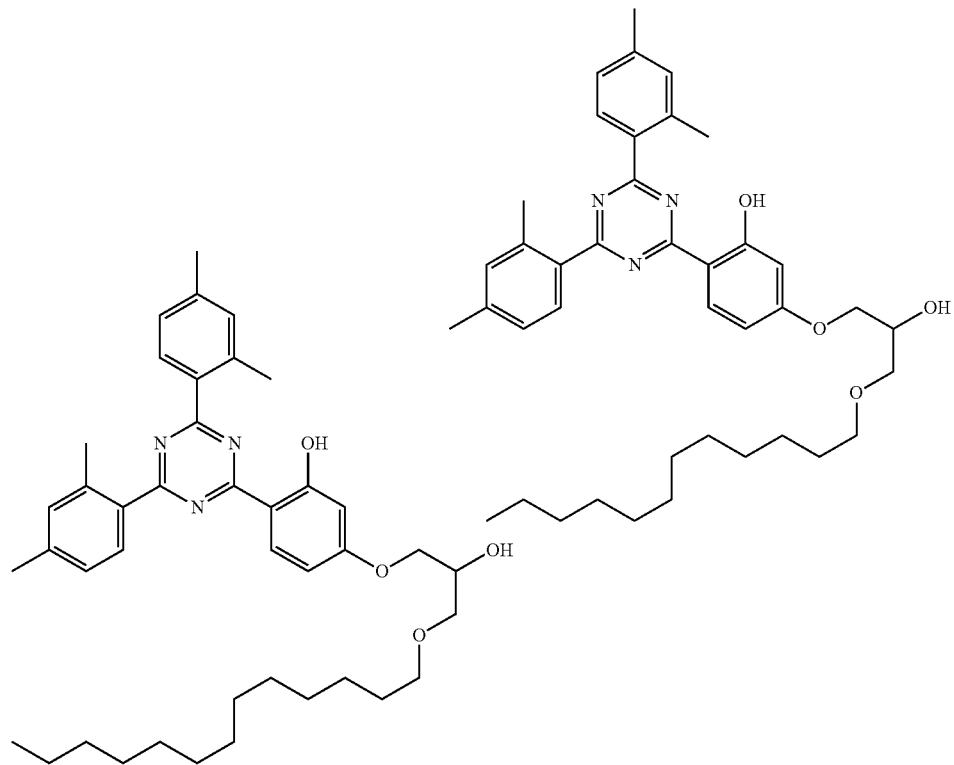
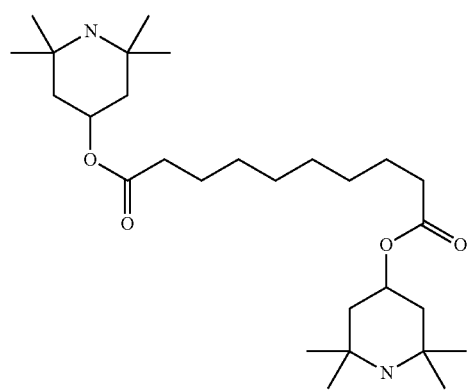

TABLE C-continued

Table C shows possible stabilisers which can be added to the LC media according to the invention.

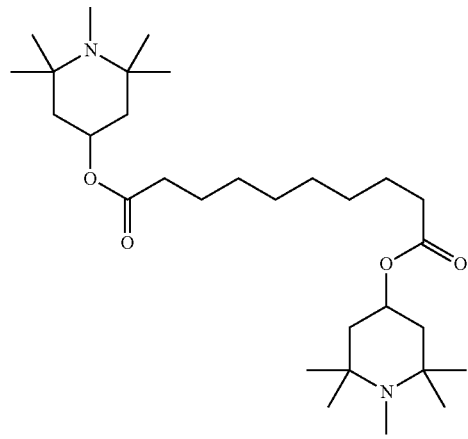

(n here denotes an integer from 1 to 12, preferable 1, 2, 3, 4, 5, 6, 7 or 8, terminal methyl groups are not shown).

The LC media preferably comprise 0 to 10% by weight, in particular 1 ppm to 5% by weight, particularly preferably 1 ppm to 1% by weight, of stabilisers. The LC media preferably comprise one or more stabilisers selected from the group consisting of compounds from Table C.

TABLE D

Table D shows illustrative compounds which can be used in the LC media in accordance with the present invention, preferable as reactive compounds.

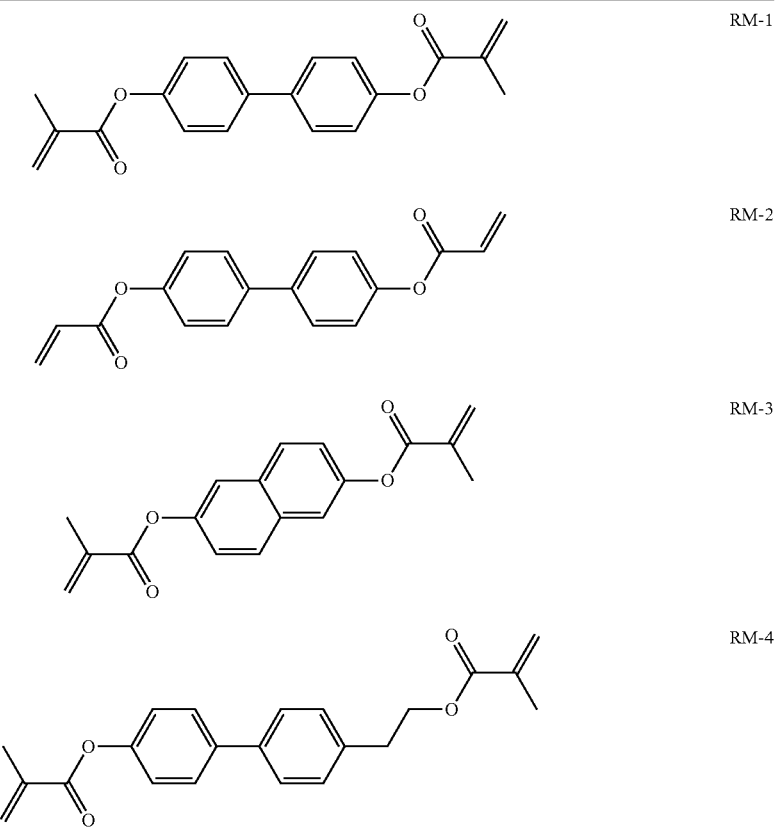

TABLE D-continued
Table D shows illustrative compounds which can be used in the LC media in accordance with the present invention, preferable as reactive compounds.
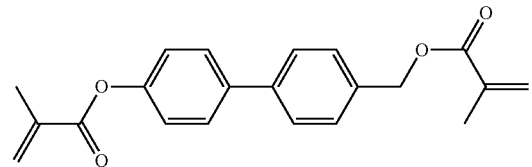 [SMILES: C=C(C)C(=O)OCc1ccc(-c2ccc(OC(=O)C(=C)C)cc2)cc1]
RM-5
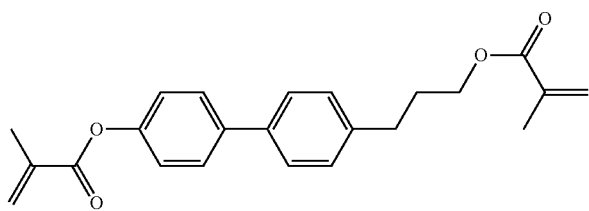 [SMILES: C=C(C)C(=O)OCCCc1ccc(-c2ccc(OC(=O)C(=C)C)cc2)cc1]
RM-6
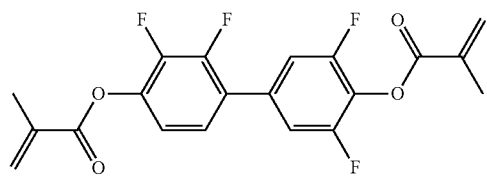 [SMILES: C=C(C)C(=O)Oc1ccc(-c2cc(F)c(OC(=O)C(=C)C)c(F)c2)c(F)c1F]
RM-7
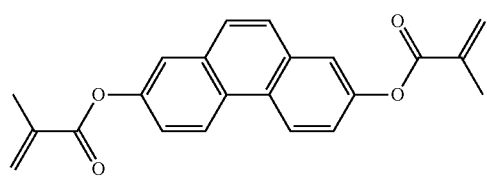 [SMILES: C=C(C)C(=O)Oc1ccc2c(ccc3cc(OC(=O)C(=C)C)ccc32)c1]
RM-8
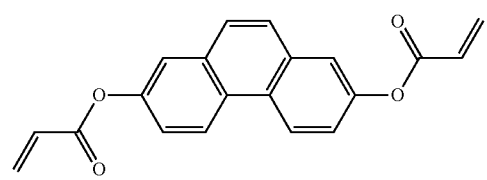 [SMILES: C=CC(=O)Oc1ccc2c(ccc3cc(OC(=O)C=C)ccc32)c1]
RM-9
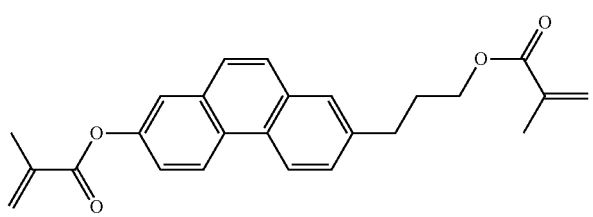 [SMILES: C=C(C)C(=O)OCCCc1ccc2c(ccc3cc(OC(=O)C(=C)C)ccc32)c1]
RM-10
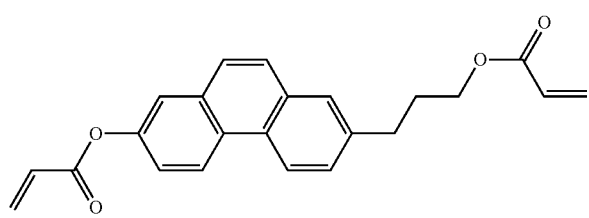 [SMILES: C=CC(=O)OCCCc1ccc2c(ccc3cc(OC(=O)C=C)ccc32)c1]
RM-11

TABLE D-continued
Table D shows illustrative compounds which can be used in the LC media in accordance with the present invention, preferable as reactive compounds.
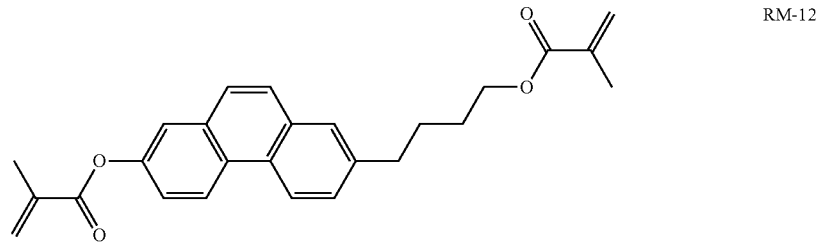 RM-12
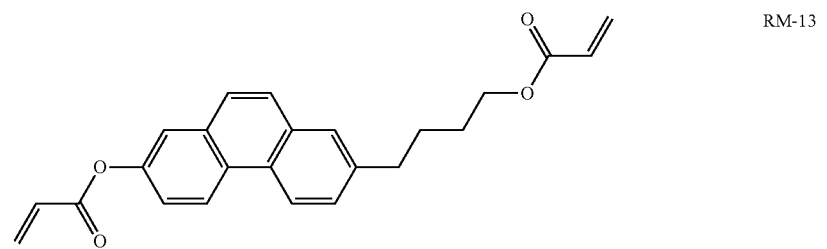 RM-13
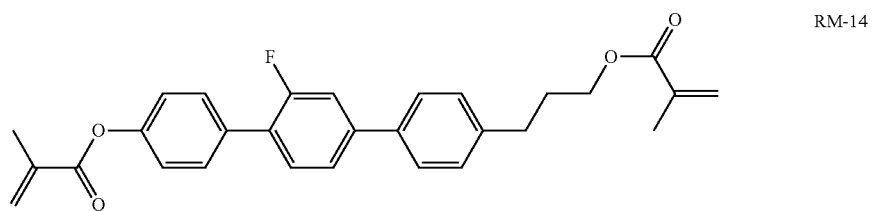 RM-14
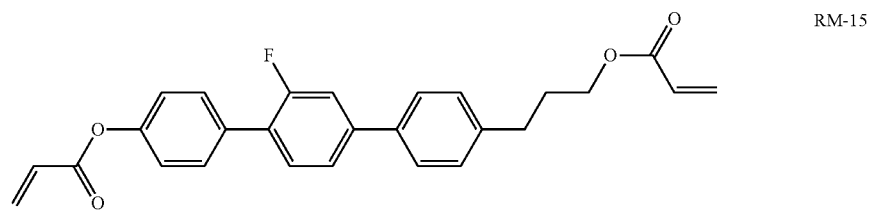 RM-15
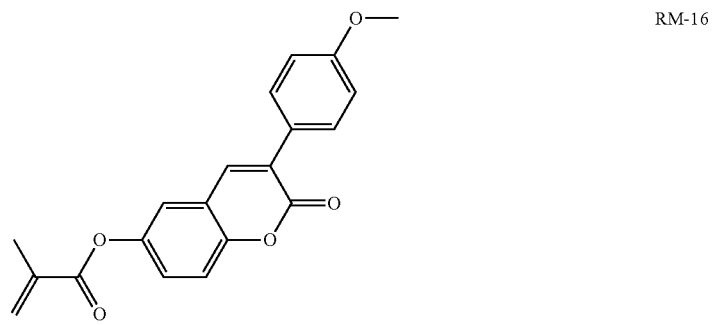 RM-16

TABLE D-continued
Table D shows illustrative compounds which can be used in the LC media in accordance with the present invention, preferable as reactive compounds.
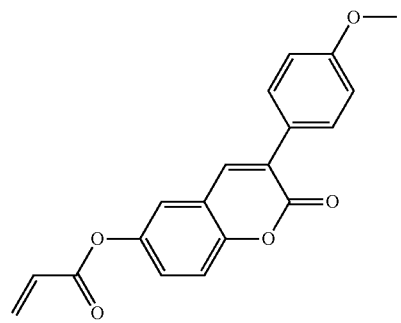 [SMILES: C=CC(=O)Oc1ccc2oc(=O)c(-c3ccc(OC)cc3)cc2c1]
RM-17
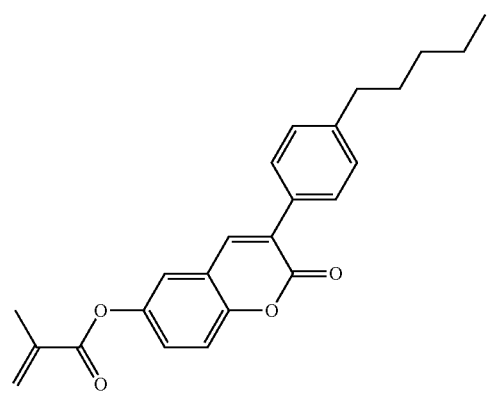 [SMILES: C=C(C)C(=O)Oc1ccc2oc(=O)c(-c3ccc(CCCCC)cc3)cc2c1]
RM-18
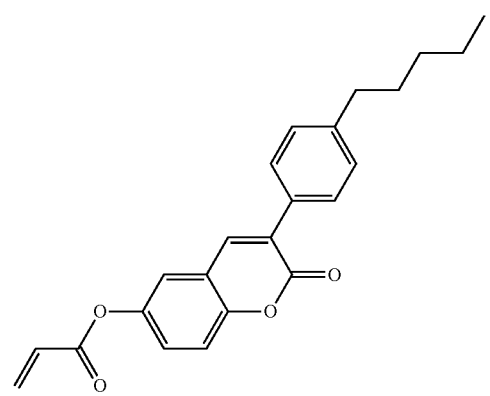 [SMILES: C=CC(=O)Oc1ccc2oc(=O)c(-c3ccc(CCCCC)cc3)cc2c1]
RM-19
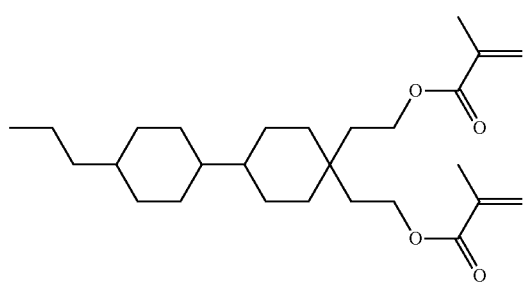 [SMILES: C=C(C)C(=O)OCCC1(CCOC(=O)C(=C)C)CCC(C2CCC(CCC)CC2)CC1]
RM-20

TABLE D-continued

Table D shows illustrative compounds which can be used in the LC media in accordance with the present invention, preferable as reactive compounds.

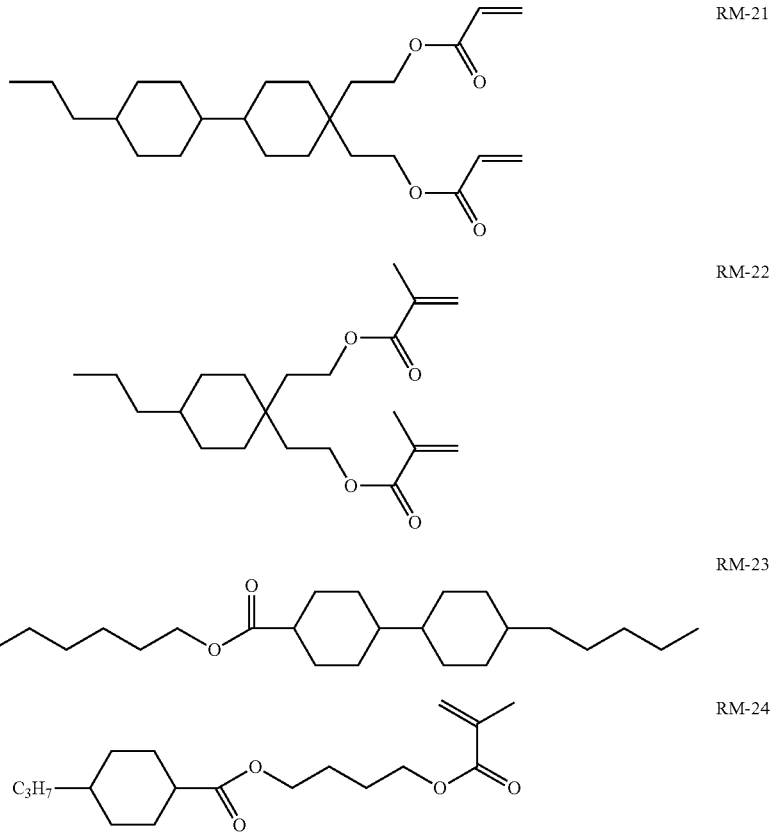

In a preferred embodiment of the present invention, the mesogenic media comprise one or more compounds selected from the group of the compounds from Table D.

In the present application, the term "compounds", also written as "compound(s)", denotes, unless explicitly indicated otherwise, both one and also a plurality of compounds. Conversely, the term "compound" generally also encompasses a plurality of compounds, if this is possible according to the definition and is not indicated otherwise. The same applies to the terms LC media and LC medium. The term "component" in each case encompasses one or more substances, compounds and/or particles.

In addition, the following abbreviations and symbols are used:
$V_0$ threshold voltage, capacitive [V] at 20° C.,
$n_e$ extraordinary refractive index at 20° C. and 589 nm,
$n_o$ ordinary refractive index at 20° C. and 589 nm,
$\Delta n$ optical anisotropy at 20° C. and 589 nm,
$\in_\perp$ dielectric permittivity perpendicular to the director at 20° C. and 1 kHz,
$\in_\parallel$ dielectric permittivity parallel to the director at 20° C. and 1 kHz,
$\Delta\in$ dielectric anisotropy at 20° C. and 1 kHz,
cl.p., T(N,I) clearing point [° C.],
$\gamma_1$ rotational viscosity at 20° C. [mPa·s],
$K_1$ elastic constant, "splay" deformation at 20° C. [pN],
$K_2$ elastic constant, "twist" deformation at 20° C. [pN],
$K_3$ elastic constant, "bend" deformation at 20° C. [pN].

Unless explicitly noted otherwise, all concentrations in the present application are quoted in percent by weight and relate to the corresponding mixture as a whole comprising all solid or liquid-crystalline components, without solvents.

All physical properties are and have been determined in accordance with "Merck Liquid Crystals, Physical Properties of Liquid Crystals", Status November 1997, Merck KGaA, Germany, and apply for a temperature of 20° C., and $\Delta n$ is determined at 589 nm and $\Delta\in$ at 1 kHz, unless explicitly indicated otherwise in each case.

The term "threshold voltage" for the present invention relates to the capacitive threshold ($V_0$), also known as the Freedericks threshold, unless explicitly indicated otherwise. In the examples, the optical threshold may also, as generally usual, be quoted for 10% relative contrast ($V_{10}$) and the voltage value for 50% relative contrast ($V_{50}$).

The polymerisable compounds are polymerised in the display or test cell by irradiation with UVA light (usually 365 nm) of defined intensity for a prespecified time, with a voltage optionally being applied simultaneously to the display (usually 10 to 30 V alternating current, 1 kHz). In the examples, unless indicated otherwise, a 100 mW/cm² mercury vapour lamp is used, and the intensity is measured using a standard UV meter (Ushio UNI meter) fitted with a 320 nm band-pass filter.

The following examples explain the present invention without intending to restrict it in any way. However, the physical properties make clear to the person skilled in the art what properties can be achieved and in what ranges they can be modified. In particular, the combination of the various properties which can preferably be achieved is thus well defined for the person skilled in the art.

Further combinations of the embodiments and variants of the invention in accordance with the description also arise from the Claims.

EXAMPLES

The compounds employed, if not commercially available, are synthesised by standard laboratory procedures. LC media originate from Merck KGaA, Germany. PSS-1 ([3-(2-amino-ethyl)amino]propyl-heptaisobutyl-substituted PSS; CAS Registry No. 444315-16-6) was purchased from Aldrich. Structures PSS-1 to PSS-9 and RM-1 are given in the preceding description.

Example 1

A polymerisable compound (RM-1, 0.3% by weight) and the diamine compound PSS-1 (0.25% by weight) are added to a nematic LC medium of the VA type ($\Delta\epsilon<0$) in accordance with Table 1 and homogenised.

TABLE 1

| Nematic LC medium | | | |
|---|---|---|---|
| CCH-501 | 9.00% | Cl.p. | +70.0 |
| CCH-35 | 14.00% | $\Delta n$ | 0.0825 |
| PCH-53 | 8.00% | $\Delta\epsilon$ | −3.5 |
| CY-3-O4 | 14.00% | $\epsilon_{\parallel}$ | 3.5 |
| CY-5-O4 | 13.00% | $K_3/K_1$ | 1.00 |
| CCY-3-O2 | 8.00% | $\gamma_1$ | 141 |
| CCY-5-O2 | 8.00% | $V_0$ | 2.06 |
| CCY-2-1 | 9.00% | | |
| CCY-3-1 | 9.00% | | |
| CPY-2-O2 | 8.00% | | |

Use in Tests Cells without Pre-Alignment Layer:

The resultant mixture is introduced into a test cell (without polyimide alignment layer, layer thickness d≈5.2 μm, ITO coating on both sides, no passivation layer). The LC medium has a spontaneous homeotropic (vertical) alignment to the substrate surfaces. The cell is irradiated with UV light of intensity 100 mW/cm² for 6 min without application of a voltage. This causes polymerisation of the monomeric compound. This alignment remains stable up to 70° C. The cell can be switched reversibly in the temperature-stable range by application of a voltage of between 0 and 50 V. The electro-optical measurement results are compared with Comparative Examples 1 and 2 in Table 2.

Comparative Example 1

Only the diamine compound PSS-1 (0.25% by weight) used previously is added to a nematic LC medium of the VA type in accordance with Table 1 and homogenised.

Use in Test Cells without Pre-Alignment Layer:

The resultant mixture is introduced into a test cell (without polyimide alignment layer, layer thickness d≈5.2 μm, ITO coating on both sides, no passivation layer). The LC medium has a spontaneous homeotropic (vertical) alignment to the substrate surfaces.

The homeotropic pre-alignment observed at room temperature disappears from a temperature of about 45° C. or more. A planar alignment is obtained. The electro-optical measurement results are compared in Table 2.

Comparative Example 2

Only the polymerisable compound (RM-1, 0.3% by weight) used before is added to a nematic LC medium of the VA type in accordance with Table 1 and homogenised.

Use in Test Cells with VA-Polyimide:

The resultant mixture is introduced into a test cell (rubbed antiparallel, VA-polyimide alignment layer, layer thickness d≈4 μm). The cell is irradiated with UV light of intensity 100 mW/cm² for 6 min without application of a voltage. This causes polymerisation of the monomeric compound.

The electro-optical measurement results are compared in Table 2.

TABLE 2

| | Comparison of the values for Example 1 and Comparative Examples 1 and 2 for $V_{50}$: | | | |
|---|---|---|---|---|
| Ex. | Proportion of PSS-1 | Proportion of RM-1 | $V_{50}$ (35° C.) | Alignment at 50° C. |
| 1 | 0.25% | 0.3% | 2.61 V | vertical |
| C1 | 0.25% | — | 2.52 V | planar |
| C2 | — | 0.3% | 3.23 V | vertical |

Example 2

A polymerisable compound (RM-1, 0.3% by weight) and the diol compound PSS-3 (1.0% by weight) are added to a nematic LC medium of the VA type ($\Delta\epsilon<0$) in accordance with Table 1 and homogenised. The spontaneous homeotropic alignment is stable up to about 30° C. and is fully converted into the planar alignment between 40 and 60° C. The mixture is polymerised in a cell analogously to Example 1. The stabilised mixture has homeotropic alignment up to >50° C.

Examples 3 to 8

The following compounds are employed as component (N) and the LC medium is polymerised analogously to Example 2 (Table 3).

TABLE 3

| Ex. | PSS, % by weight | RM-1 | Alignment at 50° C. |
|---|---|---|---|
| 3 | PSS-4, 1% | 0.3% | homeotropic |
| 4 | PSS-5, 2% | 0.3% | homeotropic |
| 5 | PSS-6, 1% | 0.3% | homeotropic |
| 6 | PSS-7, 5% | 0.3% | homeotropic |
| 7 | PSS-8, 3.3% | 0.3% | homeotropic |
| 8 | PSS-9, 5% | 0.3% | homeotropic |

The invention claimed is:
1. A liquid-crystal medium comprising:
a low-molecular-weight liquid-crystalline component having negative dielectric anisotropy with a value $\Delta\epsilon \leq -1.5$,
a polymerizable or polymerized component, and
a component (N) comprising particles having a mass of at least 450 Da, where the particles contain one or more organic polar anchor groups, and
where the polymerized component is obtainable by polymerization of said polymerizable component.
2. The liquid-crystal medium according to claim 1, wherein said particles are dissolved particles.

3. The liquid-crystal medium according to claim 1, wherein the particles of component (N) have a side ratio $d_{max}/d_{min}$ of at most 3:1.

4. The liquid-crystal medium according to claim 1, wherein the particles of component (N) are organic molecules.

5. The liquid-crystal medium according to claim 1, wherein the particles of component (N) are organic/inorganic hybrid particles.

6. The liquid-crystal medium according to claim 1, wherein said particles of component (N) are silsesquioxane compounds.

7. The liquid-crystal medium according to claim 1, wherein the particles of component (N) are functionalized by one or more anchor groups containing at least one or more heteroatoms selected from N, O, S and P.

8. The liquid-crystal medium according to claim 1, wherein said particles of component (N) are functionalized by an anchor group containing a group of the sub-formula

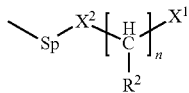

in which, in each case independently,
n denotes 1, 2 or 3,
$X^1$ denotes a group —NH$_2$, —NHR$^1$—NR$^1{}_2$, —OR$^1$ or —OH,
$X^2$ denotes —NH—, —NR$^1$—, —O— or a single bond,
$R^1$ denotes a halogenated or unsubstituted alkyl radical having 1 to 15 C atoms, where, in addition, one or more CH$_2$ groups in this radical may each be replaced, independently of one another, by —C≡C—, —CH=CH—, —(CO)O—, —O(CO)—, —(CO)— or —O— in such a way that O atoms are not linked directly to one another, and
$R^2$ denotes H, F, Cl, CN, —OH, —NH$_2$ or a halogenated or unsubstituted alkyl radical having 1 to 15 C atoms, where, in addition, one or more CH$_2$ groups in this radical may each be replaced, independently of one another, by —C≡C—, —CH=CH—, —(CO)O—, —O(CO)—, —(CO)—, —O—, —NH— or —NR$^1$— in such a way that O atoms are not linked directly to one another,
Sp denotes a single bond or a spacer group defined like Sp$^a$ as defined below for formula II, preferably a spacer group Sp"-X" as defined for formula II below, which is bonded to the particle via X", where Sp" very particularly denotes a single bond or an alkylene having 1 to 12 C atoms.

9. The liquid-crystal medium according to claim 1, wherein each of said particles of component (N) have precisely one anchor group.

10. The liquid-crystal medium according to claim 1, wherein said medium contains less than 10% by weight of said particles of component (N).

11. The liquid-crystal medium according to claim 1, wherein said polymerizable component comprises a compound of the formula II:

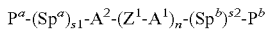

in which the individual radicals have the following meanings:
$P^a$, $P^b$ each, independently of one another, denote a polymerizable group,
Sp$^a$, Sp$^b$ on each occurrence, identically or differently, denote a spacer group,
s1, s2 each, independently of one another, denote 0 or 1,
$A^1$, $A^2$ each, independently of one another, denote a radical selected from the following groups:
 a) the group consisting of trans-1,4-cyclohexylene, 1,4-cyclohexenylene and 4,4'-bicyclohexylene, in which, in addition, one or more non-adjacent CH$_2$ groups may be replaced by —O— and/or —S— and in which, in addition, one or more H atoms may be replaced by F,
 b) the group consisting of 1,4-phenylene and 1,3-phenylene, in which, in addition, one or two CH groups may be replaced by N and in which, in addition, one or more H atoms may be replaced by L,
 c) the group consisting of tetrahydropyran-2,5-diyl, 1,3-dioxane-2,5-diyl, tetrahydrofuran-2,5-diyl, cyclobut-1,3-diyl, piperidine-1,4-diyl, thiophene-2,5-diyl and selenophene-2,5-diyl, each of which may also be mono- or polysubstituted by L,
 d) the group consisting of saturated, partially unsaturated or fully unsaturated, and optionally substituted, polycyclic radicals having 5 to 20 cyclic C atoms, one or more of which may, in addition, each be replaced by a heteroatom, where, in addition, one or more H atoms in these radicals may each be replaced by L, and/or one or more double bonds may each be replaced by a single bond, and/or one or more CH groups may each be replaced by N,
n denotes 0, 1, 2 or 3,
$Z^1$ in each case, independently of one another, denotes —CO—O—, —O—CO—, —CH$_2$O—, —OCH$_2$—, —CF$_2$O—, —OCF$_2$—, —(CH$_2$)$_n$— where n is 2, 3 or 4, —O—, —CO—, —C(R$^y$R$^z$)—, —CH$_2$CF$_2$—, —CF$_2$CF$_2$— or a single bond,
L on each occurrence, identically or differently, denotes F, Cl, CN, SCN, SF$_5$ or straight-chain or branched, in each case optionally fluorinated, alkyl, alkoxy, alkylcarbonyl, alkoxycarbonyl, alkylcarbonyloxy or alkoxycarbonyloxy having 1 to 12 C atoms,
$R^0$, $R^{00}$ each, independently of one another, denote H, F or straight-chain or branched alkyl having 1 to 12 C atoms, in which, in addition, one or more H atoms may each be replaced by F,
M denotes —O—, —S—, —CH$_2$—, —CHY$^1$— or —CY$^1$Y$^2$—, and
$Y^1$ and $Y^2$ each, independently of one another, have one of the meanings indicated above for R$^0$ or denote Cl or CN.

12. The liquid-crystal medium according to claim 1, wherein component (N) comprises particles which contain one or more polymerizable groups.

13. A liquid-crystal display comprising;
a liquid-crystal cell having two substrates and two electrodes, where at least one substrate is transparent to light and at least one substrate has one or two electrodes, and
a layer of a liquid-crystal an LC medium according to claim 1 located between the substrates,
where the polymerized component is obtainable by polymerization of one or more polymerizable compounds between the substrates of the liquid-crystal cell in the liquid-crystal medium, and
where component (N) is suitable for effecting homeotropic alignment of the liquid-crystal medium with respect to the substrate surfaces.

14. The liquid-crystal display according to claim 13, wherein said substrates have no alignment layers.

15. The liquid-crystal display according to claim 13, wherein said display is a VA display having electrodes arranged on opposite sides of the liquid-crystal cell.

16. A process for production of a liquid-crystal display comprising a liquid-crystal cell having two substrates and two electrodes, where at least one substrate is transparent to light and at least one substrate has one or two electrodes, said process comprising:
filling of the liquid-crystal cell with a liquid-crystal medium according to claim 1, wherein said medium contains said polymerizable component and is suitable for effecting homeotropic (vertical) alignment of the liquid-crystal medium with respect to the substrate surfaces, and
polymerizing said polymerizable component, optionally with application of a voltage to the liquid-crystal cell or under the action of an electric field.

17. The liquid-crystal medium according to claim 1, wherein said particles are dispersed particles.

18. The liquid-crystal medium according to claim 1, wherein said polymerizable component comprises a compound of formula II:

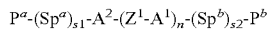    II in which the individual radicals have the following meanings:
$P^a$, $P^b$ each, independently of one another, denote a polymerizable group,
$Sp^a$, $Sp^b$ on each occurrence, identically or differently, denote a spacer group,
s1, s2 each, independently of one another, denote 0 or 1,
$A^1$, $A^2$ each, independently of one another, denote a radical selected from the following groups:
  a) the group consisting of trans-1,4-cyclohexylene, 1,4-cyclohexenylene and 4,4'-bicyclohexylene, in which, in addition, one or more non-adjacent $CH_2$ groups may be replaced by —O— and/or —S— and in which, in addition, one or more H atoms may be replaced by F,
  b) the group consisting of 1,4-phenylene and 1,3-phenylene, in which, in addition, one or two CH groups may be replaced by N and in which, in addition, one or more H atoms may be replaced by L,
  c) the group consisting of tetrahydropyran-2,5-diyl, 1,3-dioxane-2,5-diyl, tetrahydrofuran-2,5-diyl, cyclobut-1,3-diyl, piperidine-1,4-diyl, thiophene-2,5-diyl and selenophene-2,5-diyl, each of which may also be mono- or polysubstituted by L,
  d) a group selected from bicyclo[1.1.1]pentane-1,3-diyl, bicyclo[2.2.2]octane-1,4-diyl, spiro[3.3]heptane-2,6-diyl,

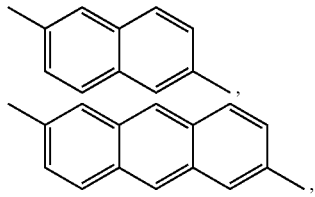

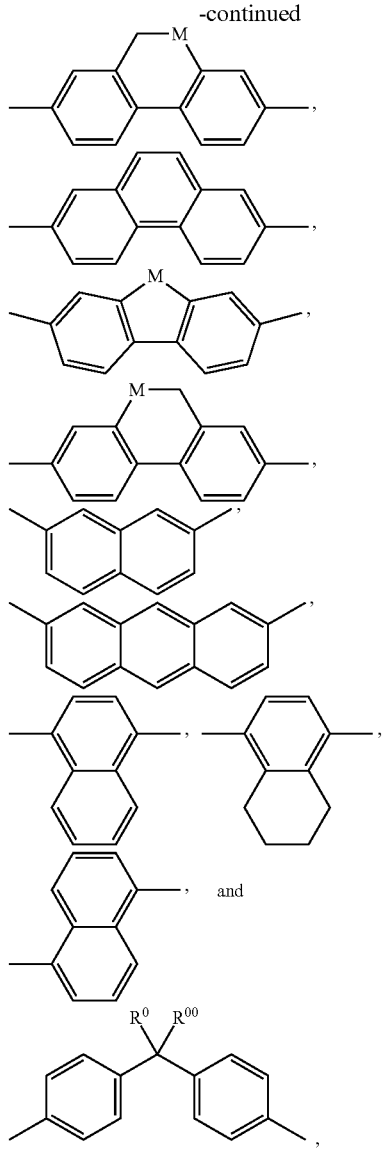

where, in addition, one or more H atoms in these radicals may each be replaced by L, and/or one or more double bonds may each be replaced by a single bond, and/or one or more CH groups may each be replaced by N,
n denotes 0, 1, 2 or 3,
$Z^1$ in each case, independently of one another, denotes —CO—O—, —O—CO—, —$CH_2$O—, —O$CH_2$—, —$CF_2$O—, —O$CF_2$—, —$(CH_2)_n$— where n is 2, 3 or 4, —O—, —CO—, —C($R^y R^z$)—, —$CH_2CF_2$—, —$CF_2CF_2$— or a single bond,
L on each occurrence, identically or differently, denotes F, Cl, CN, SCN, $SF_5$ or straight-chain or branched, in each case optionally fluorinated, alkyl, alkoxy, alkylcarbonyl, alkoxycarbonyl, alkylcarbonyloxy or alkoxycarbonyloxy having 1 to 12 C atoms,
$R^0$, $R^{00}$ each, independently of one another, denote H, F or straight-chain or branched alkyl having 1 to 12 C atoms, in which, in addition, one or more H atoms may each be replaced by F,
M denotes —O—, —S—, —$CH_2$—, —$CHY^1$— or —$CY^1Y^2$—, and Y¹ and Y² each, independently of one another, have one of the meanings indicated above for R⁰ or denote Cl or CN.

19. The liquid-crystal medium according to claim 4, wherein said particles have a diameter of 1-5 nm.

20. The liquid-crystal medium according to claim 1, wherein the amount of said particles is 0.1 to 0.5% by weight.

21. The liquid-crystal medium according to claim 1, wherein said particles of component (N) are of the formula:

O-A*, wherein
A* denotes a polar anchor group, and
O stands for the remainder of the particle without the anchor group wherein O is ≥90% of the mass of the particle, and
wherein anchor group A* is a group of the formula -Sp-[X²—Z²—]$_k$X¹     (A1), in which, in each case independently,
Sp denotes a single bond or a spacer group via which a connection to the particle is formed,
X¹ denotes a group —NH₂, —NHR¹, —NR¹₂, —CN, —OR¹, —OH, —(CO)OH, or a group of the formula

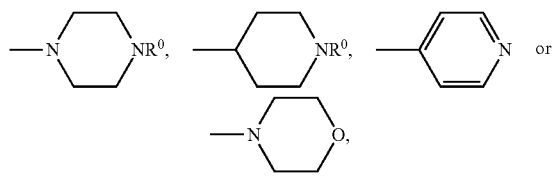

R⁰ denotes H or alkyl having 1 to 12 C atoms,
X² in each case independently denotes —NH—, —NR¹—, —O— or a single bond,
Z² in each case independently denotes an alkylene group having 1-15 C atoms, carbocyclic rings having 5 or 6 C atoms, or combinations of one or more rings and alkylene groups, in each of which one or more hydrogen atoms are each optionally replaced by —OH, OR¹, —NH₂, —NHR¹—, —NR¹₂ or halogen,
R¹ in each case independently denotes a halogenated or unsubstituted alkyl radical having 1 to 15 C atoms, where, in addition, one or more CH₂ groups in this radical may each be replaced, independently of one another, by —C≡C—, —CH=CH—, —(CO)O—, —O(CO)—, —(CO)— or —O— in such a way that O and N atoms are not linked directly to one another, and where the groups R¹ may optionally be linked to one another to form ring systems, and
k denotes 0 to 3.

22. The liquid-crystal medium according to claim 21, wherein anchor group A* contains a radical of the sub-formula (A2)

in which Sp, X¹, X² and R¹ are as defined above for formula (A1), and
R² denotes H, F, Cl, CN, —OH, —NH₂, or a halogenated or unsubstituted alkyl radical having 1 to 15 C atoms, where, in addition, one or more CH₂ groups in this radical may each be replaced, independently of one another, by —C≡C—, —CH=CH—, —(CO)O—, —O(CO)—, —(CO)—, —O—, —NH— or —NR¹— in such a way that O and N atoms are not linked directly to one another, and
n denotes 1, 2 or 3.

23. The liquid-crystal medium according to claim 21, wherein anchor groups A* are selected from
—NH₂, —NH—(CH₂)$_{n3}$H, —(CH₂)$_n$—NH₂, —(CH₂)$_n$—NH—(CH₂)$_{n3}$H, —NH—(CH₂)$_n$—NH₂, —NH—(CH₂)$_n$—NH—(CH₂)$_{n3}$H, —(CH₂)$_{n1}$—NH—(CH₂)$_{n2}$—NH₂, —(CH₂)$_{n1}$—NH—(CH₂)$_{n2}$—NH—(CH₂)$_{n3}$H, —O—(CH₂)$_n$—NH₂, —(CH₂)$_{n1}$—O—(CH₂)$_n$—NH₂, —(CH₂)$_{n1}$—NH—(CH₂)$_{n2}$—OH, —O—(CH₂)$_{n1}$—NH—(CH₂)$_{n2}$—NH₂, —O—(CH₂)$_{n1}$—NH—(CH₂)$_{n2}$—OH, and —(CH₂)$_{n1}$—NH—(CH₂)$_{n2}$—NH—(CH₂)$_{n3}$H,
wherein n, n1, n2 and n3 each denote, independently, 1, 2, 3, 4, 5, 6, 7, 8, 9, 10, 11 or 12.

24. The liquid-crystal medium according to claim 21, wherein anchor groups A* are selected from
—OH, —(CH₂)$_n$—OH, —O—(CH₂)$_n$—OH, [O—(CH₂)$_{n1}$—]₂—OH, —(CO)OH, —(CH₂)$_n$—(CO)OH, —O—(CH₂)$_n$—(CO)OH, and [O—(CH₂)$_{n1}$—]$_{n2}$—(CO)OH,
in which n, n1 and n2 denote, independently, 1, 2, 3, 4, 5, 6, 7, 8, 9, 10, 11 or 12.

25. The liquid-crystal medium according to claim 1, wherein the particles of component (N) are selected from the following compounds:

PSS-1

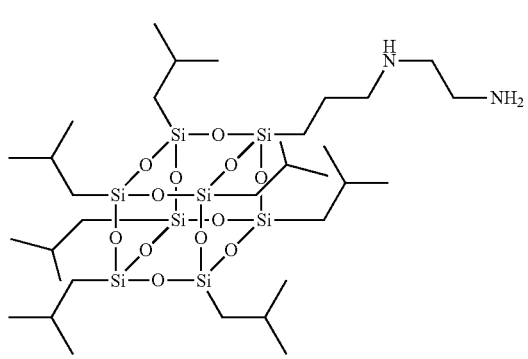

-continued
PSS-2
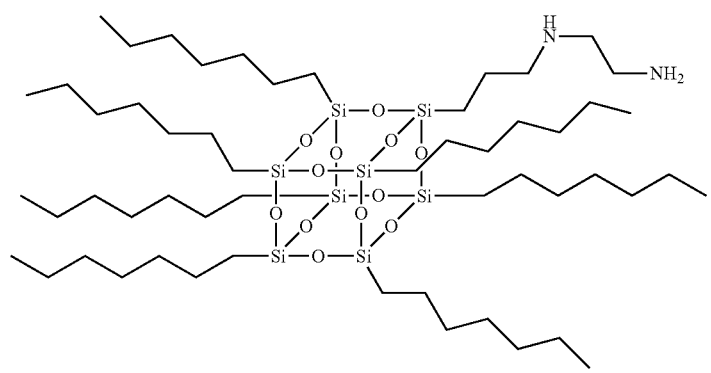
PSS-3
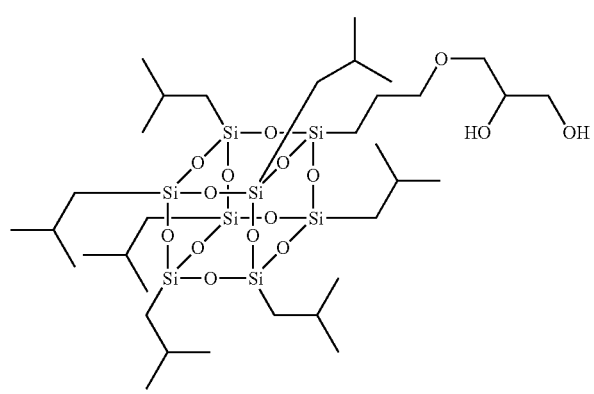
PSS-4
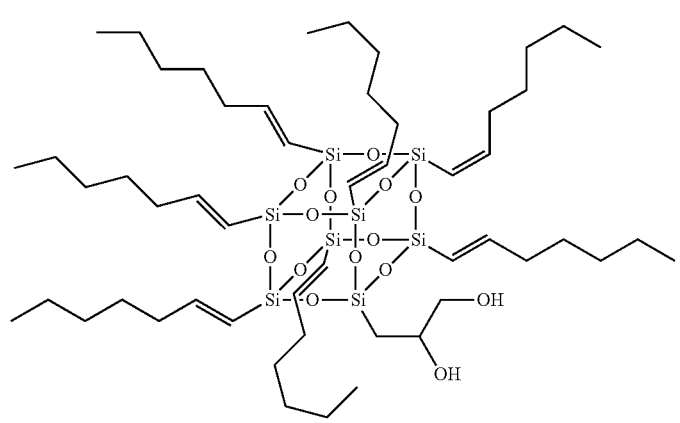
PSS-5
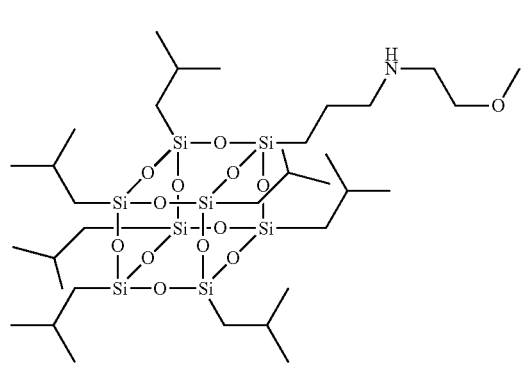
PSS-6
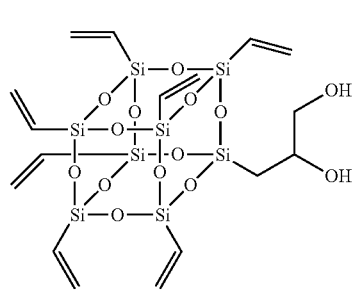

-continued
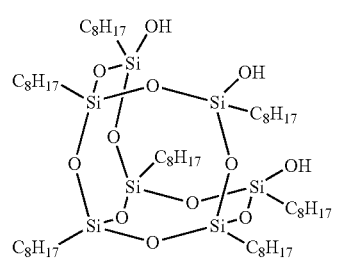
PSS-7
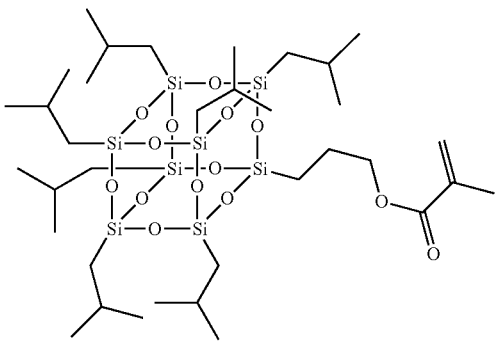
PSS-8
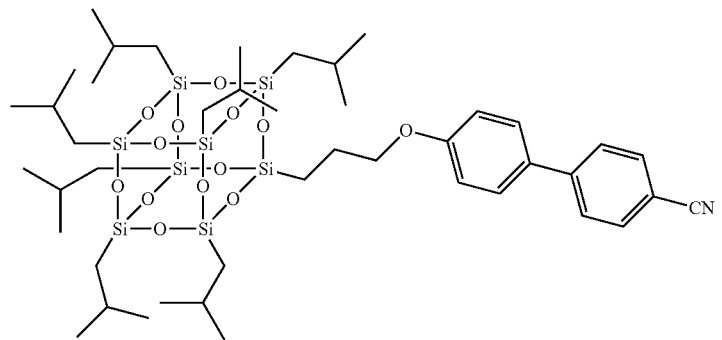
PSS-9
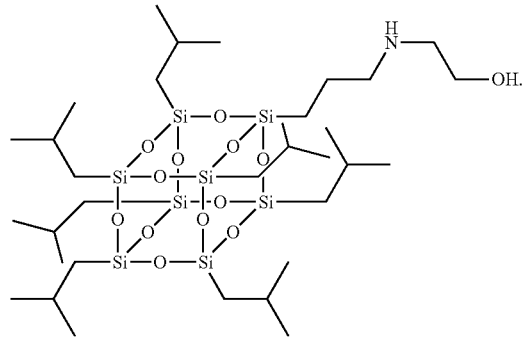
PSS-10
26. The liquid-crystal medium according to claim 1, wherein said liquid-crystal medium has a negative dielectric anisotropy.
* * * * *